US006198975B1

(12) United States Patent
Drucker et al.

(10) Patent No.: US 6,198,975 B1
(45) Date of Patent: Mar. 6, 2001

(54) INTERPRETIVE LANGUAGE ARCHITECTURE FOR CONTROLLING THE ATTRIBUTES OF A PHYSICAL CHEMICAL OR THERMODYNAMIC PROCESS

(75) Inventors: Steven J. Drucker, Atlanta; David Marcel Raynault, Roswell, both of GA (US)

(73) Assignee: Microwave Science, LLC, Norcross, GA (US)

( * ) Notice: Subject to any disclaimer, the term of this patent is extended or adjusted under 35 U.S.C. 154(b) by 0 days.

(21) Appl. No.: 09/415,882

(22) Filed: Oct. 8, 1999

Related U.S. Application Data

(60) Provisional application No. 60/103,622, filed on Oct. 9, 1998.

(51) Int. Cl.[7] ..................... G05B 11/01

(52) U.S. Cl. ..................... 700/15; 700/13; 700/14; 700/208; 700/210; 700/211; 219/678; 219/702; 219/714; 219/720

(58) Field of Search ..................... 700/15, 13, 14, 700/17, 18, 208, 210, 211; 219/678, 702, 714, 720, 704, 703, 710, 719

(56) References Cited

U.S. PATENT DOCUMENTS

| | | | | |
|---|---|---|---|---|
| 3,500,742 | | 3/1970 | Tanguy et al. | 99/326 |
| 4,317,976 | * | 3/1982 | Noda | 219/10.55 F |
| 4,323,773 | | 4/1982 | Carpenter | 235/473 |
| 4,340,797 | | 7/1982 | Takano et al. | 219/10.55 |
| 4,356,370 | | 10/1982 | Horinouchi | 219/10.55 |
| 4,375,586 | * | 3/1983 | Ueda | 219/10.55 B |
| 4,447,693 | * | 5/1984 | Buck | 219/10.55 M |
| 4,508,948 | | 4/1985 | Carlson | 219/10.55 |
| 4,816,635 | * | 3/1989 | Edamura | 219/10.55 B |
| 5,321,232 | | 6/1994 | Ogle | 219/506 |
| 5,426,280 | | 6/1995 | Smith | 219/506 |
| 5,573,691 | | 11/1996 | Yoshida et al. | 219/506 |
| 5,586,330 | | 12/1996 | Knudsen et al. | 395/705 |
| 5,623,261 | | 4/1997 | Rose | 351/26 |
| 5,812,393 | | 9/1998 | Drucker | 364/144 |
| 5,883,801 | | 3/1999 | Drucker et al. | 364/144 |

* cited by examiner

*Primary Examiner*—Paul P. Gordon
*Assistant Examiner*—Ramesh Patel
(74) *Attorney, Agent, or Firm*—Bernstein & Associates, P.C.

(57) ABSTRACT

An interpretive system architecture for a seamless transfer of energy to a physical, chemical, or thermodynamic process stream, or microwave oven. The interpretive system architecture overlays the operational finctions of the process stream or host microwave oven to interpret, control, and implement user independent commands. The interpretive system has at least one interpretive base class for providing operational instance to the process stream or host microwave oven. The interpretive system receives an indicia, the indicia being expressive of an externally derived predetermined compiled code disposed on the surface of a specimen, or food package, or associated thereto, the indicia communicating via at least one data entry mechanism to the process stream or host microwave oven. The interpretive system interprets the data or code and transforms it into user independent commands. The user independent commands enable the process stream or the host microwave oven to function over a wide but controlled range of energy transfer to the specimen.

42 Claims, 46 Drawing Sheets

55

| | | |
|---|---|---|
| **1234567** | = | Externally Derived Pre-determined Code |
| n1 | = | 1 |
| n2 | = | 2 |
| n3 | = | 3 |
| n4 | = | 4 |
| n5 | = | 5 |
| n6 | = | 6 |
| n7 | = | 7 |

| | | |
|---|---|---|
| 1st Power Level | = | PL1 |
| 2nd Power Level | = | PL2 |
| (x+1) Power Level | = | PL(x+1) |
| Cook Time for PL1 | = | T1 |
| Cook Time for PL2 | = | T2 |
| Cook Time for PL(x+1) | = | T(x+1) |

Base (or "minimum") Cook Time For T1 = T1 base
Base (or "minimum") Cook Time For T2 = T2 base
Base (or "minimum") Cook Time For T(x+1) = T(x+1) base Discrete cook time segment
corresponding to a single gradation of n# =T1 Incr

Fig. 5 code length =2

155

T1=T1 Base + (n1n2-n1n2min)* T1 Increment
T2=Varies

156

| T1 Base | T1 Increment | T2 Varies | n1n2 Range |
|---|---|---|---|
| 1:00 | 0:05 | 0:30 | 10-20 |
| 0:30 | 0:10 | 0:30 | 21-37 |
| 1:25 | 0:05 | 0:30 | 38-52 |
| 0:40 | 0:10 | 0:30 | 53-66 |
| 1:35 | 0:05 | 0:30 | 67-78 |
| 1:00 | 0:05 | 1:00 | 79-99 |

Table -1

Fig. 33

INTERPRETIVE LANGUAGE ARCHITECTURE FOR CONTROLLING THE ATTRIBUTES OF A PHYSICAL CHEMICAL OR THERMODYNAMIC PROCESS

CROSS-REFERENCE TO RELATED APPLICATION

This application claims the benefit of U.S. Provisional Application Ser. No. 60/103,622, filed on Oct. 9, 1998, which is incorporated by reference herein.

FIELD OF THE INVENTION

The present invention relates, in general, to an interpretive language architecture for controlling the attributes of a physical, chemical, or thermodynamic process. In particular, the present invention relates to a system that provides attribute control for devices used in the control of the physical, chemical, or thermodynamic process stream. More particularly, the present invention relates to a method and apparatus for processing data received from an external source and transforming that data into user independent commands to control the physical, chemical, or thermodynamic process stream.

BACKGROUND OF THE INVENTION

In general, the transfer of energy to a physical, chemical, or thermodynamic process stream is determined by the work performed on that process. For example, the present day microwave oven transfers energy to a specimen contained within the confines of the microwave oven by bombarding the specimen with electromagnetic waves which cause molecules in the specimen to vibrate billions of times per second. The heat is created when dipolar molecules (such as water) vibrate back and forth aligning themselves with the electric field or when the ions migrate in response to the electric field. The vibrations cause heat by friction at a depth of about 1 to 1.5 inches. Heat transfer properties of the specimen continue the process of thermal transfer by transmitting heat to areas of the specimen that are relatively cool in comparison to the areas that have been heated by the electromagnetic waves. The measure of work performed on the specimen is determined by power received by the specimen multiplied by time (W=P*T).

Mechanisms that provide the microwave oven data to ascertain the estimated power and time are well known in the art. Examples of such mechanisms are delineated in U.S. Pat. Nos. 5,812,393 and 5,883,801. Once the data is received by the microwave oven, the data is transformed into commands that are discernible by a controller disposed within the microwave oven. Generally, the controller is a computer or microprocessor based system. The computer or microprocessor has stored within its memories at least one program to facilitate the operation of the microwave oven.

Generally, the structure or architecture of these programs is linear i.e., the data received by input mechanisms is directed to the appropriate program for processing. The program calculates the appropriate power and time settings understandable by the host microwave oven. Once these calculations are computed, the host microwave oven begins the energy transfer process independent of the residing program. There is no architecture or overlaying software to guide the interaction between the various resident programs to determine the required work to be performed on the specimen.

Prior to the present invention attempts to implement a more structured approach to the control of the microwave oven have relied on break points or stopping points within the programs that require user intervention to continue the energy transfer process. This means of controlling the microwave oven is tantamount to having a plurality of individual programs connected together by the stopping and starting of the resident program. Others have tried to implement a series of look up tables stored in the memory of the computer in an attempt to match up data received from the input mechanism to the stored tables. This approach limits the flexibility of the energy transfer to the specimen to the size of the memory of the computer.

It would be desirable to have a system architecture for the transfer of energy to a physical, chemical, or thermodynamic process stream that is seamless and does not rely on preconceived recorded data stored in the memory of the computer to implement the work performed on that process. The architecture would encapsulate a BIOS machine and Work Manager for providing the mechanisms for controlling the physical, chemical, or thermodynamic process stream for heating an object or objects, i.e., specimen or food, within a microwave oven. The BIOS machine would control the course and sequence of events for receiving the incoming data and transmitting the transformed data to the host physical, chemical, or thermodynamic process stream. The Work Manager in concert with the BIOS machine would control the work performed on the specimen disposed within the confines of the microwave oven and manage the thermal aberrations of the microwave oven.

SUMMARY OF THE INVENTION

The preferred embodiment of the present invention is an interpretive system architecture for the transfer of energy to a physical, chemical, or thermodynamic process stream, or microwave oven that is seamless and does not rely on preconceived data stored in the memory of a computer to implement the work performed on that process. The architecture encapsulates a BIOS machine and Work Manager (as delineated in U.S. Pat. Nos. 5,812,393 and 5,883,801, which are commonly assigned to the assignee of the present invention) to provide the mechanisms for controlling the physical, chemical, or thermodynamic process stream to heat an object or objects, i.e., specimen or food within the confines of the microwave oven.

Microwave ovens presently in use employ various data entry mechanisms to input data into the oven control mechanism. These data entry mechanisms may be electrical and mechanical keyboards, card readers, light pens, wands, radio frequency detectors, or the like. The data is transmitted to a controller with a memory. The implementation of the data results in the specimen receiving energy to heat the specimen to some desired temperature.

The present invention overlays the operational functions of the microwave oven to interpret, control, and implement the desired contents of the data received from the data entry mechanism. The interpretive system architecture or operating system may, if desired, be stored in the memory of the controller. The operating system has at least one interpretive base class for providing operational instance to the host microwave oven. The operating system receives the externally derived predetermined data or code, interprets the code, and transforms the code into user independent functional commands for the host microwave oven or process stream.

The interpretive base class may, if desired, be a BIOS machine base class. The BIOS machine base class has at least one object that provides functional control for the operating system. One such object is a BIOS machine-receiving object. The BIOS machine-receiving object is in communication with the data entry mechanism and provides the data structure to interpret the externally derived predetermined input code into a datum process stream with specific operating instructions. The BIOS machine-receiving object transmits the interpreted process stream operating instruction set to a BIOS machine datum object. The datum object scales the datum process stream into the host oven or process BIOS machine stream operating instruction set. The scaled process stream of operating instructions is then transmitted to a BIOS machine output object. The BIOS machine output object may, if desired, be in communication with the host microwave oven to deliver the operational instructions.

Another base class that may, if desired, be implemented within the operating system is the work manager class. The operating system now has two base classes that interpret, control, and implement the desired externally derived data. The BIOS machine output object may now transmit its operational instructions to a work manager-receiving object. The work manager receiving object receives the host microwave oven or process stream specific operating instructions and transforms these instructions into data structures that control at least one of the desired functions of the work manager. The work manager-receiving object receives instructions for performing work on the specimen disposed in the confines of the microwave oven. The work manager-receiving object may, if desired, contain data on operational power supplied to the microwave oven that has been interpreted by the BIOS machine. The BIOS machine periodically transmits the power data received from a power sensor for processing (as delineated in U.S. Pat. No. 5,883,801).

A work-processing object is in interactive communication with the work manager-receiving object. The work-processing object transforms data received from the BIOS machine into command functions that represent work expended on the specimen or the work to be expended on the specimen disposed within the confines of the microwave oven (as delineated in U.S. Pat. No. 5,883,801).

A work manager-output object is in interactive communication with the work-processing object. The work manager-output object collects the data from the aforementioned objects and transmits it to the host microwave oven via an emulator module (as delineated in U.S. Pat. No. 5,883,801).

In general, an externally derived predetermined code is data derived from instructions that offer static conditions of the specimen to receive work. These static conditions vary widely and differ on characteristics of the material to receive work. The material inherently varies in dielectric property, relative dielectric constant, geometry, and loss factor. These properties govern both the work function and uniformity of work expended from specimen to like specimen.

The second embodiment of the present invention provides a communication medium that allows data derived from static instructions to be interpreted and processed by the present invention. The second embodiment of the present invention, is an apparatus or mechanism for delineating the characteristics of an indicia disposed on the surface of the specimen or associated thereto. The indicia are expressive of the externally derived predetermined code that is compiled to represent desired data. The desired data may be suggestive of power, time, or other characteristics of the specimen disposed within the confines of the microwave oven. The indicia contain at least one symbol that communicates at least one characteristic of the specimen. The symbols may, if desired, be numbers, lines, geometric shapes, electrically conductive characters, electrically non-conductive characters, or other characters. The symbols may be arranged in any predetermined format i.e., in-line, spaced apart, or other determinable patterns. The indicia communicate the externally derived predetermined code to the BIOS machine via the data entry mechanism.

When taken in conjunction with the accompanying drawings and the appended claims, other features and advantages of the present invention become apparent upon reading the following detailed description of the embodiments of the invention.

BRIEF DESCRIPTION OF THE DRAWINGS

The invention illustrated in the drawings in which like reference characters designate the same or similar parts throughout the figures of which:

FIG. 5 illustrates the indicia used in the text string that expresses externally derived predetermined compiled code.

FIG. 33 illustrates a table of empirically derived constants.

DETAILED DESCRIPTION OF THE PREFERRED EMBODIMENT

Figure 1:
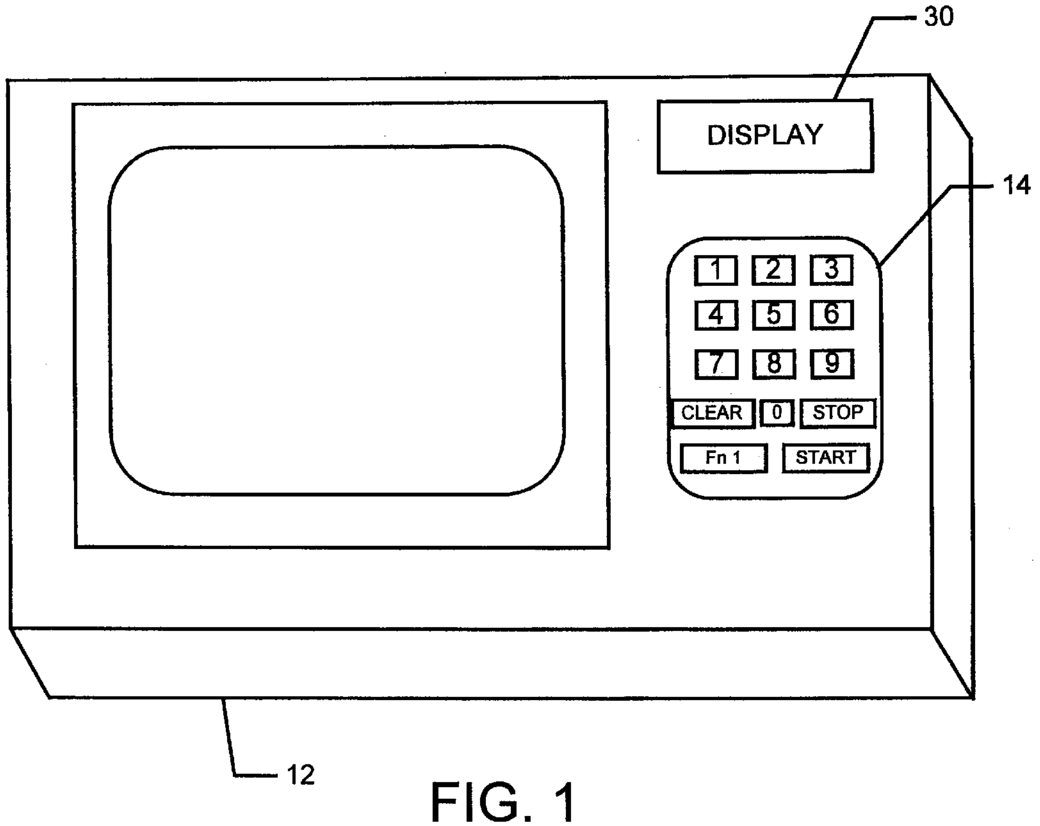
FIG. 1 illustrates a schematic view of a host microwave oven.

Before describing in detail the interpretive language architecture for a microwave oven (or physical, chemical, or thermodynamic process stream) in accordance with the present invention 10, it should be observed that the invention resides primarily in a novel structural combination of software elements associated with the command and control of the aforementioned microwave oven or process stream and not in the particular detailed configuration thereof. Accordingly, the structure, command, control, and arrangement of these elements have, for the most part, been illustrated in the drawings by readily understandable block diagram representations and flow charts. The drawings show only those specific details that are pertinent to the present invention 10 in order not to obscure the disclosure with structural details which will be readily apparent to those skilled in the art and having the benefit of the description herein. Thus, the block diagram and flow chart illustrations of the Figures do not necessarily represent the structural arrangement of the exemplary system, but are primarily intended to illustrate major software and hardware structural components of the system in a convenient functional grouping, whereby the present invention 10 may be more readily understood.

OVERVIEW OF THE PRESENT INVENTION

Figure 2:
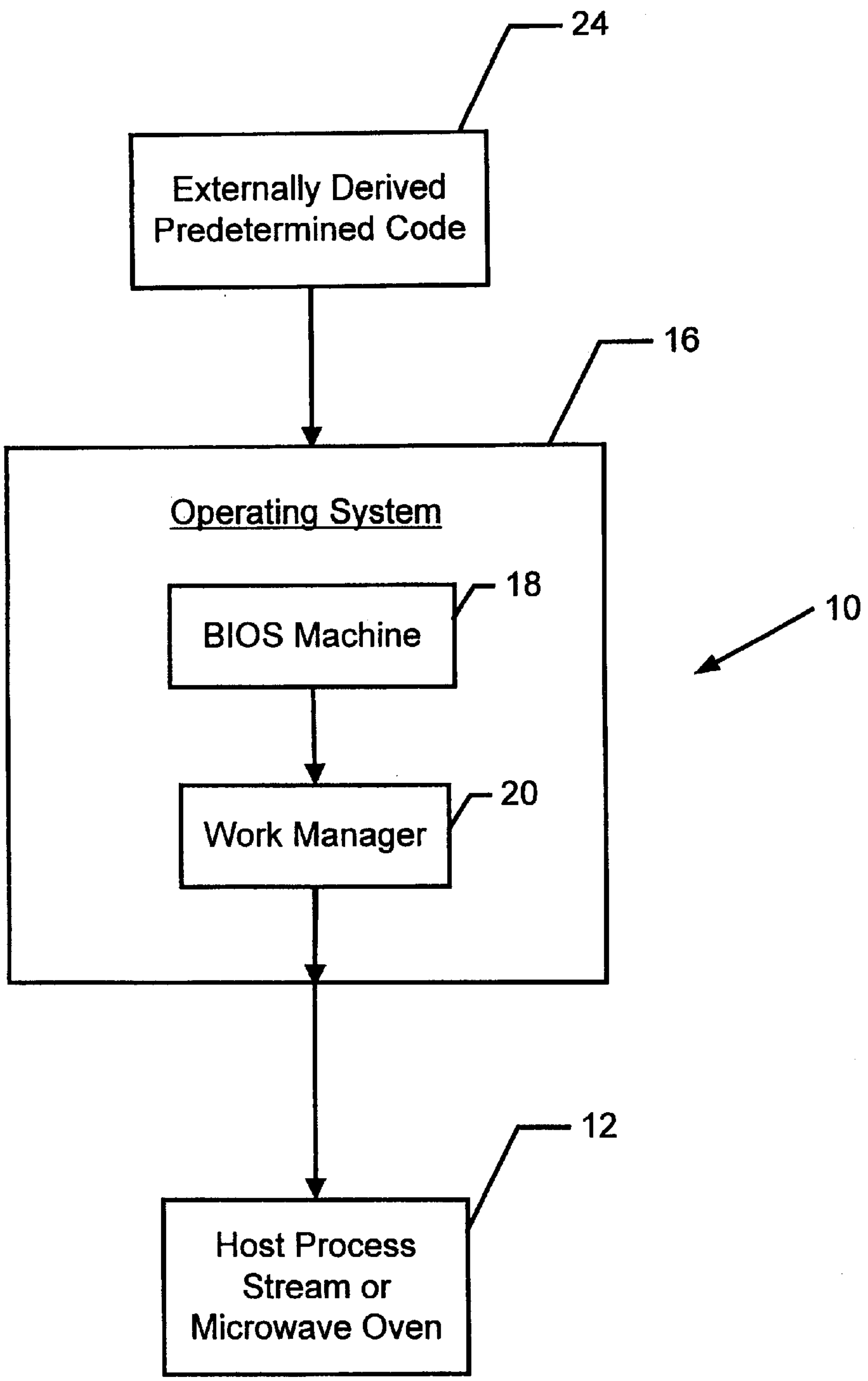
FIG. 2 illustrates a top-level block diagram of the system architecture of the present invention.

The preferred embodiment of the present invention is an interpretive language architecture 10, FIG. 2 for a microwave oven 12, FIG. 1. The microwave oven 12 may, if desired, be any type of microwave oven that is found in households or industry. The microwave oven 12 has been fitted or modified with a BIOS machine disclosed in U.S. Pat. No. 5,812,393 which is incorporated by reference herein. The microwave oven 12 may, if desired, be fitted with a work manager 20. The operational features of the work manager 20 are disclosed in U.S. Pat. No. 5,883,801.

The present invention 10 may be generally described from a top-level perspective, FIG. 2. The present invention 10 is inclusive of an object oriented interpretive operating system 16. The interpretive operating system 16 is an overlaying layer of software that commands and controls the execution of programs found in the BIOS machine class 18 and the work manager class 20. The present invention 10 may, if desired, be implemented using only the BIOS machine class 18. The operating system 16 facilitates and orchestrates the cooking of food products in microwave oven 12. The BIOS machine 18 is a class of objects that command and control the operational features of the host microwave oven or process stream as delineated in U.S. Pat. No. 5,883,801. The work manager 20 is a class of objects that command and control work performed or to be performed on the specimen or food product disposed in the confines of the host microwave oven and as delineated in U.S. Pat. No. 5,883,801. The instructional output of the work manager class 20 is transmitted to the host process stream or microwave oven 12 for implementation i.e., to provide thermal response to the work instructions.

DETAILED PROCESS OF THE INTERPRETIVE LANGUAGE ARCHITECTURE

THE PREFERRED EMBODIMENT

The microwave oven 12, FIG. 1 is an oven used by households, restaurants, and other types of institutions to prepare and cook food. An example of a typical microwave oven is a microwave oven manufactured by Cober Electronics, Inc., although any microprocessor, computer, or ASIC (Application Specific Integrated Circuit) controlled microwave oven or process stream is usable and operable in conjunction with the present invention 10. Microwave oven 12, for the purposes of illustration only, will host the present invention 10.

Host microwave oven 12 has a data entry mechanism 14, display 30 and a computer or controller with memory as delineated in the U.S. Pat. No. 5,812,393 patent. Data entry mechanism 14 may, if desired, be any type of data entry mechanism suitable for inputting data into host microwave oven 12. Data entry mechanism 14 may, if desired, transmit its data by serial or parallel format using any type of transmission medium such as, but not limited to, key pad entry, bar code reader, modem, computer, active or passive transponder/receiver radio frequency identification, ethernet or other networking protocol, or telephonic communications network, the internet, or any other medium that allows transmission of data. An example of data entry mechanism 14 is be a key pad part number KBD-KPX17P, manufactured by Alps, San Jose, Calif. Data entry mechanism 14 for the purposes of illustration only will be discussed as a conventional touch responsive key pad known to those of ordinary skill in the art, although any data entry mechanism will function in conjunction with the present invention 10.

THE SECOND EMBODIMENT

The second embodiment of the present invention provides a communication medium that allows data derived from static instructions to be interpreted and processed by the present invention. The second embodiment of the present invention, is an apparatus or mechanism for delineating the characteristics of an indicia disposed on the surface of the specimen or associated thereto. The indicia are expressive of an externally derived predetermined code that is compiled to represent desired data. The externally derived predetermined code as delineated in U.S. Pat. No. 5,812,393 may, if desired, be entered to the present invention 10. The code may take the form of a plurality of digits, numbers, or other symbology (as discussed above) that represents instructions to be interpreted by the present invention 10. Any code combination may be used that allows the present invention 10 to normally fínction. Preferably the code is externally derived and then entered into the present invention 10 via an above described data entry mechanism or the keypad 14.

OBJECT ORIENTED DISCUSSION OF THE PREFERRED AND SECOND EMBODIMENTS

The BIOS machine class 18 is a class with at least one object that contains related data structures that implement the desired fínctions of the present invention 10. If desired, the BIOS machine 18 class may be a plurality of objects that all share a command structure and common behavior. The BIOS machine class 18 and a representation of objects that may, if desired, be contained in the present invention 10 are further delineated at 28*a*, 28*b*, and 28*c*, FIG. 3*a*.

A BIOS machine receiving object 28*a* receives an externally derived predetermined code from the keypad 14. The BIOS machine receiving object 28*a* interprets the externally derived predetermined input code into a datum process stream with specific operating instructions. The BIOS machine receiving object 28*a* transmits the interpreted process stream to a datum object 28*b*. The datum object 28*b* scales the datum process stream into a host oven or process stream operating instruction set. The scaled process stream of operating instructions is then transmitted to an output object 28*c*. The BIOS machine output object 28*c* is in communication with a receiving object 29 of the work manager class 20. The work manager receiving object 29 receives the host oven or process stream specific operating instructions and transforms these instructions into data structures that control at least one of the desired functions of the work manager 20.

In general, the BIOS machine receiving object 28*a* is in communication with a data entry mechanism or the keypad 14 by any convenient handshake method known in the art of transmitting data. The data stream received by BIOS machine receiving object 28*a* may be of any numeric string length and may contain data arranged in any format. Preferably, the data stream is in a format data packet wherein the data packet is divided into at least one field containing data. If desired, a plurality of fields may be disposed into any given order within the data packet. Preferably, the BIOS machine receiving object 28*a* receives a data packet from a data entry mechanism or the keypad 14 that has its fields in a fixed and known order. An example of this data packet with known fields is illustrated at 55, FIG. 5.

If desired, the order of the fields in the data packet may be delineated by seven distinct fields labeled $n_1$ to $n_7$. Each data field contains data that may range in value from zero to nine. The adjacent data fields may, if desired, be combined to produce an order of data that yields unique information. Non-adjacent data fields may also be combined to yield unique information. The information contained in the data fields may, if desired, be a first power level, a second power level, and an (x+1) power level. Other information that may be contained in the data fields may be a cook time for the first power level, a cook time for the second power level, and a cook time for the (X+1) power level. Further information contained in the data fields may be a base or minimum cook time for T1=T1 base, a base or minimum cook time for T2=T2 base, and a base or minimum cook time for T(X+1)=Y(X+1) base. The specific determination of the above discussed variables is detailed herein.

Figure 4:
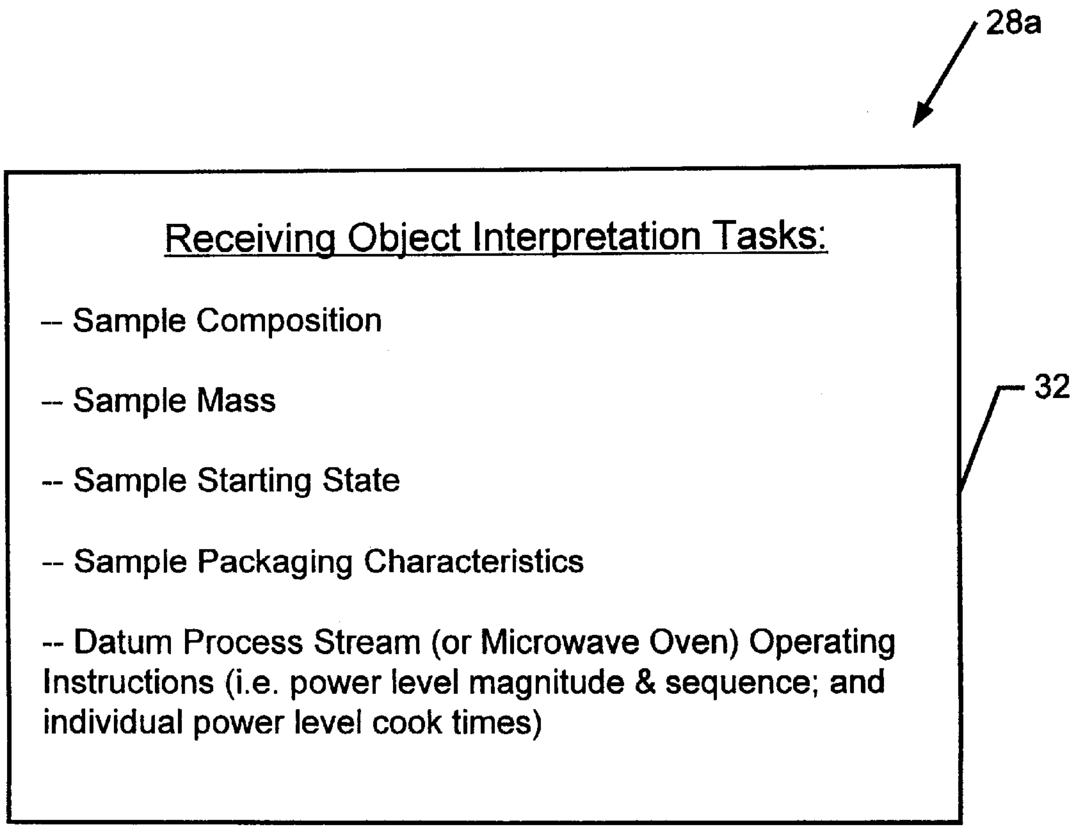
FIG. 4 illustrates a top-level block diagram the BIOS machine receiving object of FIG. 3*a*.

The task of the BIOS machine receiving object 28*a* is to interpret data contained in the data packet fields into a datum process stream with specific operating instructions. The BIOS machine receiving object 28*a* is further delineated at 32, FIG. 4. One combination of data packet fields may, if desired, yield the sample composition of the product to which work is to be performed thereon. Other combinations of fields may, if desired, yield sample mass, sample starting state, and sample packaging characteristics all of which aid in determining the work function that is to be applied to the sample product contained within the host microwave oven 12. The BIOS machine receiving object 28*a* transforms these data fields into a datum process stream containing specific operating instructions. The BIOS machine receiving object 28*a* transmits this information to the datum object 28*b*.

Figure 3A:
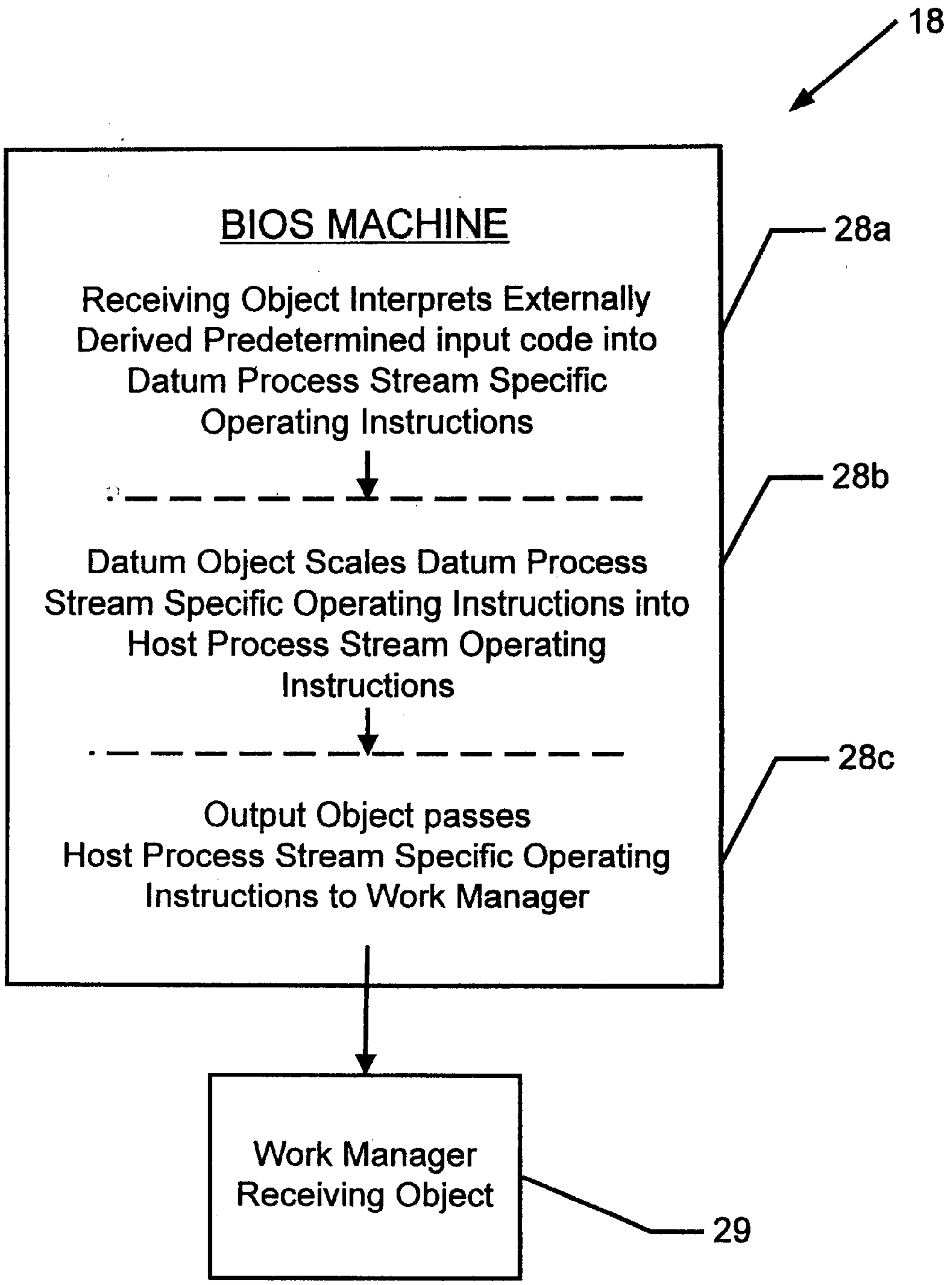
FIG. 3*a* illustrates a top-level block diagram of the BIOS machine of FIG. 2.

The datum object 28*b*, FIG. 3*a* receives and transforms the data contained into operating instructions suitable for the host microwave oven 12. The datum object 28*b* also scales the data process stream that enables the operating instructions to be processed by the host microwave oven 12. The datum object 28*b* then transmits this data stream to the output object 28*c* for transmittal to the work manger 20.

The work manager 20 is a class with at least one object that contains related data structures that implement the desired functions of the present invention 10. If desired, the work manager 20 may be a plurality of objects that all share a command structure and common behavior. The work manager 20 and a representation of the objects that may, if desired, be contained in the present invention 10 are further delineated at 29*a*, 29*b*, 29*c*, and 29*d*, FIG. 3*a*.

Figure 3B:
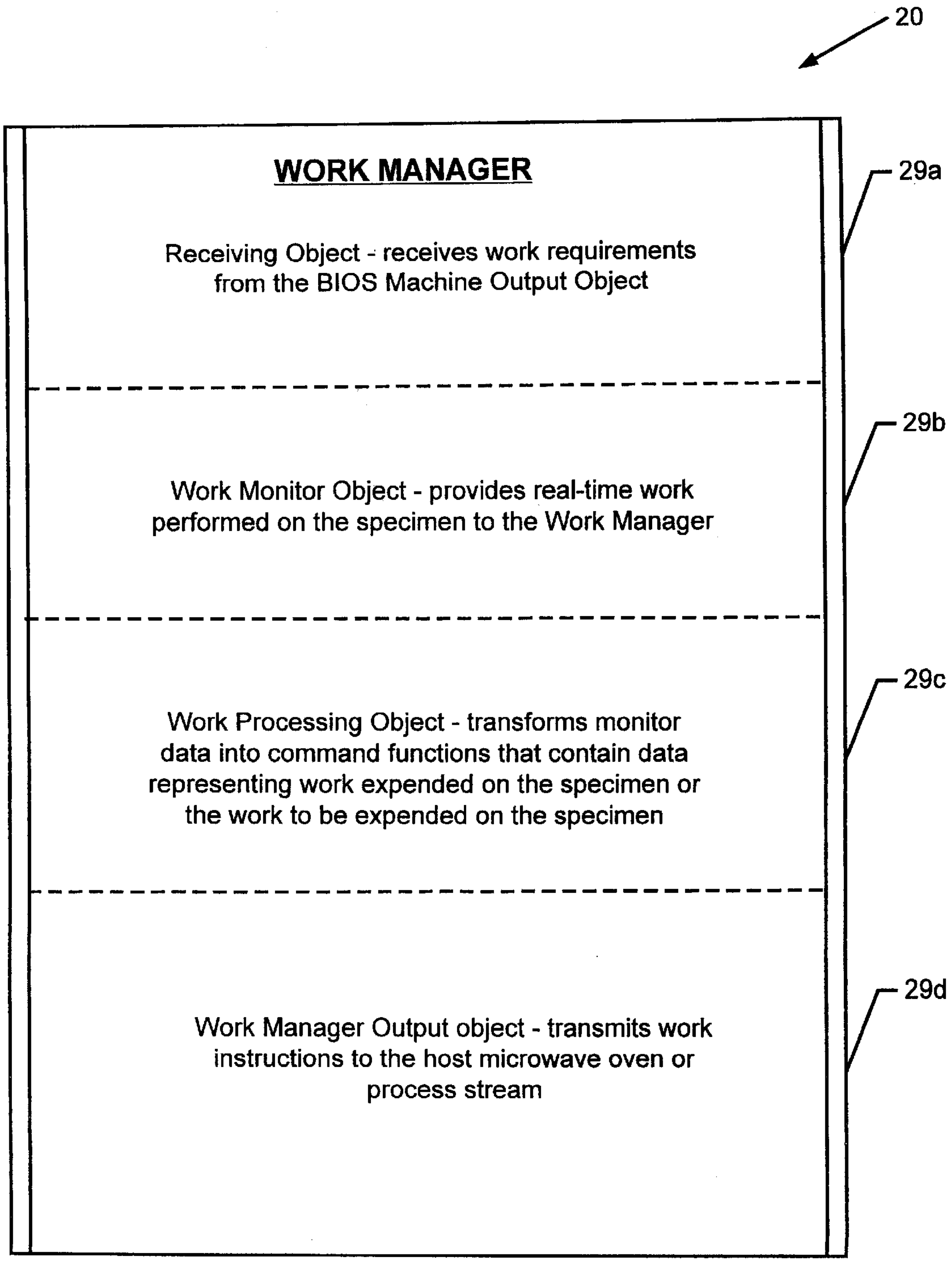
FIG. 3*b* illustrates a top-level block diagram of the work manager of FIG. 2.

The work manager receiving object 29*a*, FIG. 3*b* receives instructions for performing work on the specimen, sample, or food product disposed in the confines of the microwave oven 12. These instructions may, if desired, be for work to be performed on the specimen, sample, or food product disposed in the confines of the microwave oven 12. The work manager receiving object 29*a* may, if desired, contain data on power interpreted by the BIOS machine 18. The BIOS machine 18 periodically transmits the power data received from the power sensor for processing (as delineated in U.S. Pat. No. 5,883,801).

The work monitor object 29*b* is in interactive communications with the work manager-receiving object 29*a*. The work monitor object 29*b* accumulates, interprets, and correlates real time data on the work performed or to be performed on the specimen disposed within the confines of the microwave oven 12 (as delineated in U.S. Pat. No. 5,883,801).

The work-processing object 29*c* is in interactive communication with the work manager-receiving object 29*a*. The work processing object 29*c* transforms data received from the BIOS machine 18 into command functions that represent work expended on the specimen or the work to be expended on the specimen disposed within the confines of the microwave oven 12 (as delineated in U.S. Pat. No. 5,883,801).

The work manger output object 29*d* is in interactive communication with the work monitor object 29*b* and/or the work-processing object 29*c*. The work manager output object 29*d* collects the data from the aforementioned objects and transmits it to the host microwave oven 12 via the emulator module delineated in U.S. Pat. No. 5,883,801.

In general, the power data and the externally derived predetermined code are processed by the work manager 20. An instruction set is generated by the work manager 20. The instruction set transforms the power data and the externally derived predetermined code into commands for work to be performed on the specimen by the microwave oven 12. The result of this operation is that the microwave oven magnetron tube (or physical, chemical, or thermodynamic process stream) delivers the required work to the sample independent of power supplied to the microwave oven 12.

DISCUSSION OF THE PREFERRED AND SECOND EMBODIMENTS

The flow of data from a data entry mechanism or the keypad 14 to the host microwave oven 12 is presented in a flow chart format to aid the reader in understanding the logical progression of interpreted events that define the present invention 10. The data entry mechanism or keypad 14 receives the externally derived predetermined code 24, FIG. 6*a* from the user of the present invention 10 or other data sources. The externally derived predetermined code or data 24 may originate from suitably formed symbology affixed or imprinted on the surface of a sample product that is to receive work, or the code may originate from a data source linked to the host oven or process stream via a communications network. The externally derived predetermined code or data 24 may, if desired, be affixed to a surface, wrapping, or cover of the sample product that is to receive work. The work function is defined as power generated by the microwave oven 12 multiplied by time. Any transmission medium by which the code is transferred from the sample product to the present invention 10 may be implemented. Preferably, the transmission media is a user manipulating the touch pads of the keypad 14.

The digital representation or numeric string length of the externally derived predetermined code or data 24 is determined by the BIOS machine 18. The numeric string length of the externally derived predetermined code or data 24 is only determined at the beginning of the operation of the present invention 10. Once the numeric string length is determined, a great deal of information is discerned. If the numeric string length is equal to two the categories of work to be performed on the sample product are limited. If the numeric string length is equal to three, the categories of work functions to be performed on the sample product is expanded. As the numeric string length of the externally derived predetermined code or data 24 lengthens, the categories of possible work functions also increases. This progression of numeric string length of the externally derived predetermined code or data 24 and the expanding categories of possible work functions may continue for any given numeric string length of the externally derived predetermined code or data 24. Preferably, the numeric string length of the externally derived predetermined code or data 24 is limited to a numeric string length of seven digits.

Figure 6A:
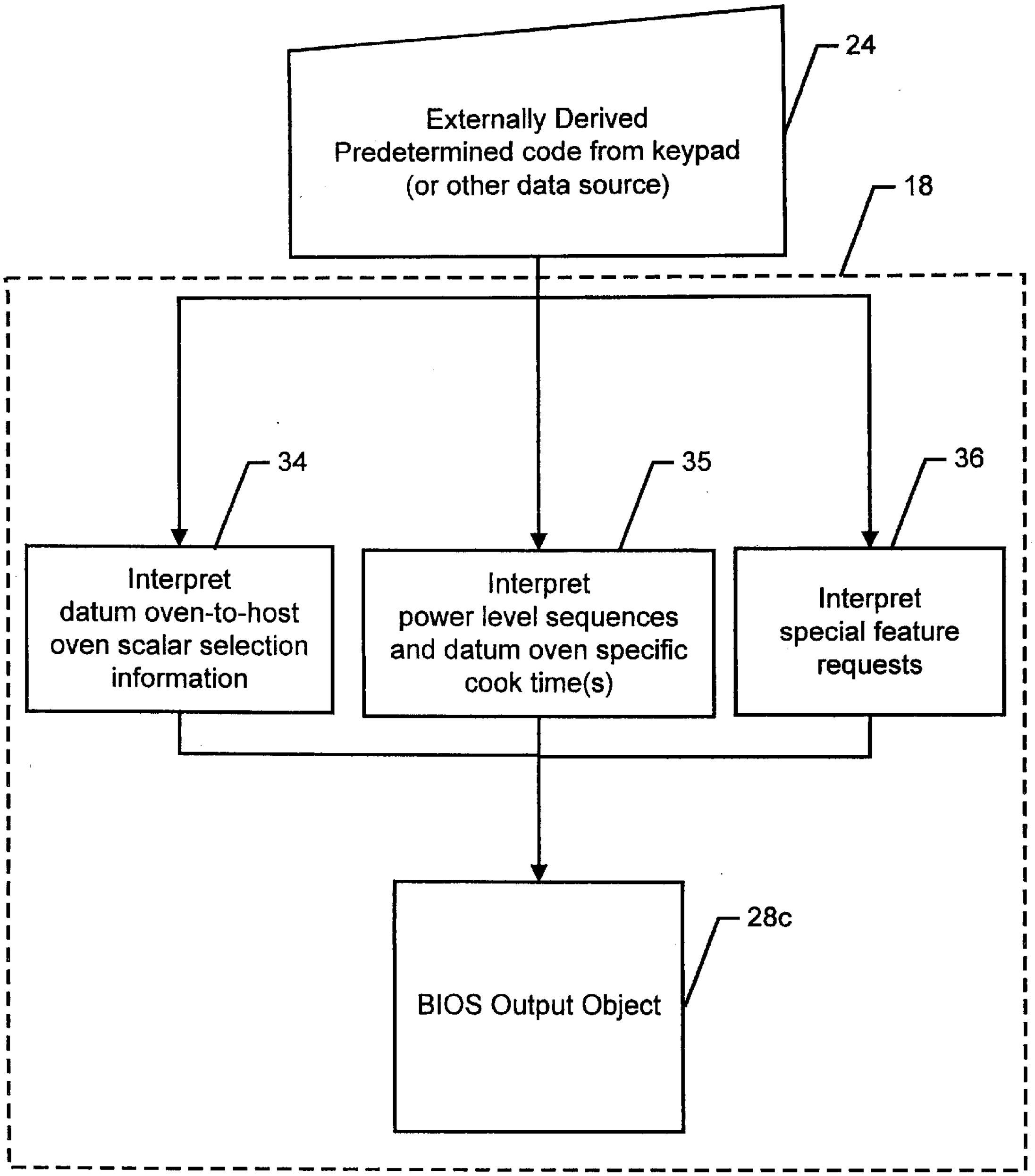
FIG. 6*a* illustrates a block diagram of an interpreter of the present invention.
Figure 6B:
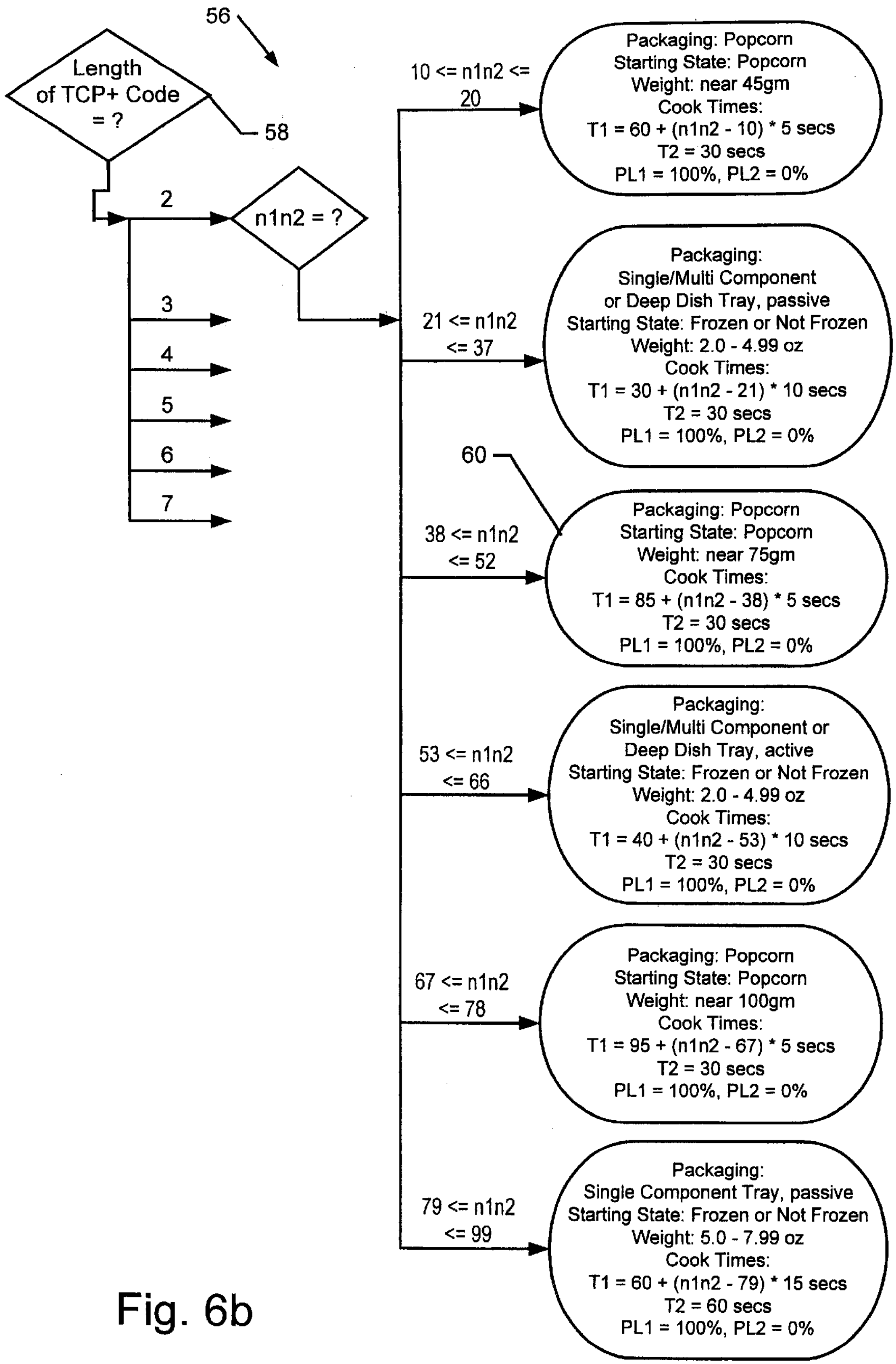
FIG. 6*b* illustrates a flow chart of the interpretation of the externally derived predetermined code numeric string length.

An example of the externally derived predetermined code or data 24 with various numeric string lengths is presented at 56, FIG. 6*b*. Other numeric string lengths of the externally derived predetermined code or data 24 not shown in this flow chart may also be determined by using the same methodology delineated in this example. The externally derived predetermined code numeric string length 24 with a numeric string length of two 57 expands into six possible categories of work functions that may be performed on the receiving sample product. It can be readily understood by a person of ordinary skill in the art of the geometric progression of the possible numeric string lengths of the externally derived predetermined code 24 and the expansion of the possible categories of work functions may only be ascertained with the use of a computer and the present invention 10. A discussion of particular variables contained in this example are discussion herein. This example provides the reader with an overview of the results of the BIOS machine 18 determination of the numeric string length of the externally derived predetermined code 24.

In this example the BIOS machine 18 has determined 58 the numeric string length of the externally derived predetermined code 24 is equal to two 57. The BIOS machine 18 next determines or parses the numeric range ($n_1n_2$) of the numeric string length 57 by bracketing the numeric string length into one of six categories. Those categories are $10<=n_1n_2<=20$, $21<=n_1n_2<=37$, $38<=n_1n_2<=52$, $53<=n_1n_2<=66$, $67<=n_1n_2<=78$, and $79<=n_1n_2<=99$. Once the BIOS machine 18 determines or parses the appropriate category then the packaging, starting state, weight, cook times, and power levels are known. If the $n_1n_2$ were equal to forty two (42), the ($38<=n_1n_2<=52$) category would have been selected and the variables delineated at 60 would be known. Other combinations of variables are delineated in the various categories of the flow chart 56. The methodology of how the variables of the flow chart 56 are derived is discussed below.

Figure 7A:
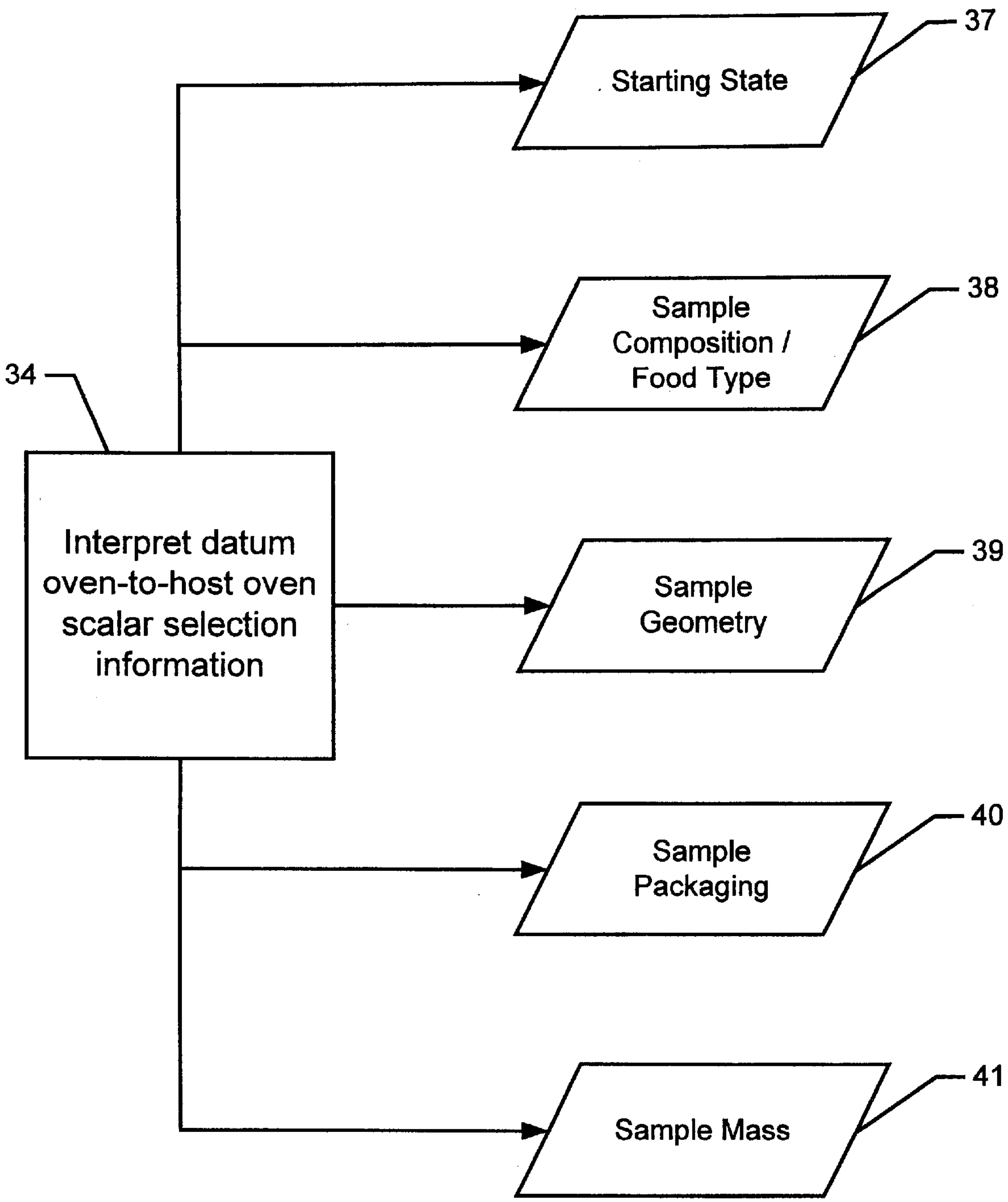
FIG. 7*a* illustrates a block diagram of the scalar selection information component group of FIG. 6*a*.

The externally derived predetermined code 24, FIG. 6*a* is interpreted to determine the numeric string length of the code (discussed above) and to determine the datum microwave oven to host microwave oven scalar selection information 34, power level sequences and datum microwave oven cook time(s) 35, and special features requests 36. The datum microwave oven to host microwave oven scalar selection information 34, FIG. 7*a* is interpreted or parsed into functions that allow the present invention 10 to determine the appropriate scalar selection. A top level view of those functions is illustrated in FIG. 7*a*. The functions are the product starting state 37, product sample composition 38, product sample geometry 39, product sample packaging 40, and the product sample mass 41.

Figure 7B:
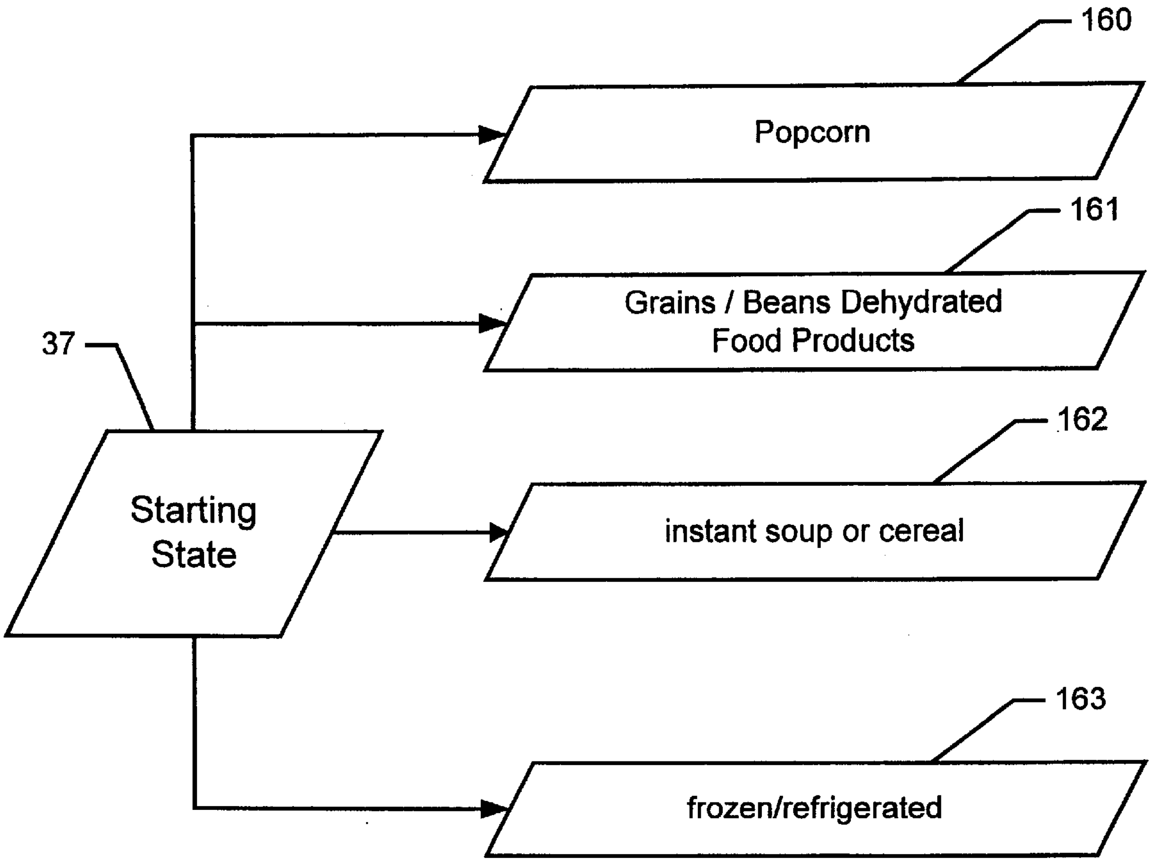
FIG. 7*b* illustrates a block diagram of the starting state group of FIG. 7*a*.
Figure 7C:
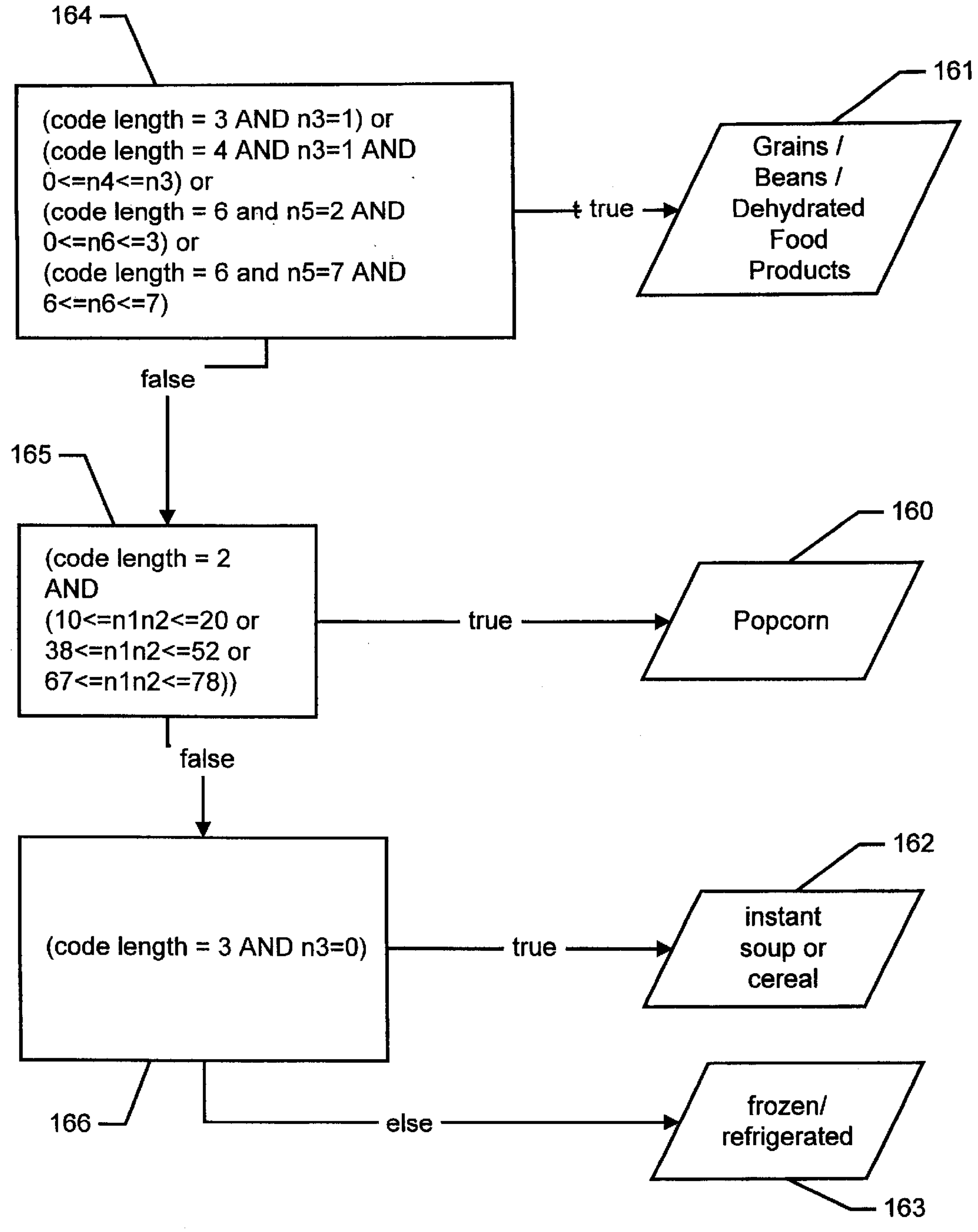
FIG. 7*c* illustrates a block diagram of the logical structures within the starting state group of FIG. 7*b*.

The product starting state 37, FIG. 7*b* is interpreted into discrete product starting state types. If desired, the product starting state types may be classified as popcorn 160, grains/beans/dehydrated food products 161, instant soup 162, or frozen, refrigerated 163. The positional or numerical string length of the externally derived predetermined code 24 determines the logical selection of the product starting state 37. Any positional or numerical string length of the externally derived predetermined code 24 may be used that allows the present invention 10 to normally function. If desired, the externally derived predetermined code 24's numeric string length (see FIG. 7*c*) is equal to three AND; the positional notation $n_3$ is equal to one; a logical true function is yielded, i.e., the starting state 37 is grains/beans/dehydrated food products 161. Other examples of the interpretation of the externally derived predetermined code 24's numeric string length are illustrated at 164, FIG. 7*c*. If the interpretation of the externally derived predetermined code 24's numeric string length is equal to two, a logical false function is yielded. The logical false function requires the externally derived predetermined code 24 to be tested again. If the externally derived predetermined code 24's numeric string length is equal to two AND ($10<=n_1n_2<=20$), a logical true function is generated, i.e., the starting state is popcorn 160. If this test yields a logical false function, the starting state 37 is NOT (grains or beans or dehydrated food products 161) AND NOT (popcorn) 160. Other logical OR functions in combination with the externally derived predetermined code 24's numeric string length equal to two are illustrated at 165, FIG. 7*c*. The logical false function requires the externally derived predetermined code 24 to be tested again. If the externally derived predetermined code 24's numeric string length is equal to three AND ($n_3=0$), a logical true function is generated, i.e., the starting state is instant soup or cereal 162. If this test yields a logical else function, the starting state 37 is frozen or refrigerated 163.

Figure 8:
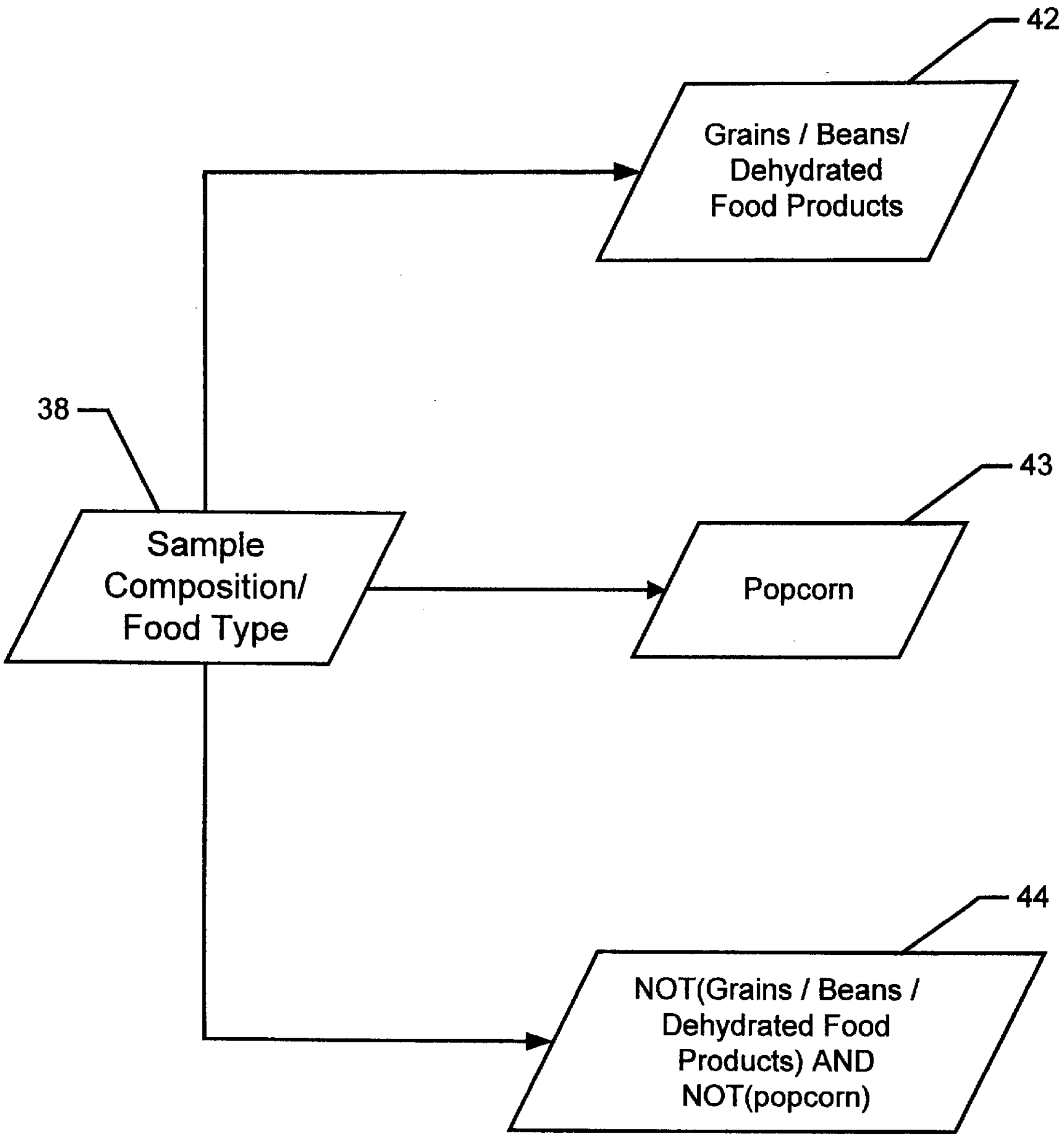
FIG. 8 illustrates a block diagram of the sample composition group of FIG. 7*a*.
Figure 9:
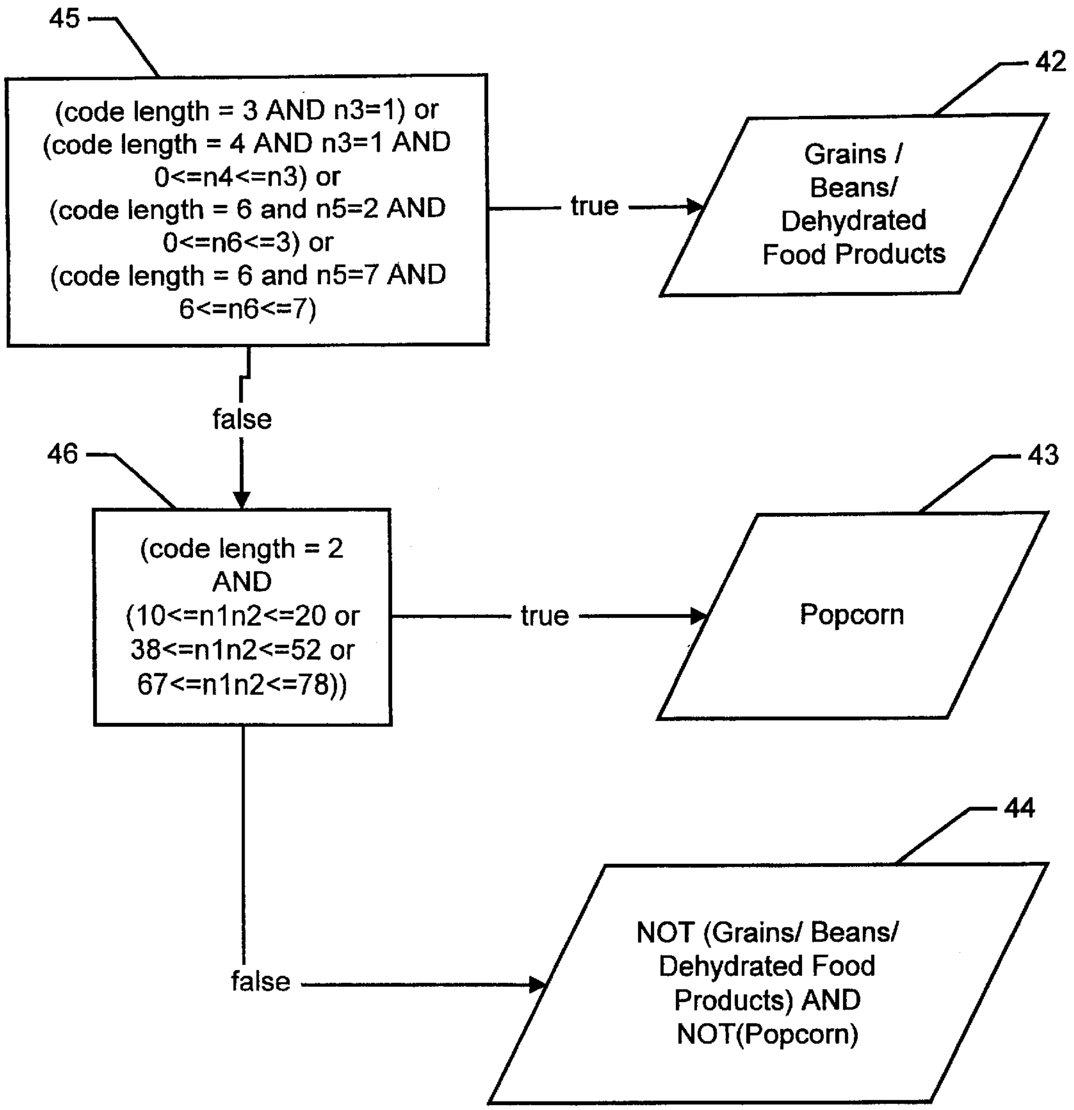
FIG. 9 illustrates a block diagram of the logical structures within the sample composition group of FIG. 8.

The product sample composition 38, FIG. 8 is interpreted into discrete product sample composition types. If desired, the product sample composition types may be classified as grains or beans or dehydrated food products 42, popcorn 43, or by the logical function NOT (grains or beans or dehydrated food products) AND NOT (popcorn) 44. The positional or numerical string length of the externally derived predetermined code 24 determines the logical selection of the product sample composition 38. Any positional or numerical string length of the externally derived predetermined code 24 may be used that allows the present invention 10 to normally function. If desired, the externally derived predetermined code 24's numeric string length (see 166, FIG. 7*c*) is equal to three AND; the positional notation $n_3$ is equal to one; a logical true function is yielded, i.e., grains or beans or dehydrated food products 42. Other examples of the interpretation of the externally derived predetermined code 24's numeric string length are illustrated at 45, FIG. 9. If the interpretation of the externally derived predetermined code 24's numeric string length is equal to two, a logical false function is yielded. The logical false function requires the externally derived predetermined code 24 to be tested again. If the externally derived predetermined code 24's numeric string length is equal to two AND ($10<=n_1n_2<=20$), a logical true function is generated, i.e., popcorn 43. If this test yields a logical false function, the product sample composition 39 is NOT (grains or beans or dehydrated food products) AND NOT (popcorn) 44. Other logical OR functions in combination with the externally derived predetermined code 24's numeric string length equal to two are illustrated at 46, FIG. 9.

Figure 10:
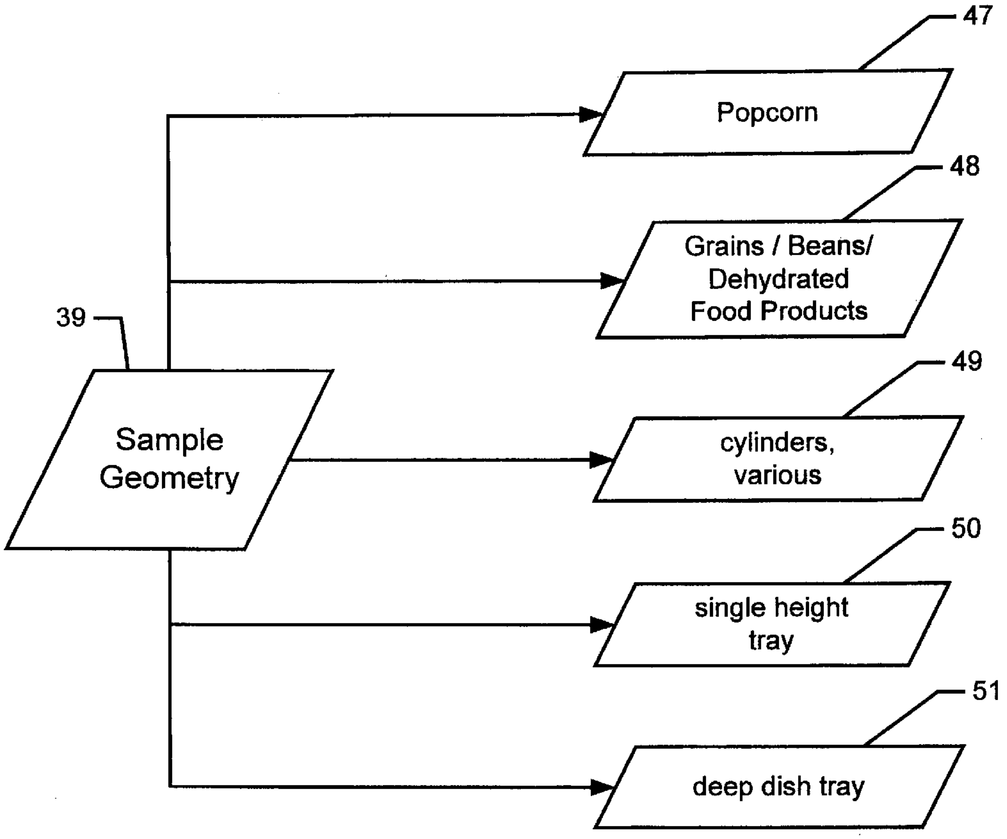
FIG. 10 illustrates a block diagram of the sample geometry group elements of FIG. 7*a*.
Figure 11:
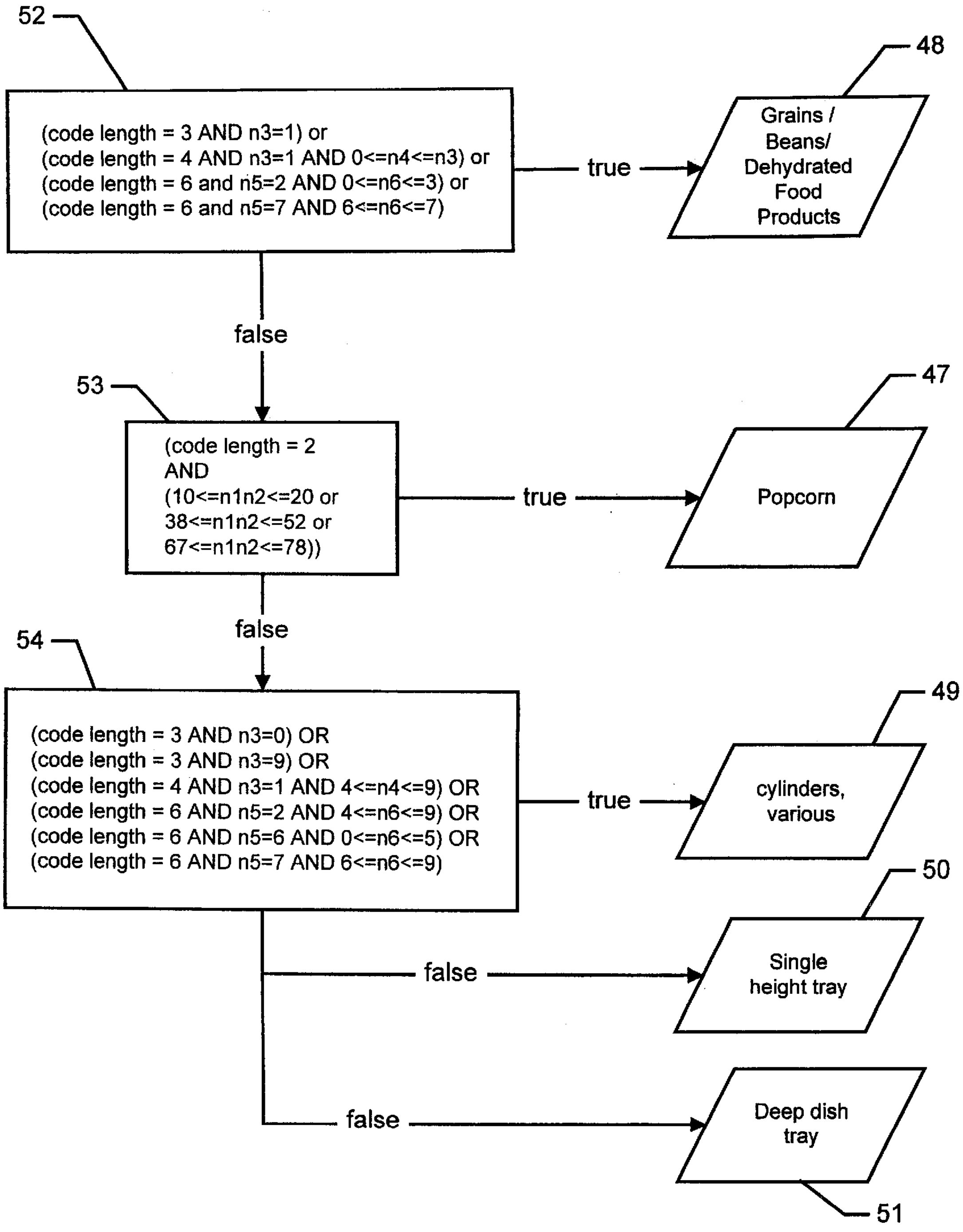
FIG. 11 illustrates a block diagram of the logical structures within the sample geometry group of FIG. 10.

The product sample geometry 39, FIG. 10 is interpreted or parsed into discrete product sample geometry types. If desired, the product sample geometry types may be classified as popcorn 47, grains/beans/dehydrated food products 48, various types of cylinders 49, single height tray 50, and deep dish tray 51. The positional or numerical string length of the externally derived predetermined code 24 determines the logical selection of the product sample geometry 39. If desired, the externally derived predetermined code 24's numeric string length is equal to three AND $n_3$ equal to one. This yields a logical true function OR the geometry of grains/beans/dehydrated food products 48, FIG. 11. Other logical OR functions in combination with the externally derived predetermined code 24's numeric string length equal to four and six are illustrated at 52, FIG. 11.

If the externally derived predetermined code 24's numeric string length (see 54, FIG. 11) is not equal to three, four, or six a logical false function is generated. If the externally derived predetermined code 24 and the code numeric string length are equal to two AND ($10<=n_1n_2<=20$) a logical true function is generated, yielding a popcorn geometry 47. Other examples of the interpretation of the externally derived predetermined code 24's numeric string length equal to two, in combination with a logical AND test that determine the popcorn geometry 47, are illustrated at 53, FIG. 11.

If the externally derived predetermined code 24's numeric string length is equal to three, four, or six and is NOT grains/beans/dehydrated food products geometry 48 or popcorn geometry 47, the sample geometry 39 requires further delineation. The sample geometry 39 is further delineated by determining if the geometry is various types of cylinders 49, single height tray 50, or deep dish tray 51. If the externally derived predetermined code numeric string length is equal to (code length=3 AND $n_3=0$)) OR (code length=3 AND $n_3=9$) OR (code length=4 AND $n_3=1$ AND $4<=n_4<=9$) OR (code length=6 AND $n_5=2$ AND $4<=n_6<=9$) OR (code length=6 AND $n_5=6$ AND $0<=n_6<=5$) OR (code length=6 AND $n_5=7$ AND $6<=n_6<=9$) a logical true function is generated, yielding various cylinders 49. If this determinations yields a logical false function the sample geometry 39 is either a single height tray 50 OR a deep dish tray 51.

Figure 12A:
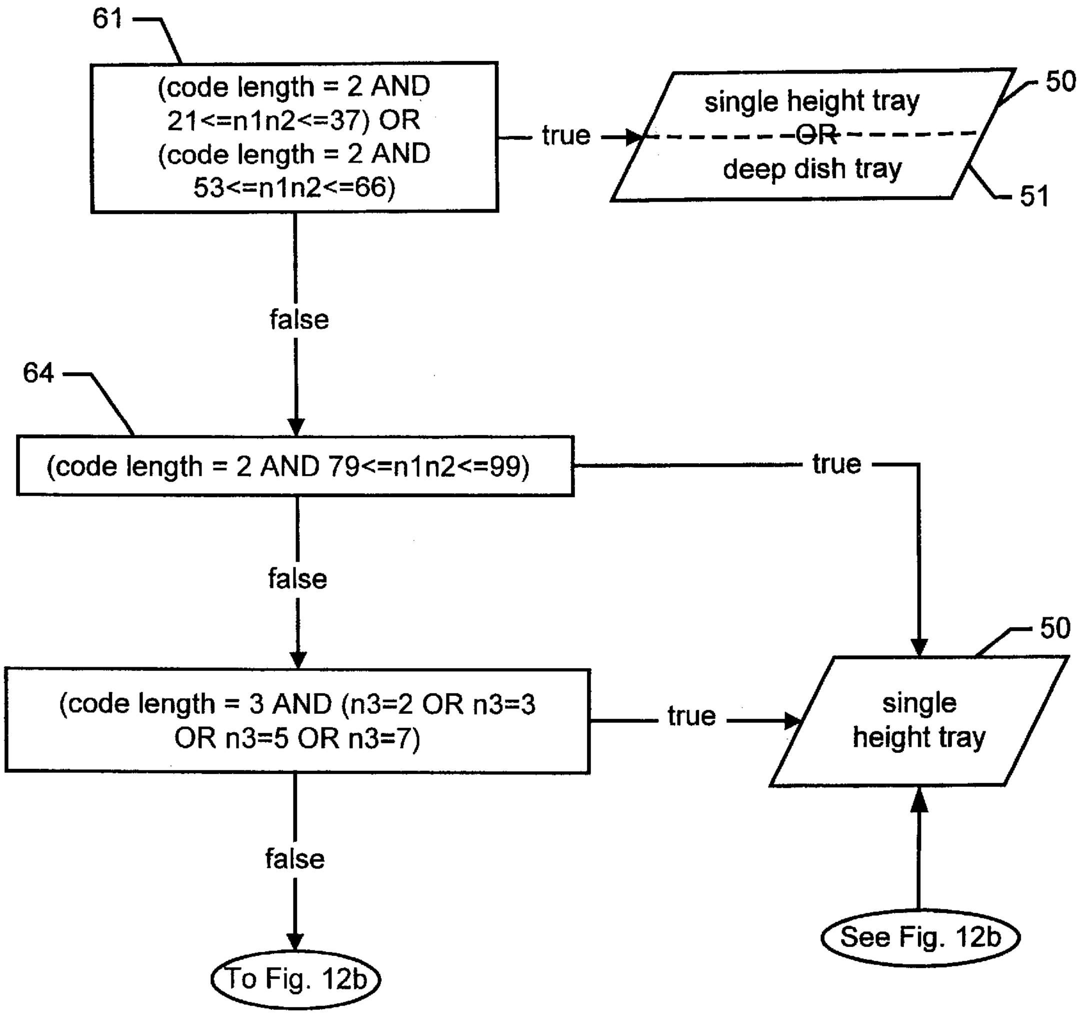
FIG. 12*a* illustrates a continuation of the block diagram of the logical structures within the sample geometry group of FIG. 10.
Figure 12B:
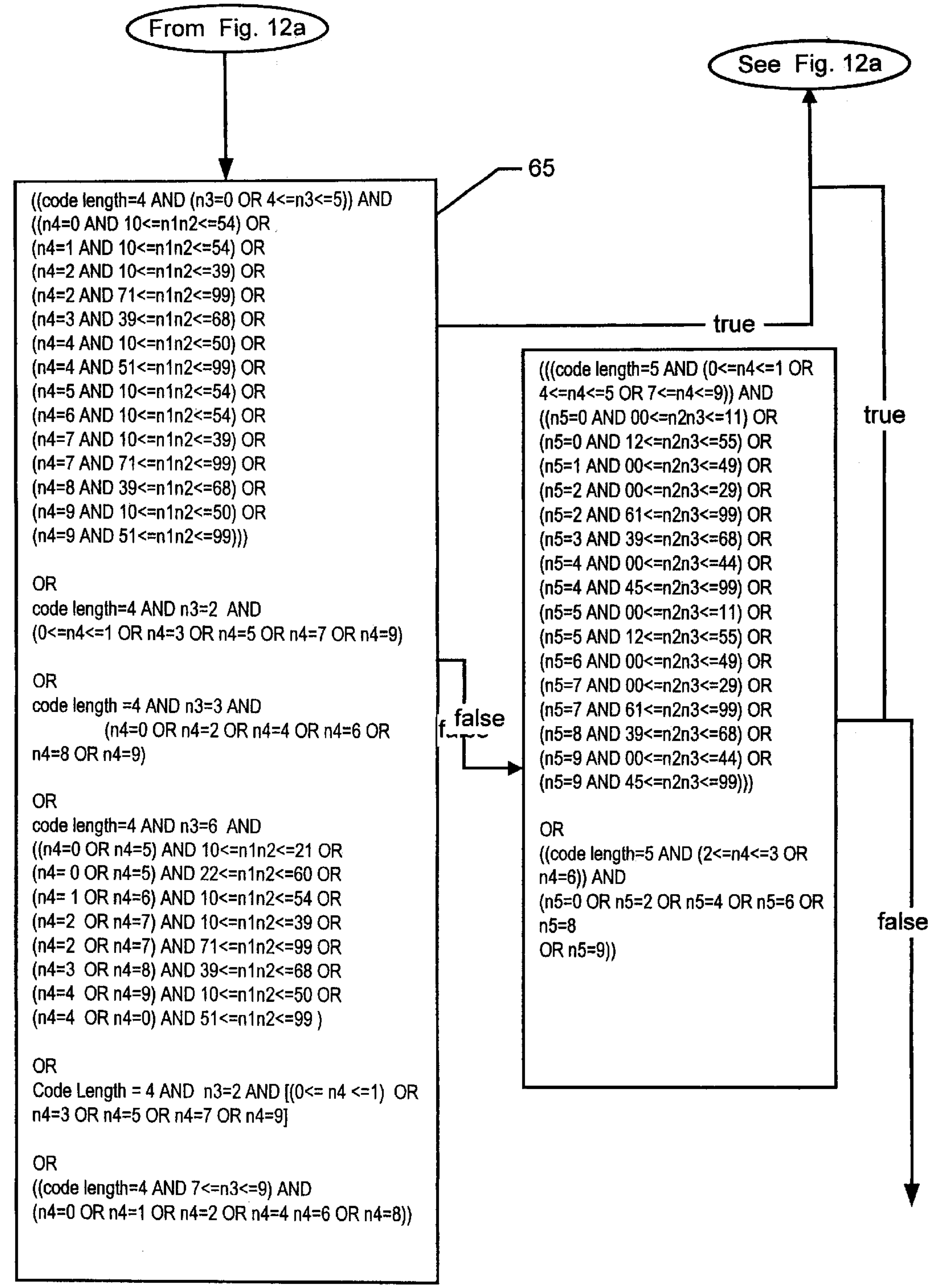
FIG. 12*b* illustrates a continuation of the block diagram of the logical structures within the sample geometry group of FIG. 10.
Figure 13:
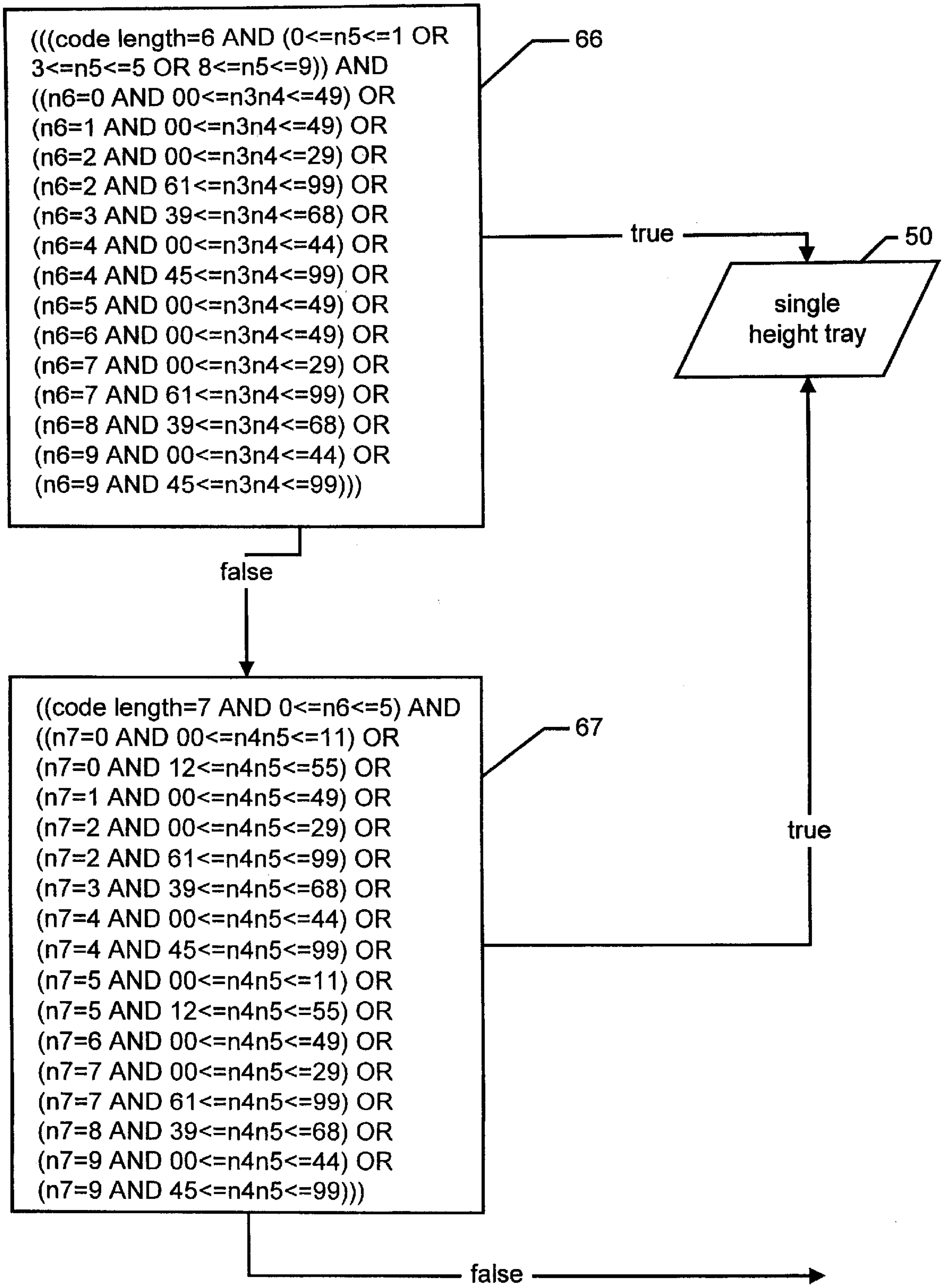
FIG. 13 illustrates a continuation of the block diagram of the logical structures within the sample geometry group of FIG. 10.

If the externally derived predetermined code numeric string length is equal to 2 AND $21<=n_1n_2<=37$ OR the externally derived predetermined code numeric string length is equal to 2 AND $53<=n_1n_2<=66$; (see 61, FIG. 12*a*) the sample geometry is a single height tray 50 OR a deep-dish tray 51, FIG. 12. If the externally derived predetermined code numeric string length is equal to 2 AND $79<=n_1n_2<=99$ (see 64, FIG. 12*a*), the sample geometry is a single height tray 50. If the externally derived predetermined code numeric string length is equal to 3 AND ($n_3=2$ OR $n_3=3$ OR $n_3=5$ OR $n_3=7$) the sample geometry is a single height tray 50. If the externally derived predetermined code numeric string length is equal to 4 AND ($n_3=0$ OR $4<=n_3<=5$ AND ($n_4=0$ AND $10<=n_1n_2<=54$ OR $n_4=1$ AND $10<=n_1n_2<=54$), the sample geometry is a single height tray 50. Examples of other logical OR functions that may, if desired, be added to this test for the sample geometry 39 are delineated at 65, FIG. 12*b* and 66, 67, FIG. 13.

Figure 14A:
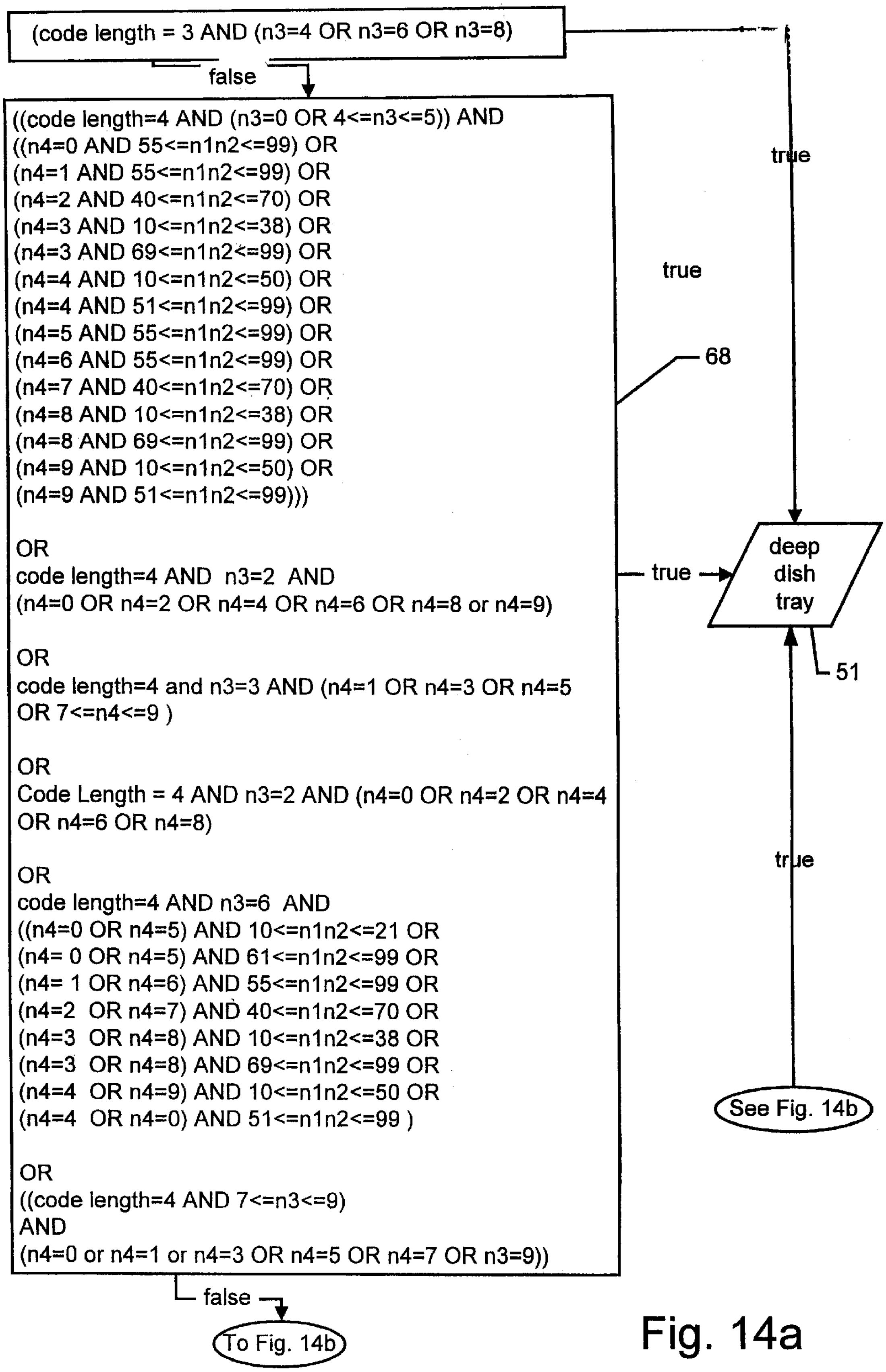
FIG. 14*a* illustrates a continuation of the block diagram of the logical structures within the sample geometry group of FIG. 10.
Figure 14B:
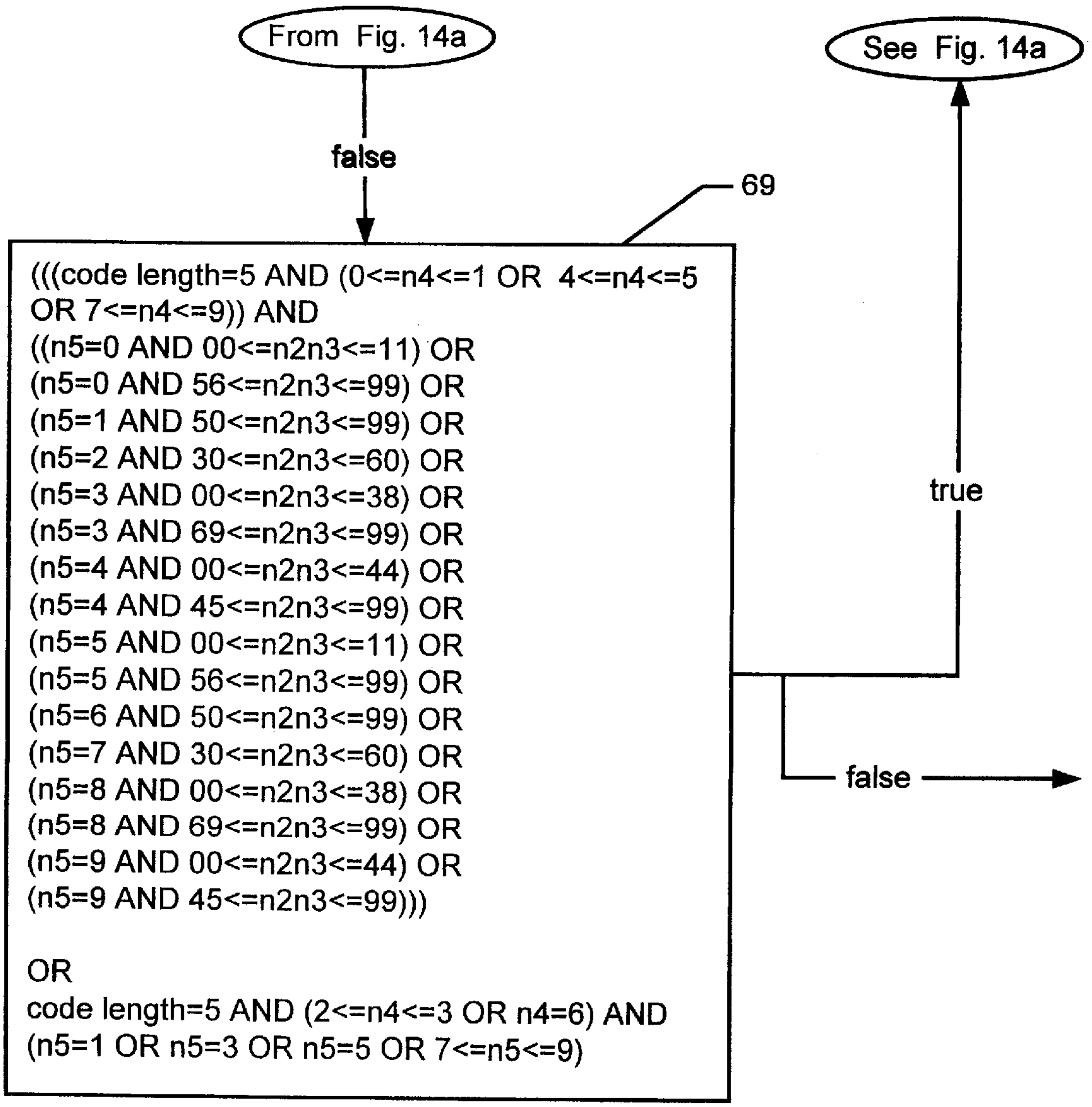
FIG. 14*b* illustrates a continuation of the block diagram of the logical structures within the sample geometry group of FIG. 10.
Figure 15:
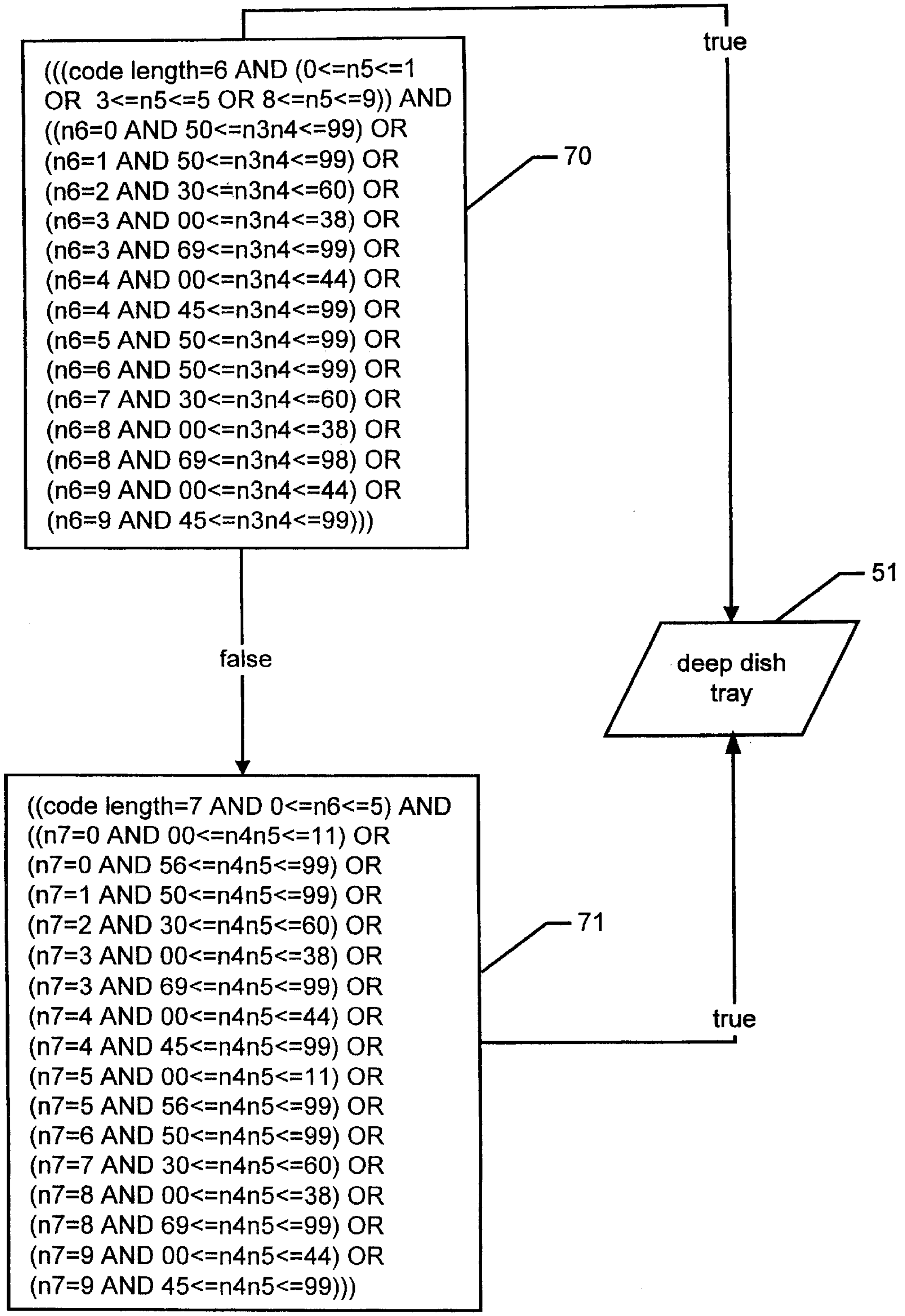
FIG. 15 illustrates a continuation of the block diagram of the logical structures within the sample geometry group of FIG. 10.

If the BIOS machine 18 has determined the sample geometry 39 is not a single height tray 50 or a cylinder 49 and the externally derived predetermined code numeric string length is equal to 3 AND ($n_3=4$ OR $n_3=6$ OR $n_3=8$) the sample geometry 39 is a deep dish tray 51, FIG. 14*a*. If this test for the sample geometry 39 is logically false and the externally derived predetermined code is equal to 4 AND ($n_3=0$ OR $4<=n_3<=5$) AND ($n_4=0$ AND $55<=n_1n_2<=99$ OR $n_4=1$ AND $55<=n_1n_2<=99$), the sample geometry 39 is a deep dish tray 51. Examples of other logical OR functions that may, if desired, be added to this test for the sample geometry 39 are delineated at 68, 69, FIG. 14*a* and 70, 71 FIG. 15.

Figure 16:
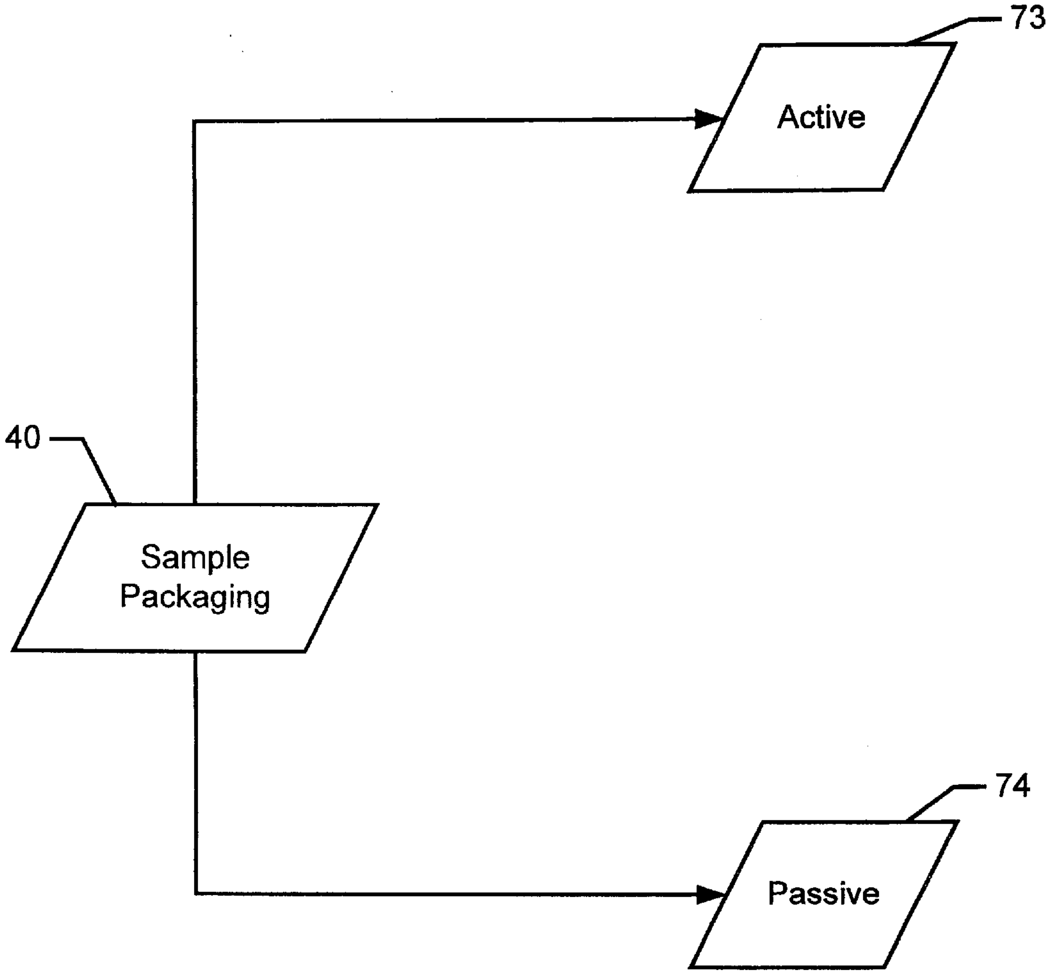
FIG. 16 illustrates a block diagram of the sample packaging group of FIG. 7*a*.

The sample packaging 40, FIG. 16 is interpreted or parsed into discrete product sample packaging types. If desired, the sample packaging may be classified as active 73 or passive 74. The active 73 designation denotes the incorporation of metallic microwave energy susceptors within the sample package 40 and passive 74 denotes the absence of metallic microwave energy susceptors within the sample package 40. The positional or numerical string length of the externally derived predetermined code 24 determines the logical selection of the sample packaging 40. If the desired externally derived predetermined code 24's numeric string length is equal to two AND ($21<=n_1n_2<=37$) OR ($79<=n_1n_2<=99$) the sample packaging 40 is passive 74. Examples of other logical OR functions that may, if desired, be added to this test for the sample packaging 76 are delineated at 76. If the desired externally derived predetermined code 24's numeric string length is equal to two AND ($10<=n_1n_2<=20$), the sample packaging 40 is active 73. Examples of other logical OR functions that may, if desired, be added to this test for the sample packaging 40 are delineated at 77.

Figure 18:
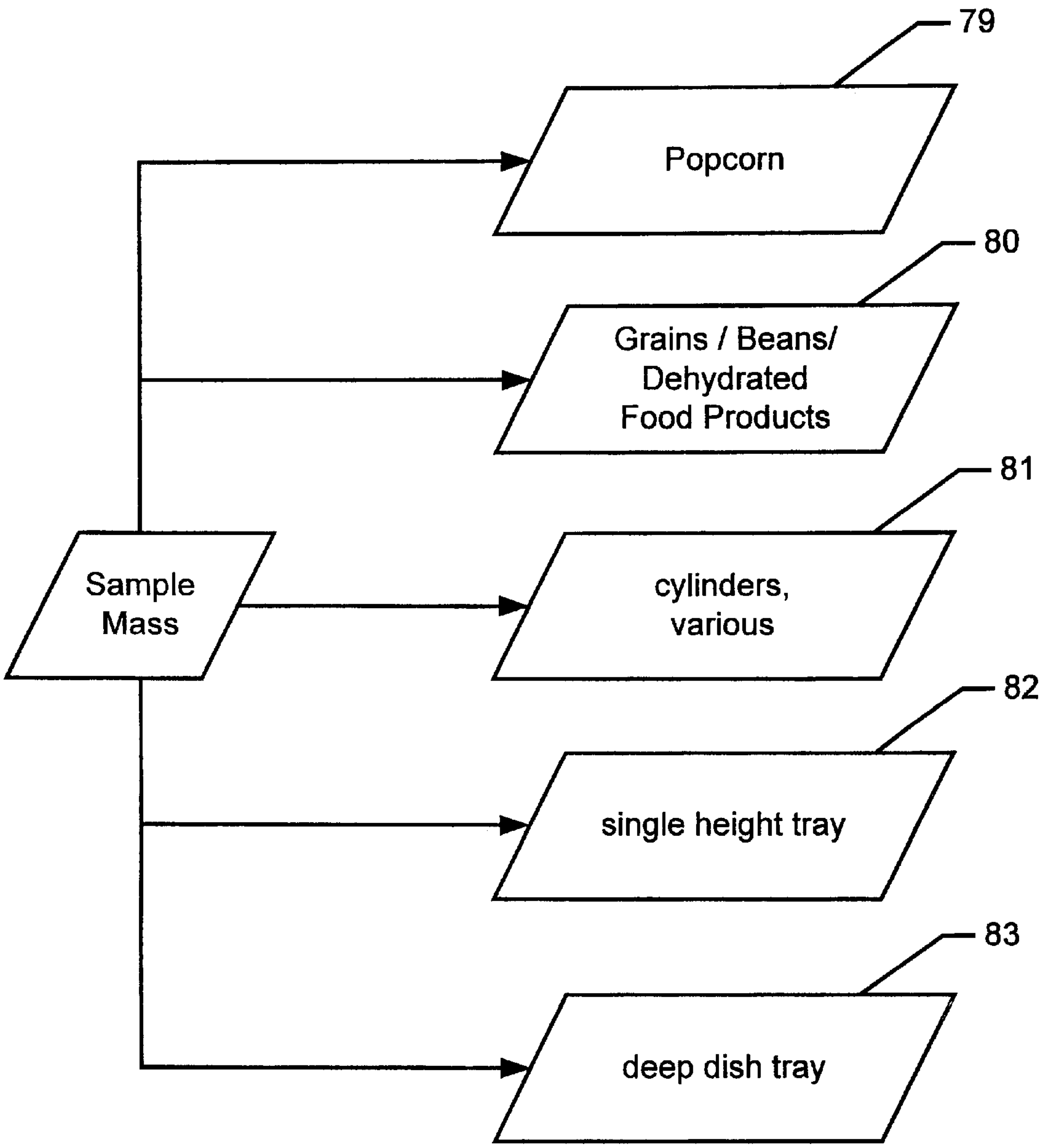
FIG. 18 illustrates a block diagram of the sample mass group of FIG. 7*a*.

The product sample mass 41, FIG. 18 is interpreted or parsed into discrete product sample mass 41 types. If desired, the product sample mass types 41 may be classified as popcorn 79, grains/beans/dehydrated food products 80, various types of cylinders 81, single height tray 82, and deep dish tray 83. The positional or numeric string length of the externally derived predetermined code 24 determines the logical selection of the product sample mass 41. If desired, the externally derived predetermined code 24's numeric string length may be equal to two AND; the sample geometry 39 is popcorn 47 AND ($10<=n_1n_2<=20$), then the returned sample mass 41 is equal to a range of 28 to 58 grams. If this test fails AND, the sample geometry 39 is popcorn 47 AND ($38<=n_1n_2<=52$) then the returned sample mass 41 is equal to a range of 58 to 87 grams. If this test fails AND, the sample geometry 39 is popcorn 47 AND ($67<=n_1n_2<=78$) then the return sample mass 41 is equal to a range of 88 to 100 grams (see 85, FIG. 19*a*).

If the sample geometry 39 is cylinders 49 AND, the externally derived predetermined code 24's numeric string length is equal to three AND $n_3=0$ then the return sample mass 41 is equal to a range of 4 to 8 oz. Examples of other determinations of the sample mass 41 and the sample geometry being cylinders 49 are delineated at 86, FIG. 19*a*.

If the sample geometry 39 is grains/beans/dehydrated food products 48 AND, the desired the externally derived predetermined code 24's numeric string length is equal to four AND ($n_3=1$ AND $n_4=0$) OR, the code numeric string length equals 6 AND $n_5=2$ AND $n_6=0$ then the return sample mass 41 is equal to 227 grams $H_2O$+dry component. If this test fails AND, the code numeric string length is equal to 3 AND ($n_3=1$) OR, the code numeric string length equals 4 AND ($n_3=1$) AND ($n_4=1$) then the return sample mass 41 is equal to 454 grams $H_2O$+dry component. If this test fails AND, the code numeric string length is equal to 4 AND ($n_3=l$ AND $n_4=2$) OR the code numeric string length equals to six AND ($n_5=2$ AND $n_6=2$), then the return sample mass 41 is equal to 681 grams $H_2O$+dry component. Examples of other determinations of the sample return mass 41 and the sample geometry being grains/beans/dehydrated food products 80 is delineated at 87, FIG. 19*b*.

Figure 19A:
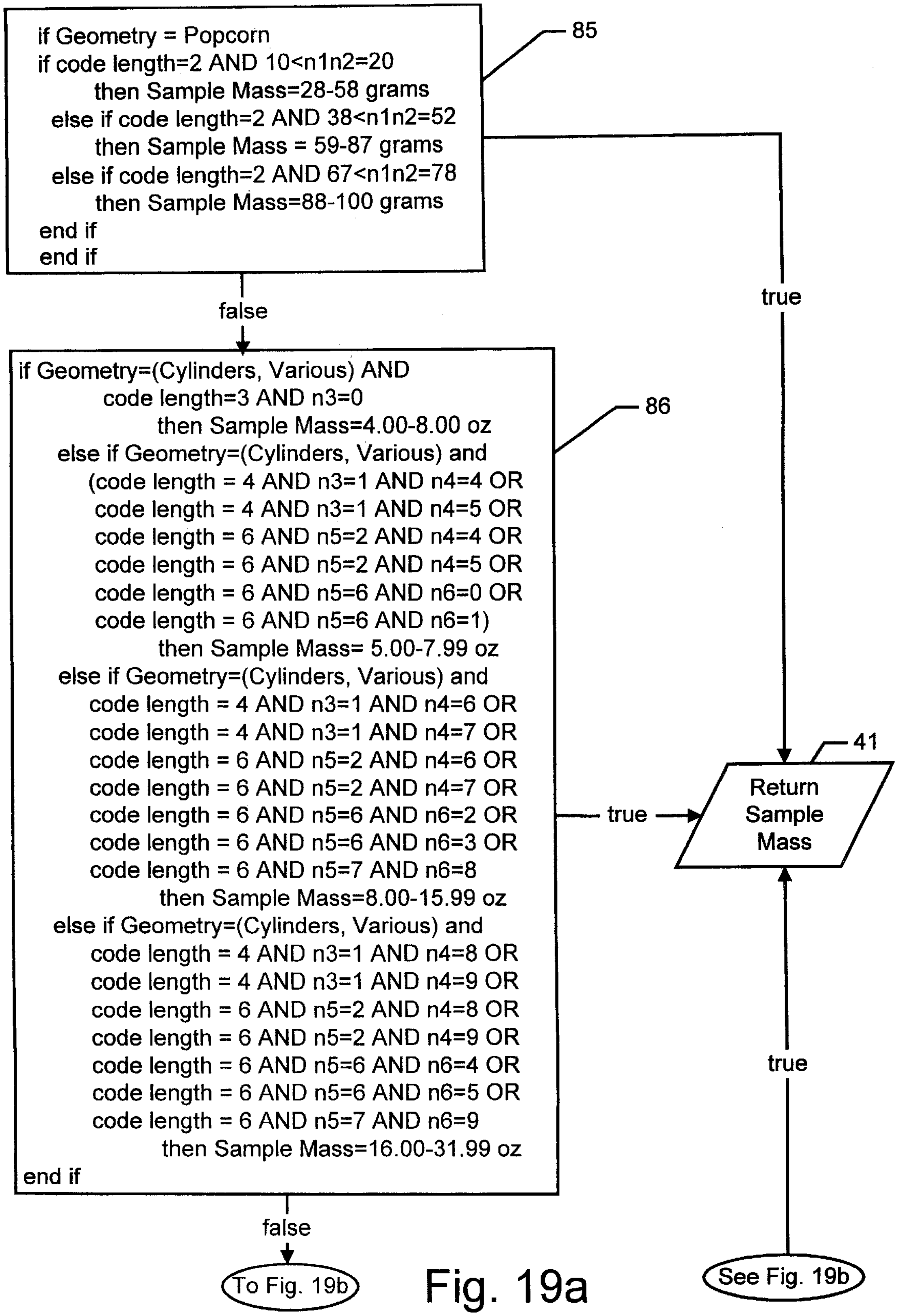
FIG. 19*a* illustrates a block diagram of the logical structures within the sample mass group of FIG. 18.
Figure 19B:
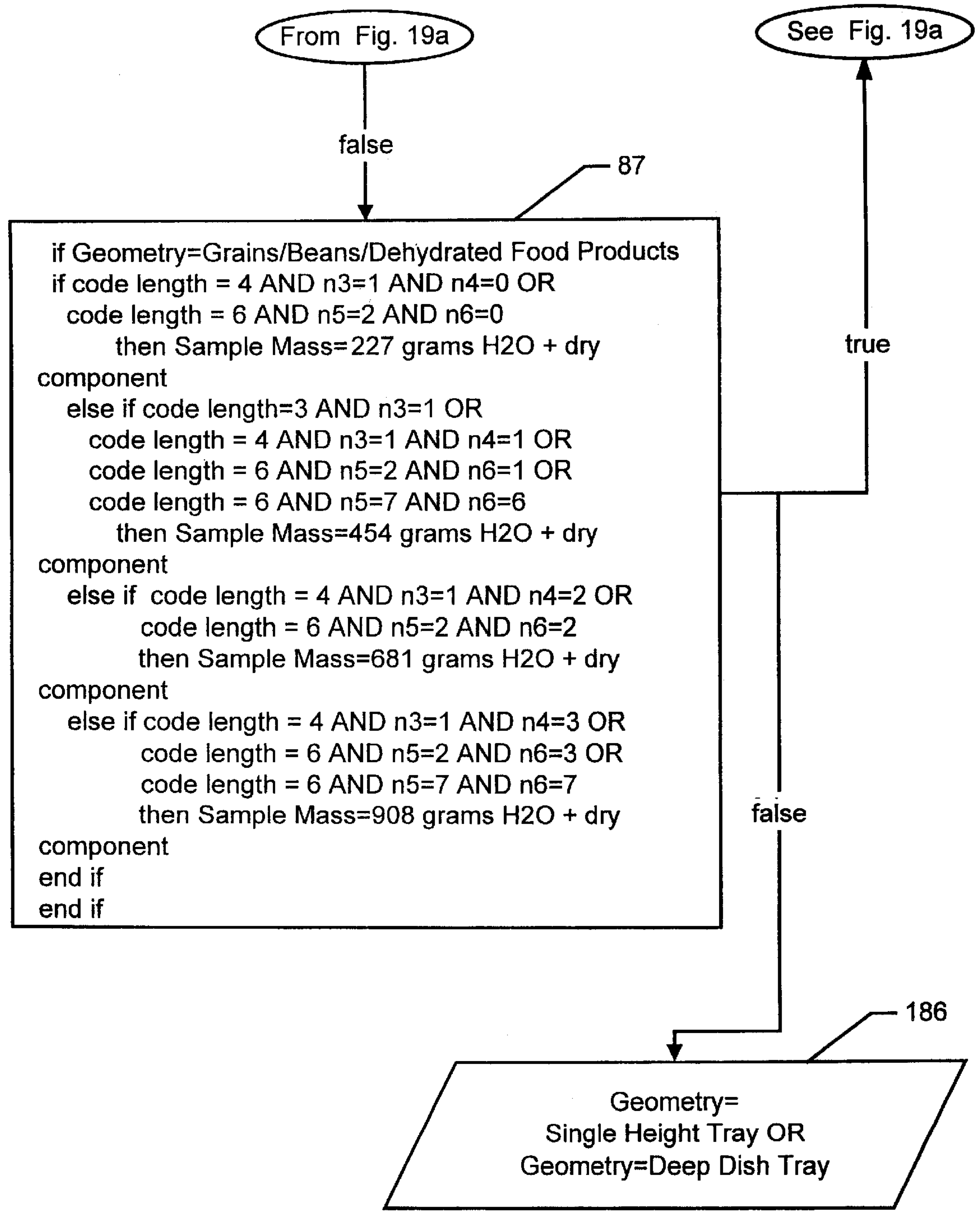
FIG. 19*b* illustrates a continuation of the block diagram of the logical structures within the sample mass group of FIG. 18.
Figure 20A:
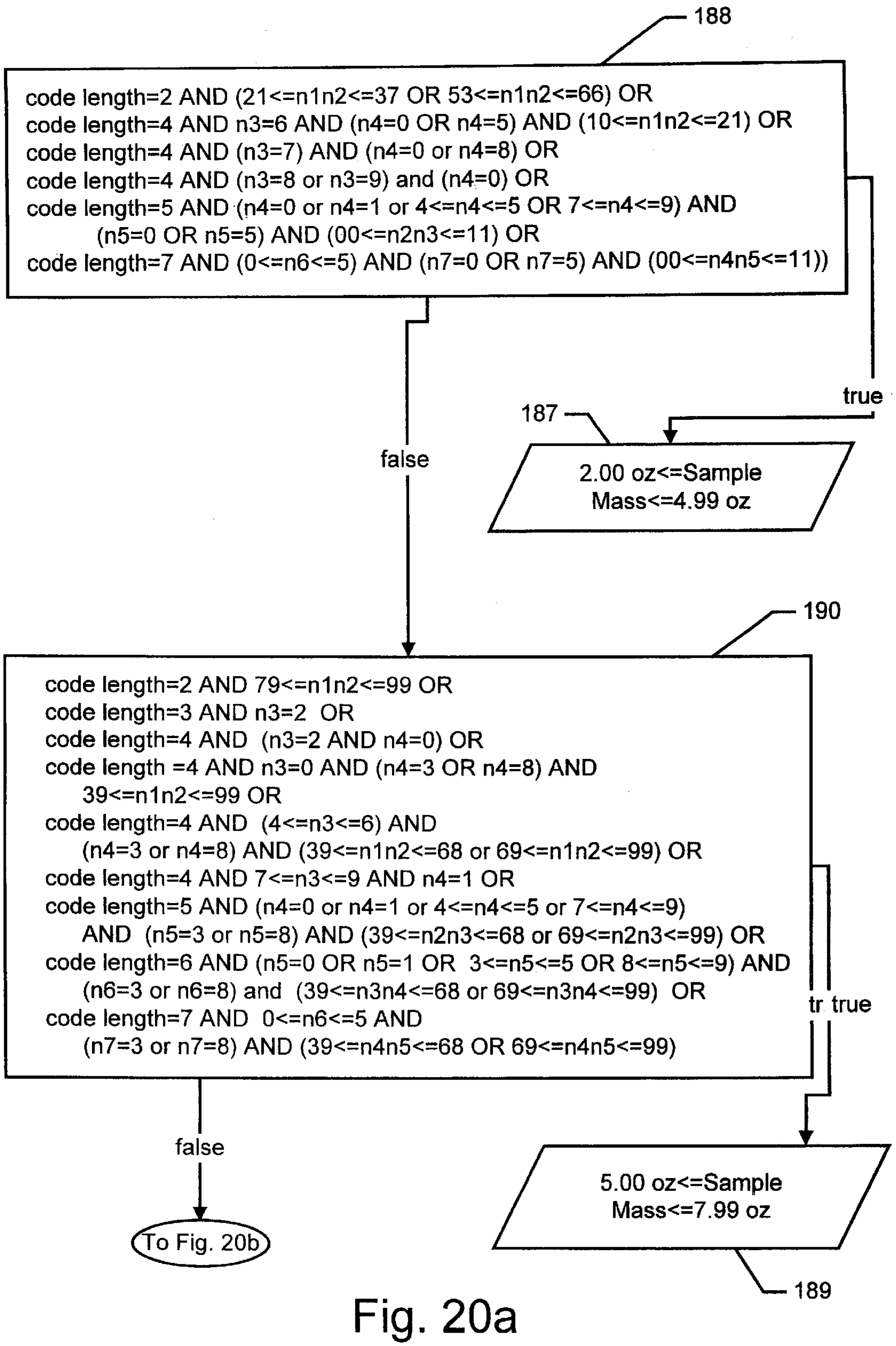
FIG. 20*a* illustrates a continuation of the block diagram of the logical structures within the sample mass group of FIG. 18
Figure 20B:
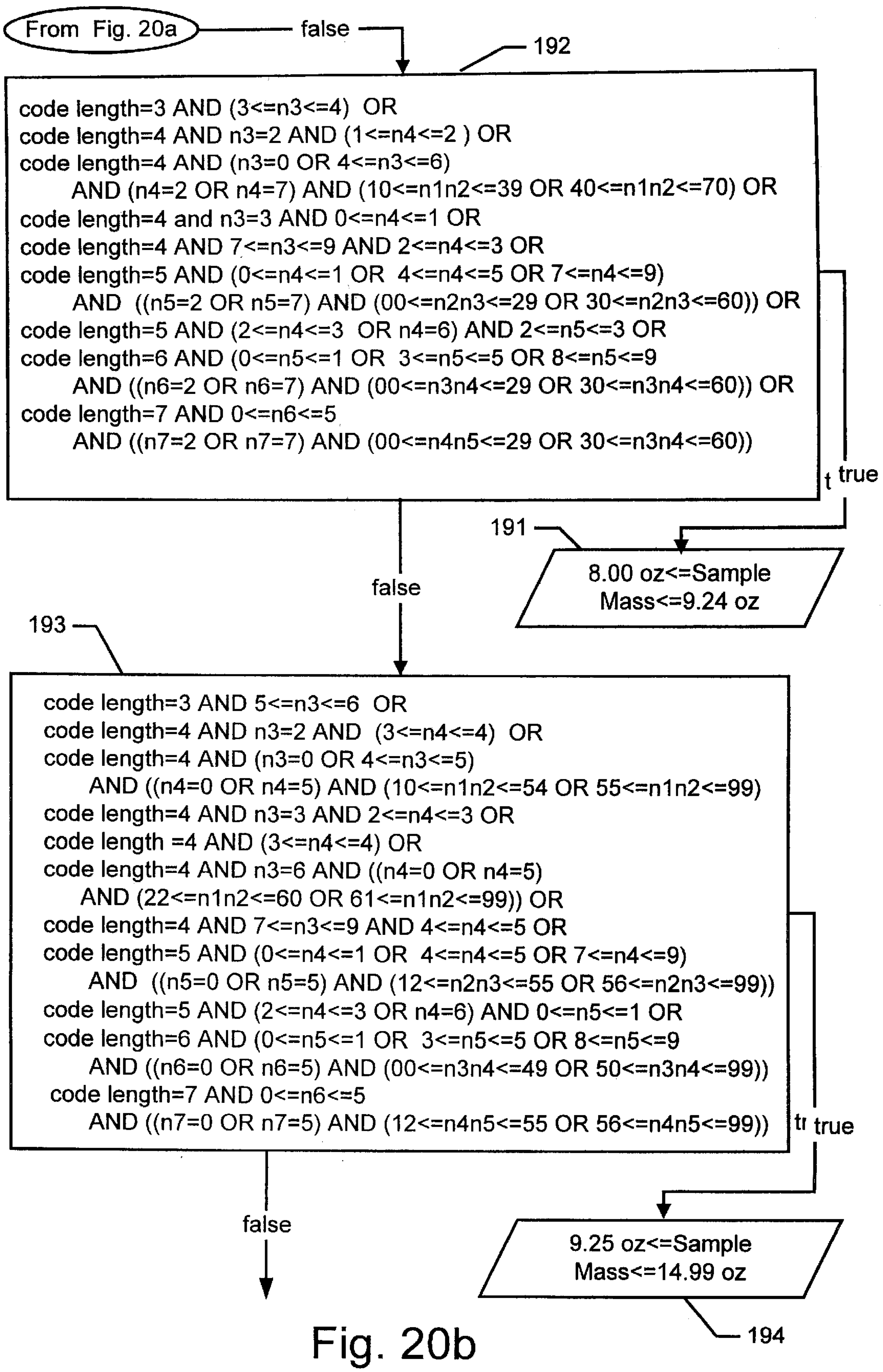
FIG. 20*b* illustrates a continuation of the block diagram of the logical structures within the sample mass group of FIG. 18
Figure 21A:
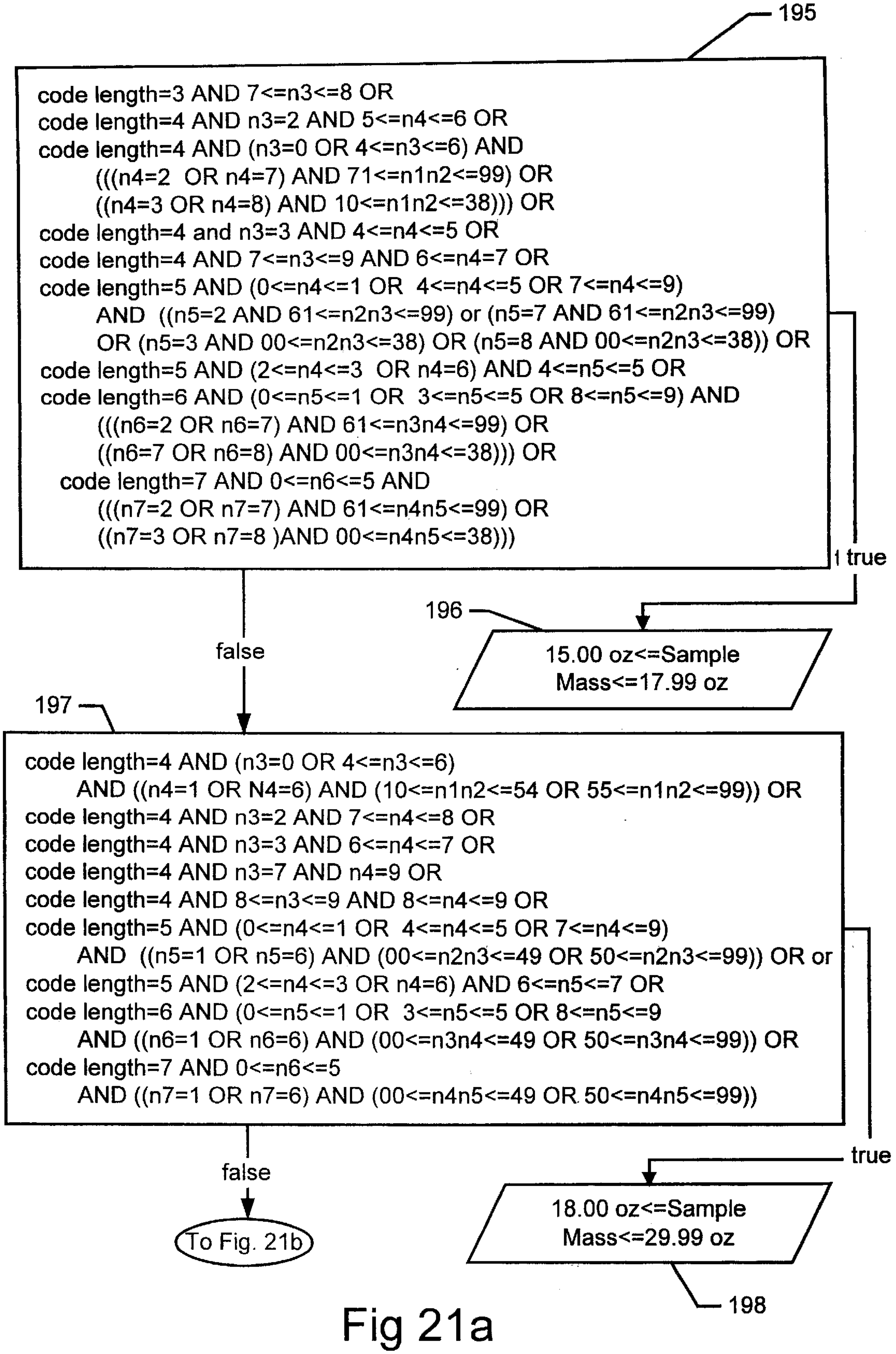
FIG. 21*a* illustrates a continuation of the block diagram of the logical structures within the sample mass group of FIG. 18.
Figure 21B:
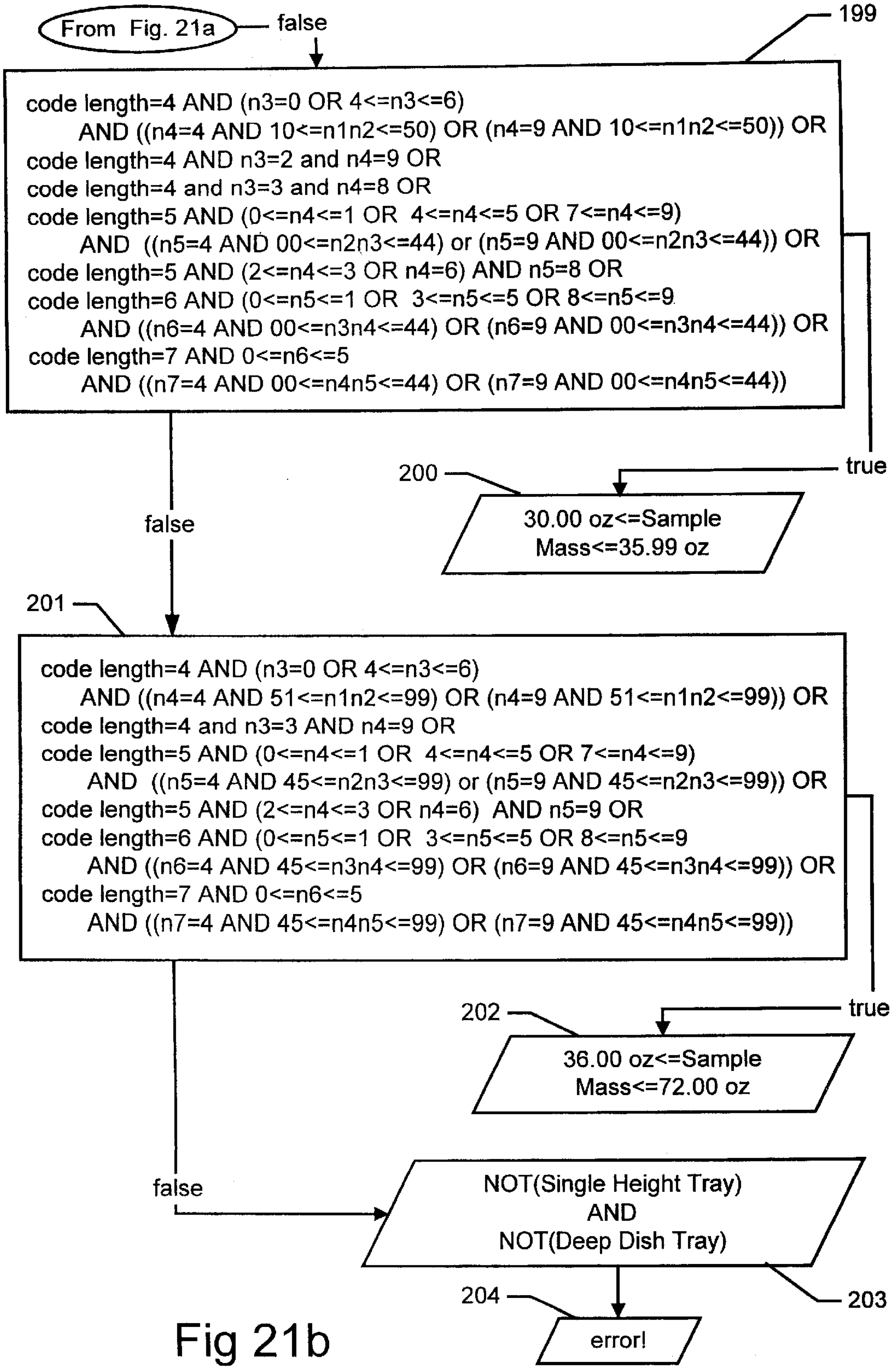
FIG. 21*b* illustrates a continuation of the block diagram of the logical structures within the sample mass group of FIG. 18.
Figure 23A:
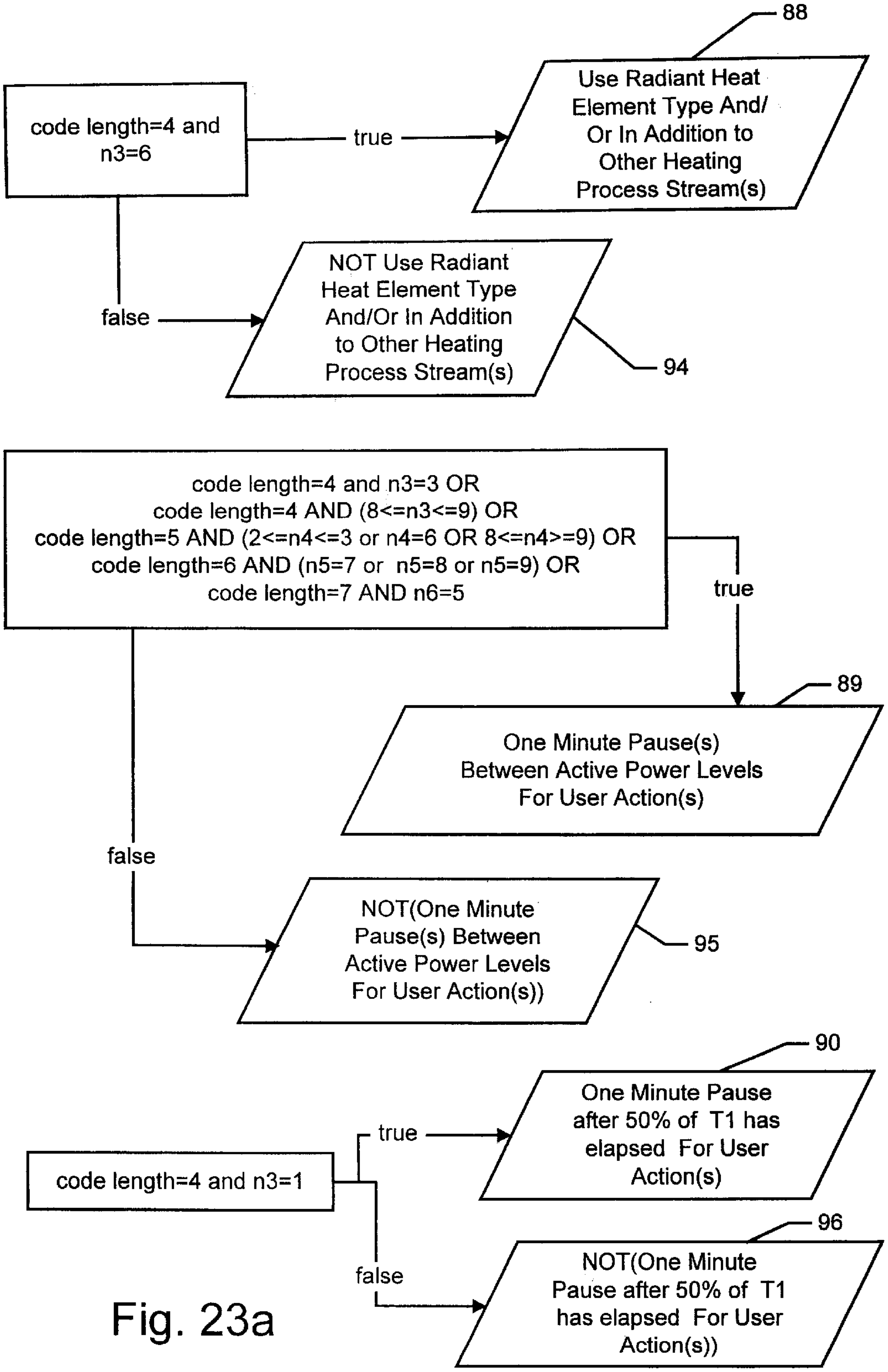
FIG. 23*a* illustrates a block diagram of the logical structures within the special feature request function of FIG. 22.
Figure 23B:
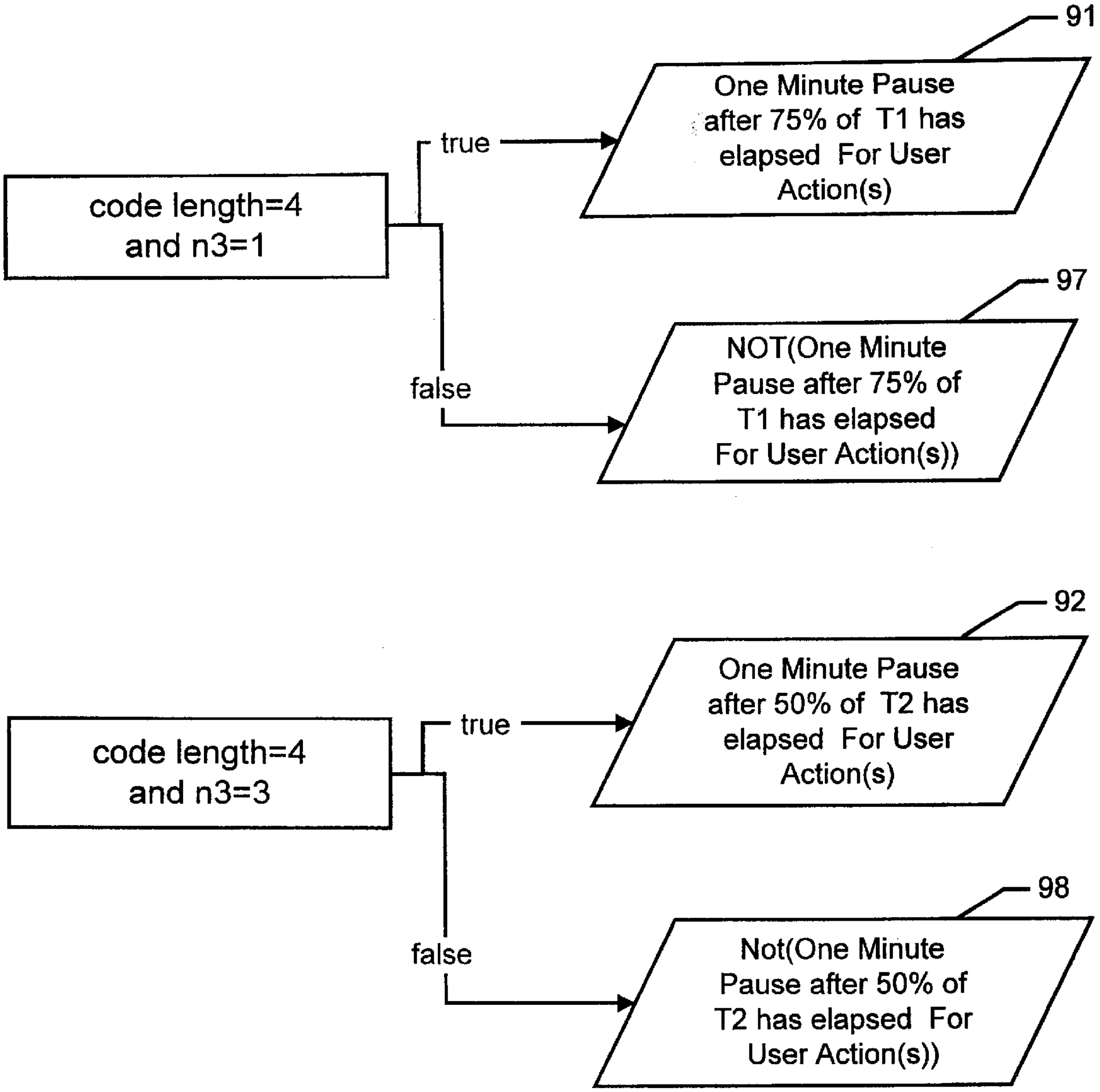
FIG. 23*b* illustrates a block diagram of the logical structures within the special feature request function of FIG. 22.

If the sample geometry 39 (see 188, FIG. 20*a*.) is a single height tray or a deep dish tray 186, FIG. 19*a* AND, the desired externally derived predetermined code 24's numeric string length is equal to two AND ($21<=n_1n_2<=37$ OR $53<=n_1n_2<=66$) OR the code numeric string length equals 4 AND $n_3=6$ AND ($n_4=0$ OR $n_5=5$) AND ($10<=n_1n_2=21$) then the return sample mass 41 is between 2 and 4.99 ounces (see 187, FIG. 20*a*). Examples of other determinations of the sample return mass 41 and the sample geometry being a single height tray or deep dish tray 186 are delineated at 188, FIG. 20*a*. If this test fails AND, the code numeric string length is equal to 2 AND $79<=n_1n_2<=99$ OR the code numeric string length equals to three AND ($n_3=2$) (see 189, FIG. 20*a*) then the return sample mass 41 is between 5 and 7.99 ounces. Examples of other determinations of the sample return mass 41 and the sample geometry, single height tray or deep dish tray 186, are delineated at 190, FIG. 20*a*. If this test fails AND, the code numeric string length is equal to 3 AND $3<=n_3<=4$ OR the code numeric string length equals to four AND ($n_3=0$ OR $4<=n_3<=6$) AND ($n_4=2$ OR $n_4=7$) AND ($10<=n_1n_2<=39$ OR $40<=n_1n_2<=70$) (see 192,. FIG. 20*a*) then the return sample mass 41 is between 8.0 and 9.24 ounces (see 191, FIG. 20*a*). Examples of other determinations of the sample return mass 41 and the sample geometry being a single height tray or deep dish tray 186 are delineated at 192, FIG. 20*b*. If this test fails AND, the code numeric string length is equal to 3 AND $5<=n_3<=6$ OR the code numeric string length equals to four AND $n_3=2$ AND $3<=n_4<=4$ (see 193, FIG. 20*b*) then the return sample mass 41 is between 9.25 and 14.99 ounces (see 194, FIG. 20*b*). Examples of other determinations of the sample return mass 41 and the sample geometry being a single height tray or deep dish tray 186 are delineated at 193, FIG. 20*b*. If all of the above tests fail to select the sample geometry being single height tray or deep dish tray 186 similar logical test 195, 197, 199, FIG. 23, 201, FIG. 21*b* are performed yielding the determination of the sample mass 41 being as delineated in 196, 198, 200, and 202 respectively. If all of the above logical tests fail 203 to determine the sample mass 41 being a single height tray or a deep dish tray and error 204 occurs. When the error 204 occurs an indication of that error is transmitted to the user via keypad 14. The indication may, if desired, be a visual message displayed on the keypad 14 instructing the user to reenter the externally derived predetermined code 24.

Figure 22:
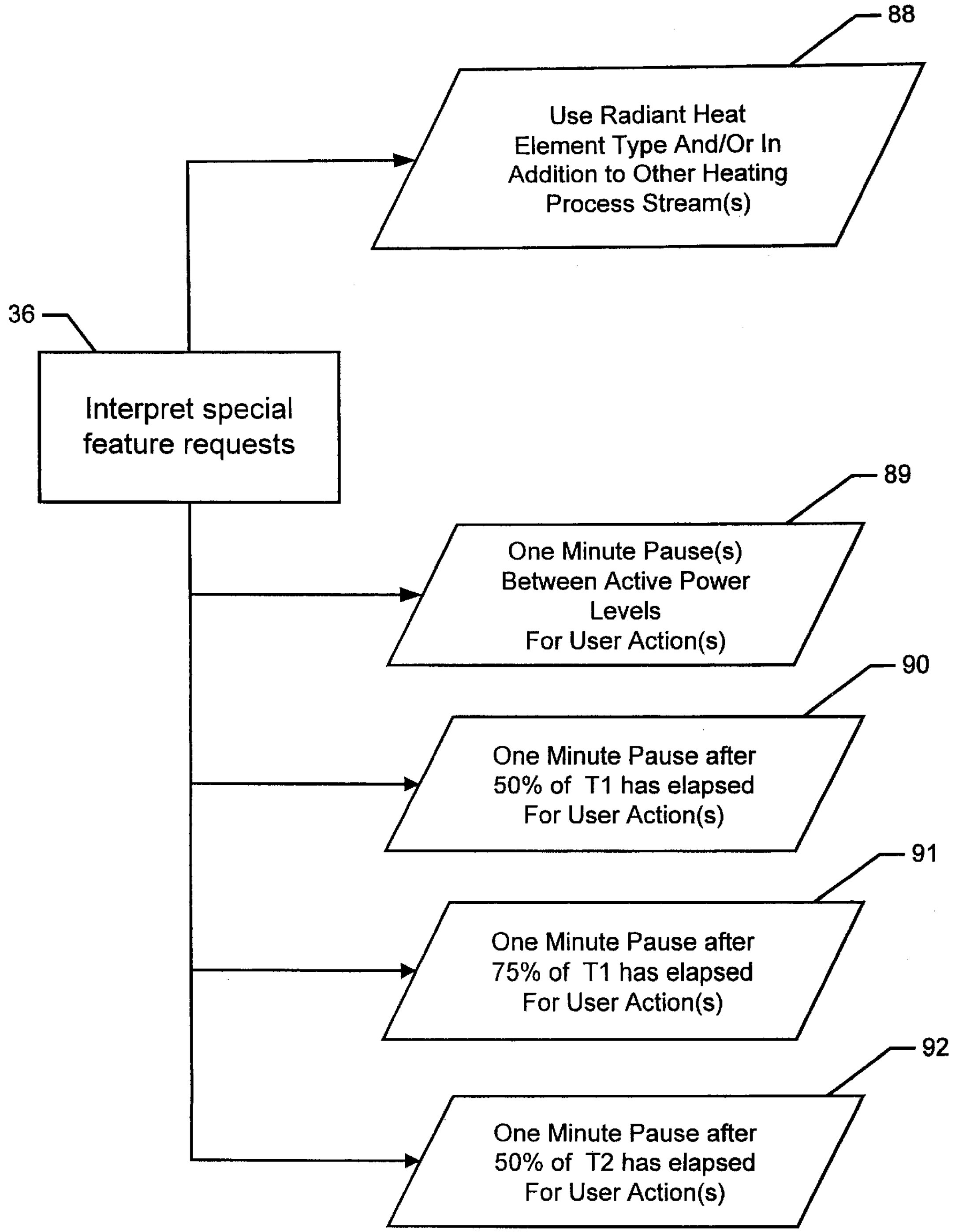
FIG. 22 illustrates a top-level block diagram of the special feature request function of the FIG. 6*a*.

The interpret special features request 36, FIG. 22 is interpreted or parsed into discrete feature types. If desired, the interpret special features request 36 may be classified as a radiant heat element, convection microwave heating combination, quartz heat element, or any other microwave-additional heating process combination. The interpret special features request 36 may, if desired, be other heating process streams 88, FIG. 23*a* one minute pause(s) between active power levels for user action(s) 89, one minute pause after 50% of $T_1$ has elapsed for the user's action(s) 90, one minute pause(s) between active power levels for user action (s) 89, one minute pause after 75% of $T_1$ has elapsed for the user's action(s) 91, one minute pause(s) between active power levels for user action(s) 89, and one minute pause after 50% of $T_2$ has elapsed for the user's action(s) 92. The positional or numeric string length of the externally derived predetermined code 24 determines the logical selection of the interpret special features request 36. If desired, the externally derived predetermined code 24's numeric string length may be equal to four AND ($n_3=6$) then the use radiant heat element (as discussed herein) in addition to other heating process stream 88, FIG. 23*a* is selected. If this test fails, a NOT function is generated 94 in relation to the use radiant heat element in addition to other heating process stream 88.

If the code numeric string length is equal to four AND ($n_3$=3) OR, the code numeric string length is equal to four AND (8<=$n_3$<=9) then the one minute pause(s) between active power levels for user action(s) 89, FIG. 23*a* is selected. If this test fails, a NOT function 95 is generated in relation to the one minute pause(s) between active power levels for user action(s) 89. If the code numeric string length is equal to four AND ($n_3$=1), then the one minute pause after 50% of $T_1$ has elapsed for the user's action(s) 90 is selected. If this test fails, a NOT finction 96 is generated in relation to the one minute pause after 50% of $T_1$ has elapsed for the user's action(s) 90. If the code numeric string length is equal to 4 AND ($n_3$=3), then the one minute pause after 50% of $T_2$ has elapsed for the user's action(s) 92 is selected. If this test fails, a NOT finction is generated 98 in relation to the one minute pause after 50% of $T_2$ has elapsed for the user's action(s) 92. If the code numeric string length is equal to 4 AND ($n_3$=1), then the one minute pause after 75% of $T_1$ has elapsed for the user's action(s) 91 is selected. If this test fails, a NOT function is generated 97 in relation to the one minute pause after 75% of $T_1$ has elapsed for the user's action(s) 91.

Figure 24:
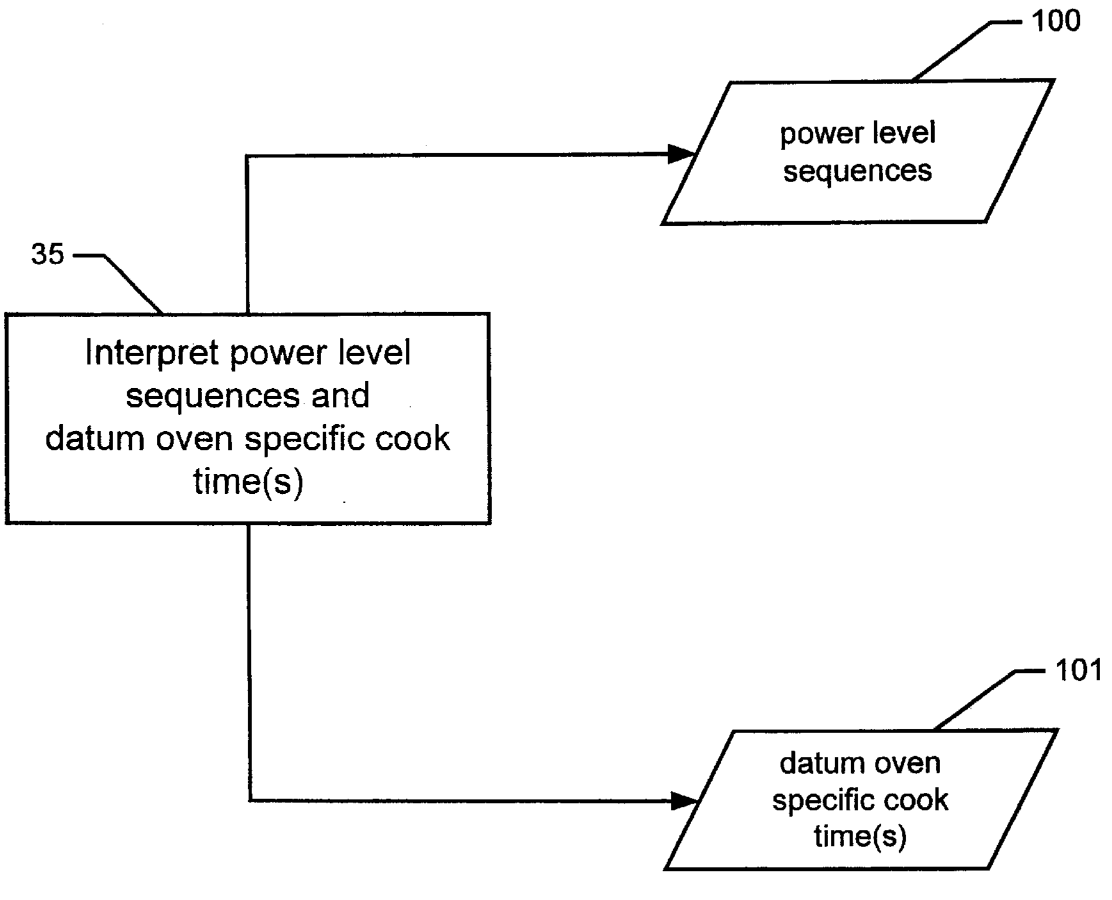
FIG. 24 illustrates a top-level block diagram of the power level sequence of the FIG. 6*a*.
Figure 25:
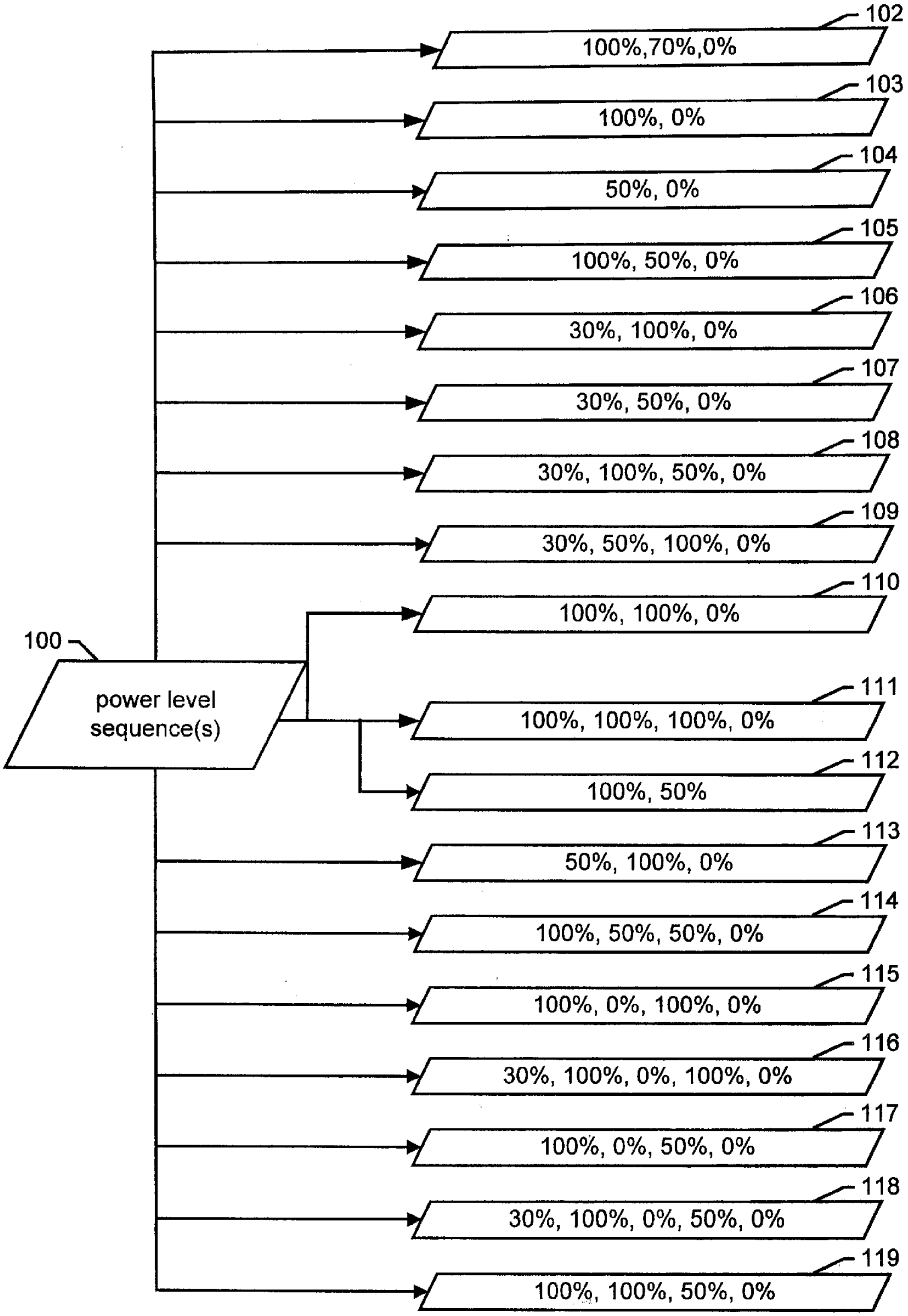
FIG. 25 illustrates a top-level block diagram of the interpreted power level sequence of FIG. 24.

The interpret power level sequence and datum specific cook time(s) 35, FIG. 24, is interpreted or parsed into two discrete areas, i.e., power level sequence 100 and datum oven specific cook times(s) 101. The power level sequence 100 is grouped into one of eighteen categories, which are listed as 102 to 119, FIG. 25. The positional or numeric string length of the externally derived predetermined code 24 determines the logical selection of the power level sequence 100. If the desired code numeric string length 24 is equal to two, OR four AND (0<=$n_3$<=1) (see 121, FIG. 26) then the power level sequence is $PL_1$=100% and $PL_2$=0%. If the code numeric string length is equal to four AND ($n_3$=5) OR, the code numeric string length equals four AND ($n_3$=6) then the power level sequence is $PL_1$=50% and $PL_2$=0%. Other power level sequences using the positional notation, logical functions, and numeric representation of desired power level(s) as delineated above are illustrated at 123 to 130, FIG. 26 and 131 to 138, FIG. 27.

Figure 28:
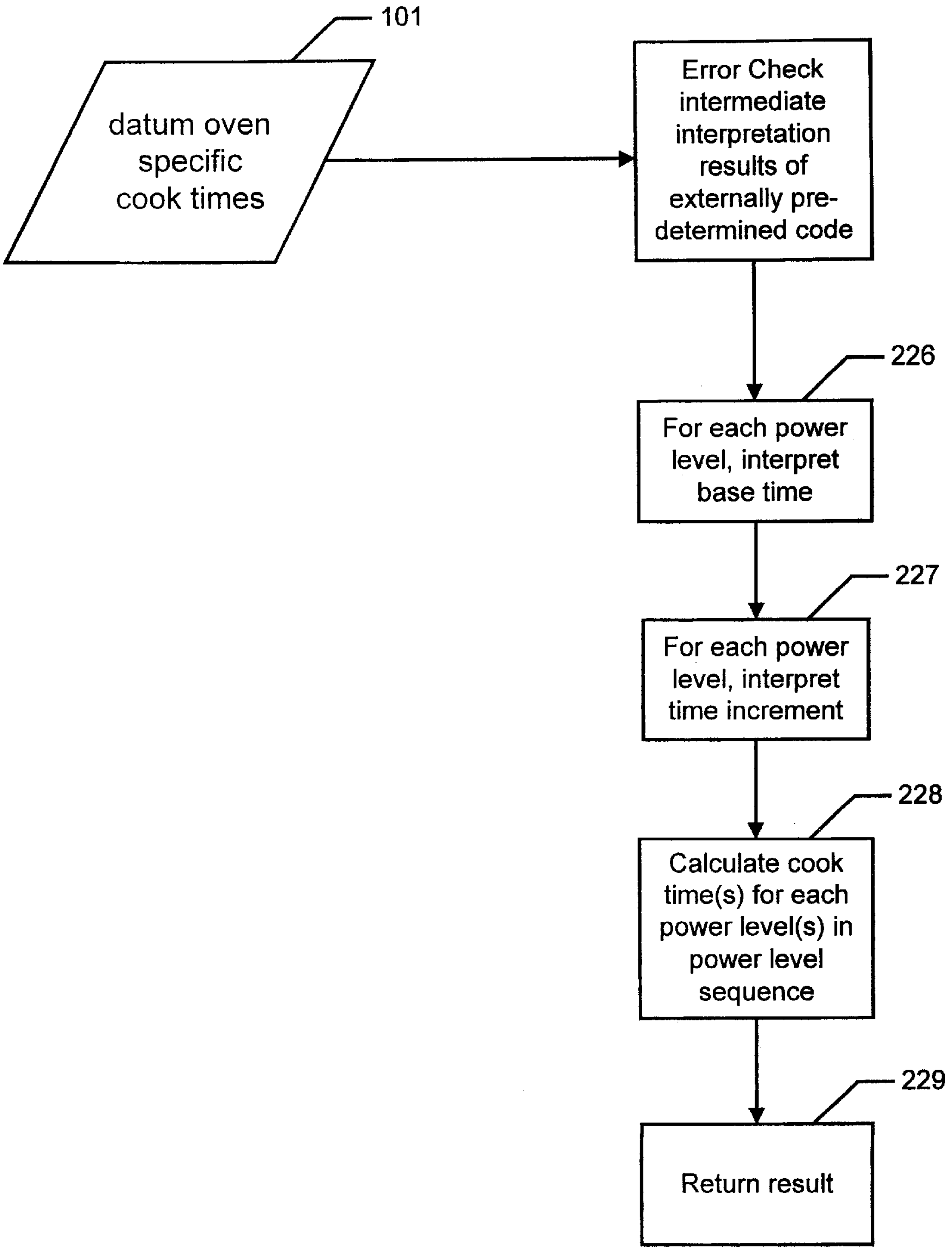
FIG. 28 illustrates a top level block diagram of the datum oven specific cook time(s) of FIG. 6*a*.

Once the power level sequence 100 is determined by the present invention 10 the datum oven specific cook time 101, FIG. 28 is derived. The accuracy of the externally derived predetermined code 24's numeric string length has been verified and interpretation of the code's numeric string length and positional notation have been determined 131225. Each power level sequence 121 to 138 has an associated interpreted base time 226. The base time is an empirically derived time period for cooking selected types of food products of particular starting state, composition, mass, packaging geometry, and packaging characteristics (as delineated above). This time period serves to form a base from which the selected food product(s) generally respond to an increase in internal, external, or ambient increases in thermal activity in a given period of time 226. The present invention 10 also determines the variations of cooking time to be applied to the base time or interpreted incremental values 229. The total cook time(s) is now calculated 228 for each power level sequence interpreted from the externally derived predetermined code 24 and a result 229 is returned to the present invention 10.

Figure 29:
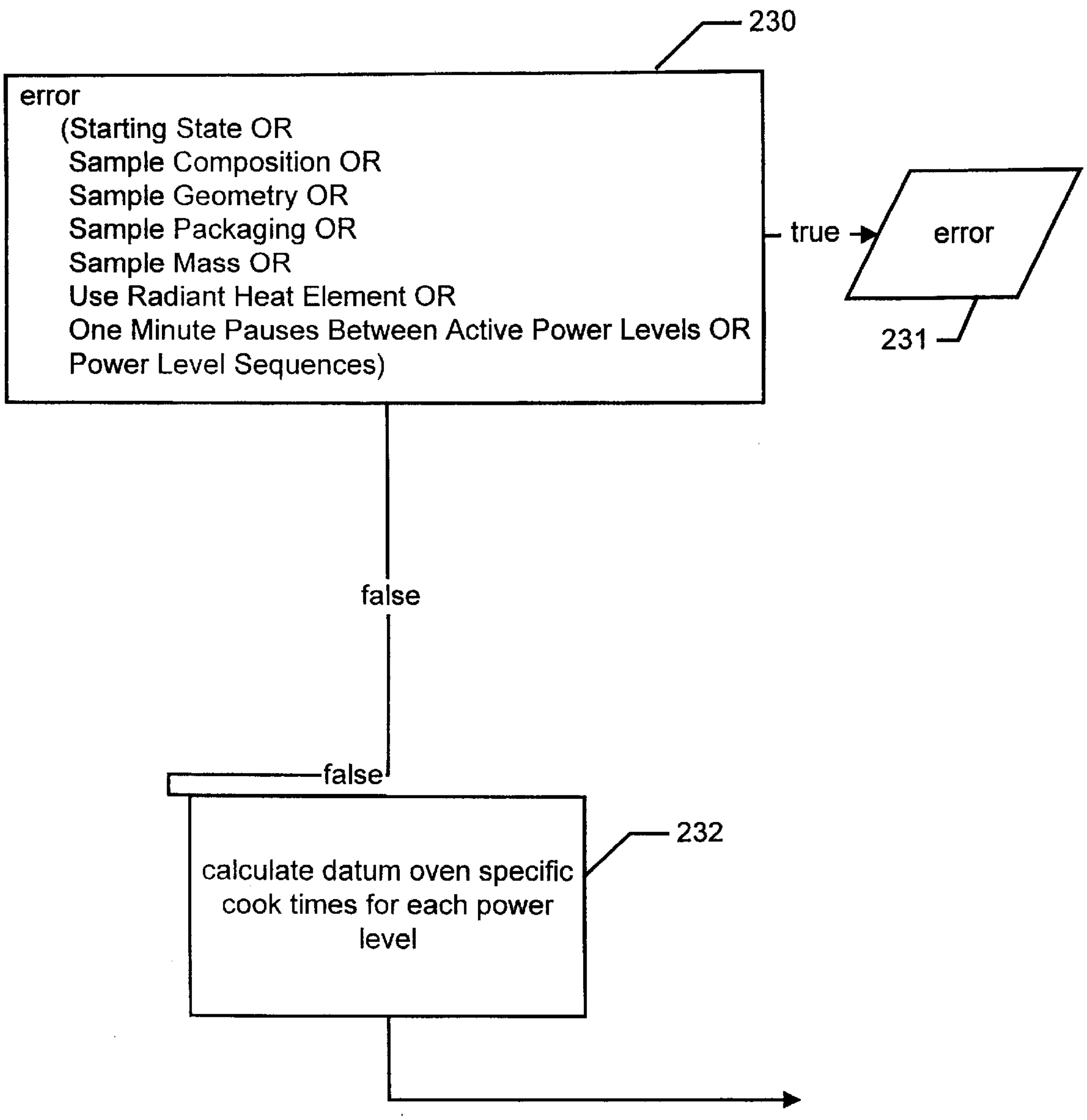
FIG. 29 illustrates a more detailed block diagram of the oven specific cook time(s) of FIG. 28.

In general the present invention 10 interprets (as delineated above) the externally derived predetermined code 24 (see 230, FIG. 29) to determine the starting state 37, sample composition 38, sample geometry 39, sample packaging 40, sample mass 41, the use of a radiant heat element 88, FIG. 22 or other special heating features, or the use of minute pauses between or during active power levels or power level sequences 89. After the externally derived predetermined code 24 is interpreted and no errors were generated 231, the datum oven specific cook times for each power level sequence are determined 232. The results returned from this processing are transmitted to the BIOS output object for transmission to the host microwave oven 12. The present invention 10, if desired, may contain a work manager class 20 to provide operational work features in concert with the BIOS machine class 18.

The work manager class 20 controls the work performed on a specimen disposed within the confines of the host microwave oven. The work manager class 20 is in interactive communications with the BIOS machine class 18. The BIOS machine class 18 periodically polls a sensor(s) operatively connected within the host microwave oven 12 for detecting the power consumed by the host microwave oven's magnetron tube. The externally derived predetermined code 24 that is entered into keypad 14 by the user delineates the work characteristic cooking instruction set particular to the selected specimen. The interpretive BIOS machine class 20 receives the externally derived predetermined code 24 along with the power data that is transmitted from the power sensor. The BIOS machine class 18 transmits the power data to the work manager class 20 for processing.

The work manager class 20 receives the power data and transforms it into an instruction set of commands for work the to be performed on the specimen by the microwave oven. The result of this operation is that the microwave oven's magnetron tube (or physical, chemical, or thermodynamic process stream) delivers the required work to the specimen (as delineated in U.S. Pat. No. 5,883,801).

Figure 30A:
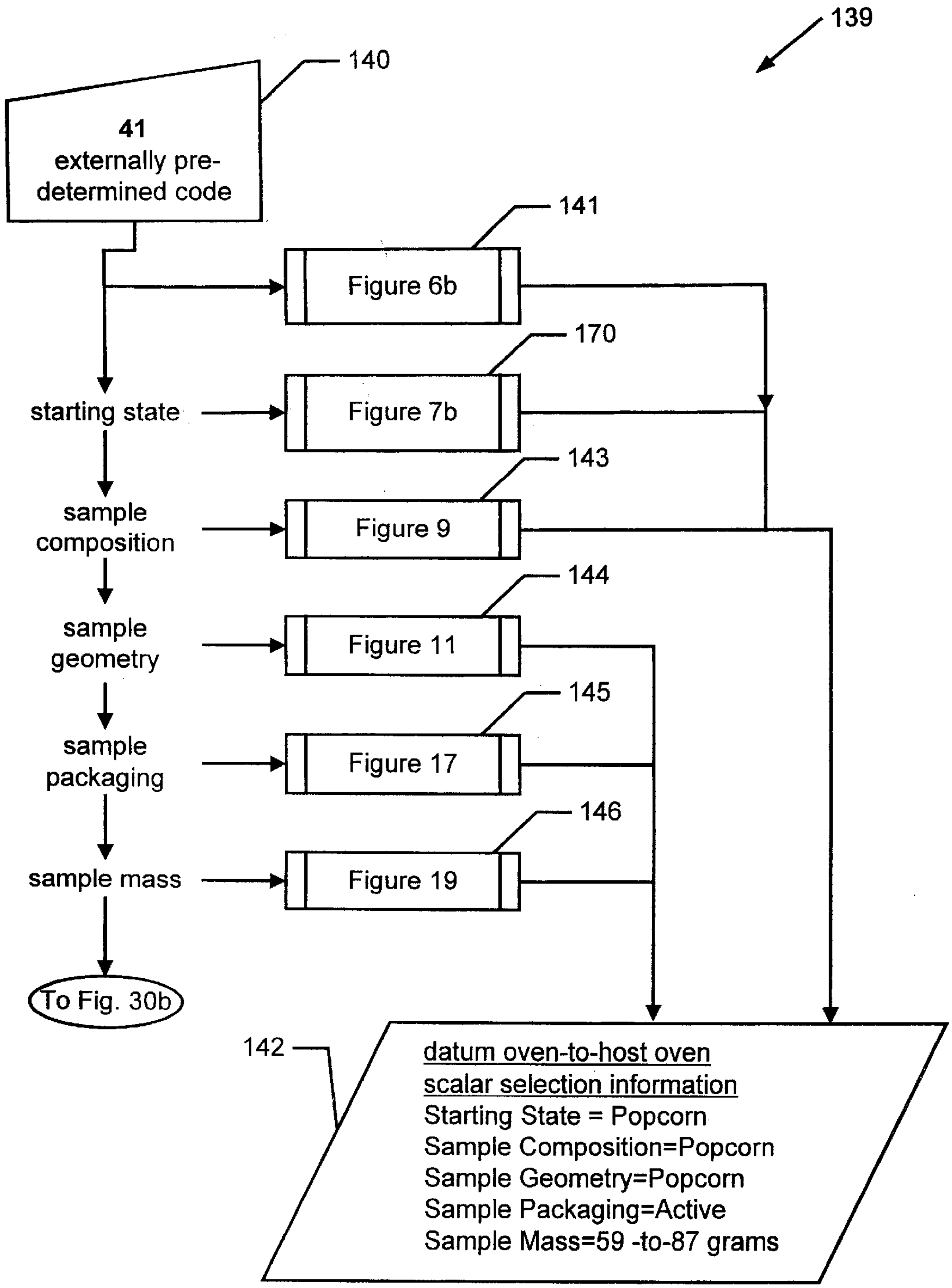
FIG. 30*a* illustrates a block diagram of an operative example 1 of the present invention.

A typical example 139 of the operation of the present invention 10 is set forth in a flow chart, FIGS. 30*a, b*. The flow chart is depicted in such a way as to enable the reader to follow the sequence of events as they unfold during the interpretation process of the externally derived predetermined code 24. It is understood by those skilled in the art of computer programming that the sequential events depicted in FIGS. 30*a, b* may, if desired, be rearranged in any order to produce the same or equal results as the present invention 10. A skilled computer programmer may, if desired, establish a parallel processing system that points to individual sequences of events for immediate interpretation.

Figure 17:
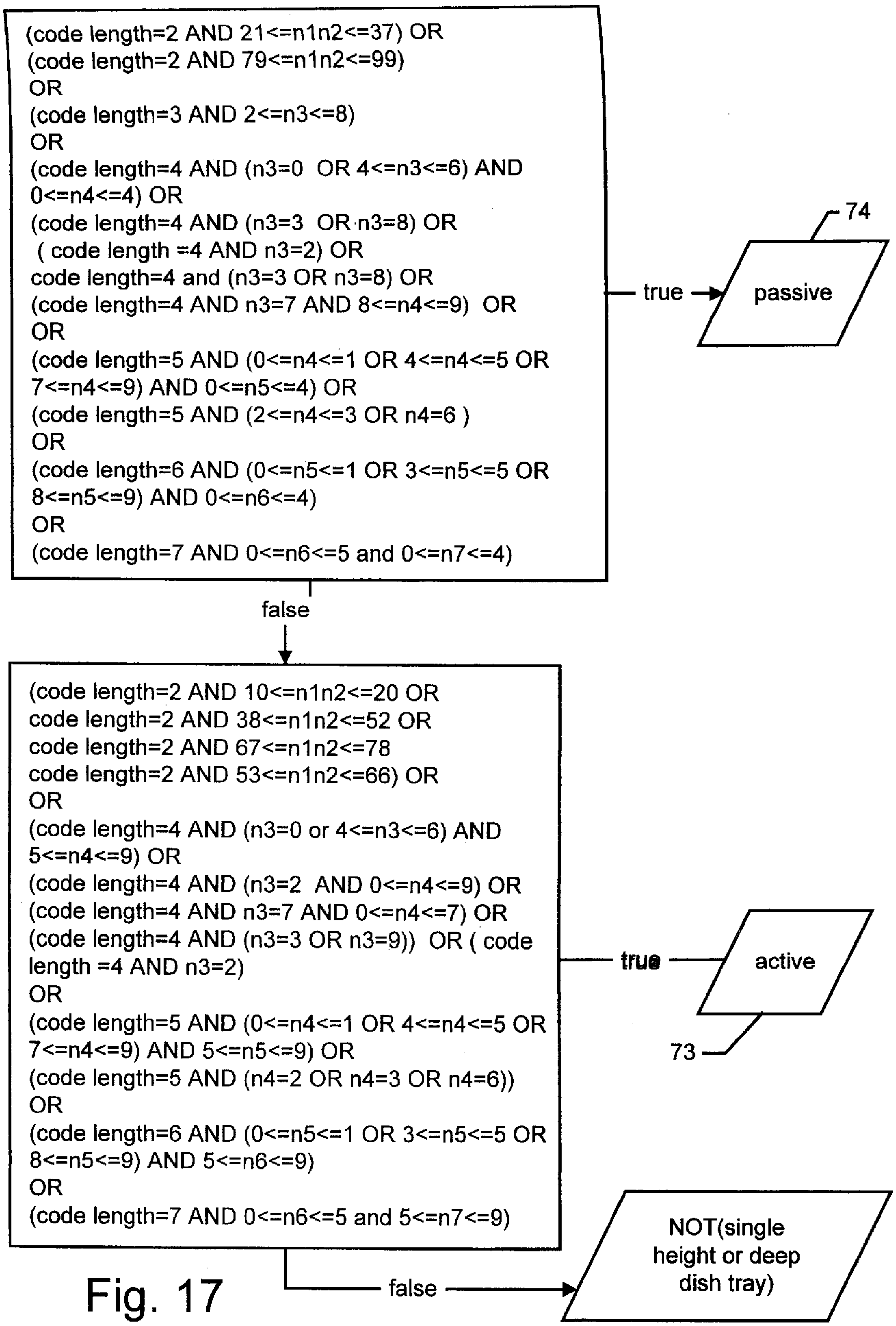
FIG. 17 illustrates a block diagram of the logical structures within the sample packaging group of FIG. 16.

The example 139 begins with the present invention 10 receiving an externally derived predetermined code 140, FIG. 30*a*. The code corresponds to an instruction set for the cooking of a food product or sample. In this particular example, the code is equal to "41". The present invention 10 has determined the numeric string length of the code 141 (see FIG. 6*b* for details). The numeric string length and the positional notation of the code 140 yields the information set that determines the starting state 170, sample composition 143 of the code 140 (see FIG. 9 for details), the sample geometry 144 (see FIG. 11 for details), the sample packaging 145 (see FIG. 17 for details), and the sample mass 146 (see FIG. 19 for details). The result of this processing is the datum oven-to host scalar information set 142, FIG. 30*a* (see FIG. 6*a* for details).

The present invention 10 now interprets the power level sequence and datum oven specific cook time(s) 35, FIG. 6*a* and interprets the special features request 36. The present invention 10 interprets the code 140 to determine if a radiant beat element or other special heating feature is in use and if a one minute pause between active power levels is required 147 (see FIG. 23*a* for details). The result of this processing is that special features request 150 delineates that there is no radiant heat element or other special heating features are in use and there are no one minute pauses required.

Figure 26:
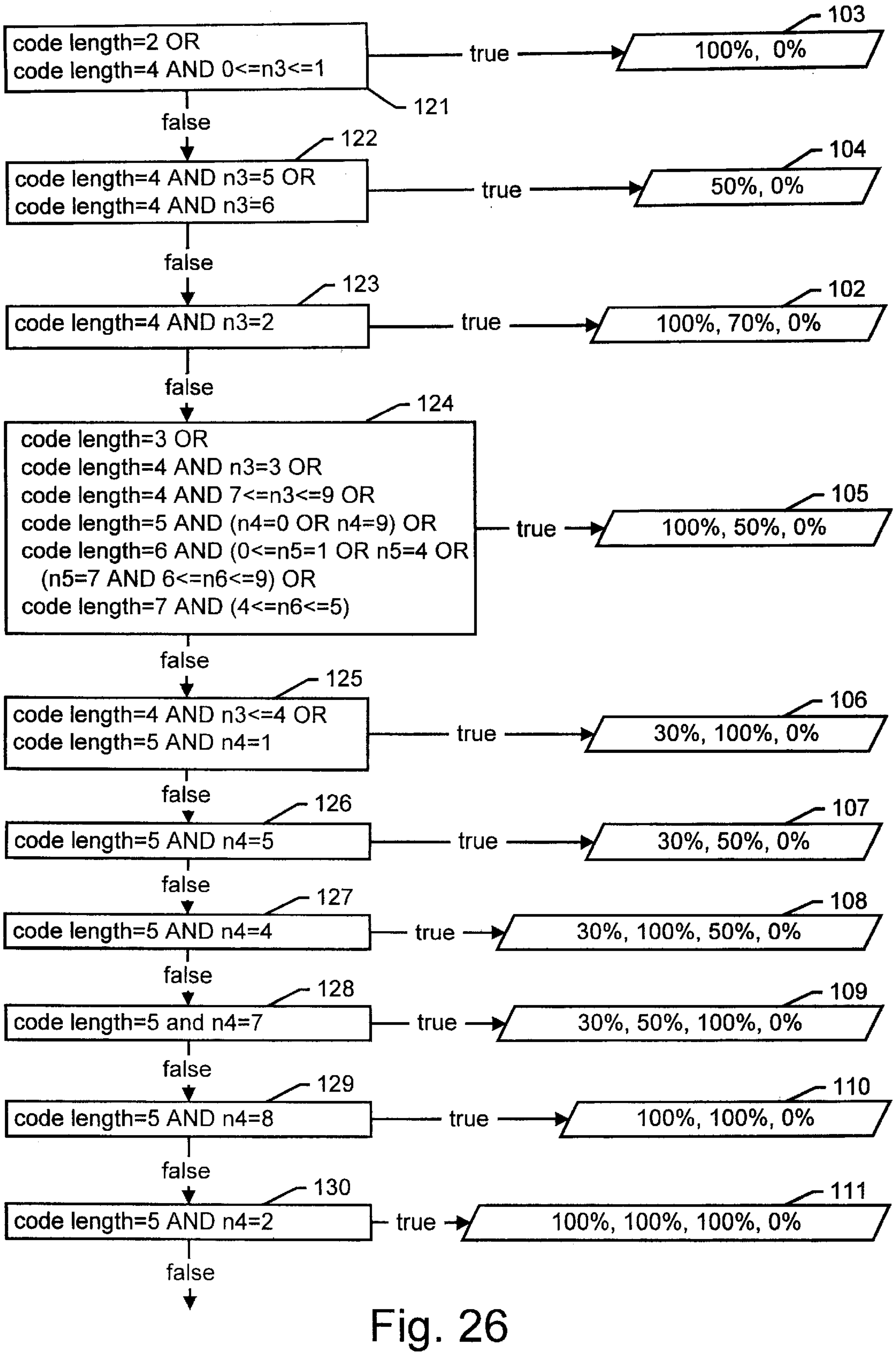
FIG. 26 illustrates a more detailed block diagram of the logical structures within the power level sequence of FIG. 25.
Figure 27:
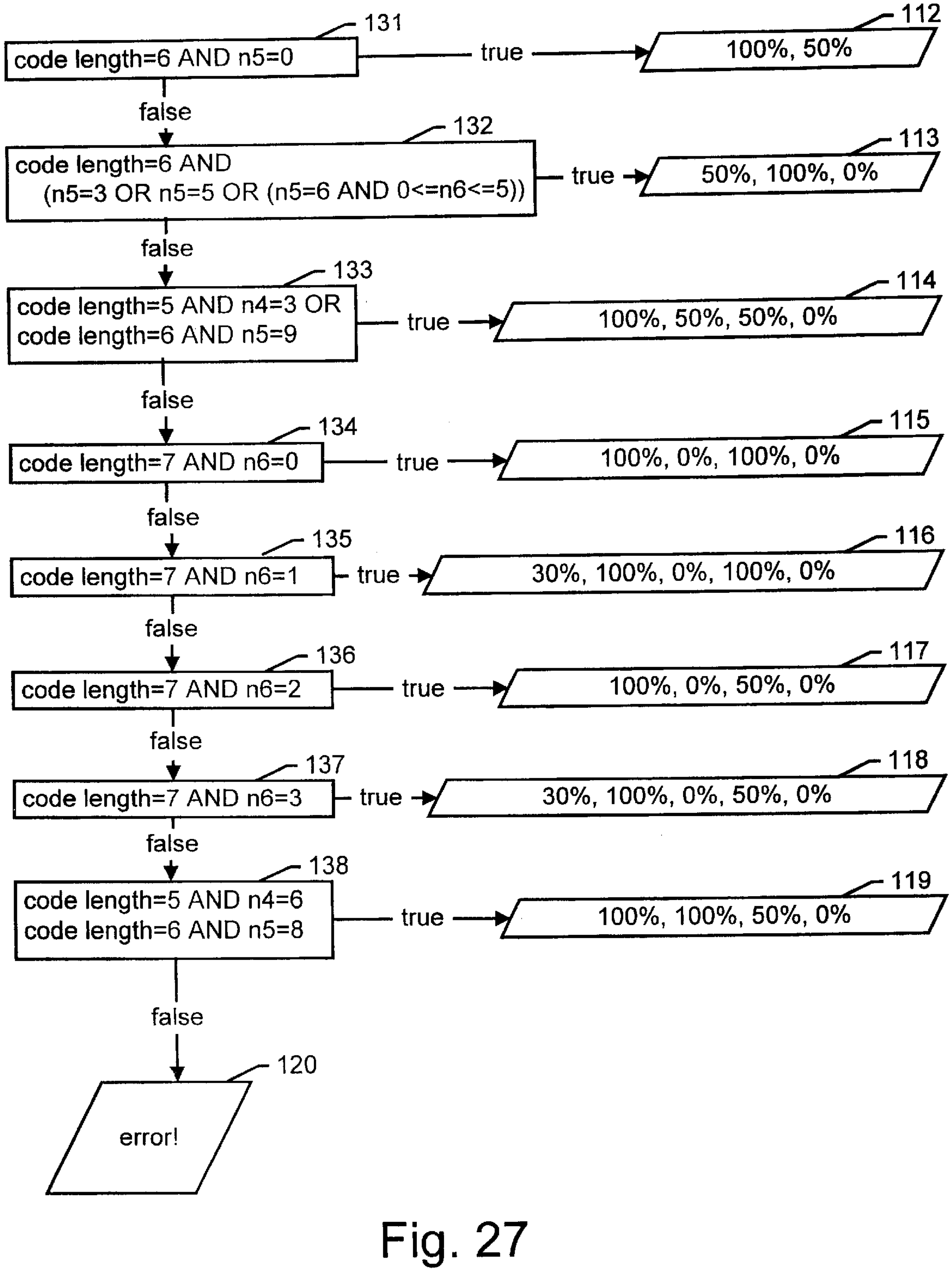
FIG. 27 illustrates a block diagram of the logical structures within the power level sequence of FIG. 25.
Figure 30B:
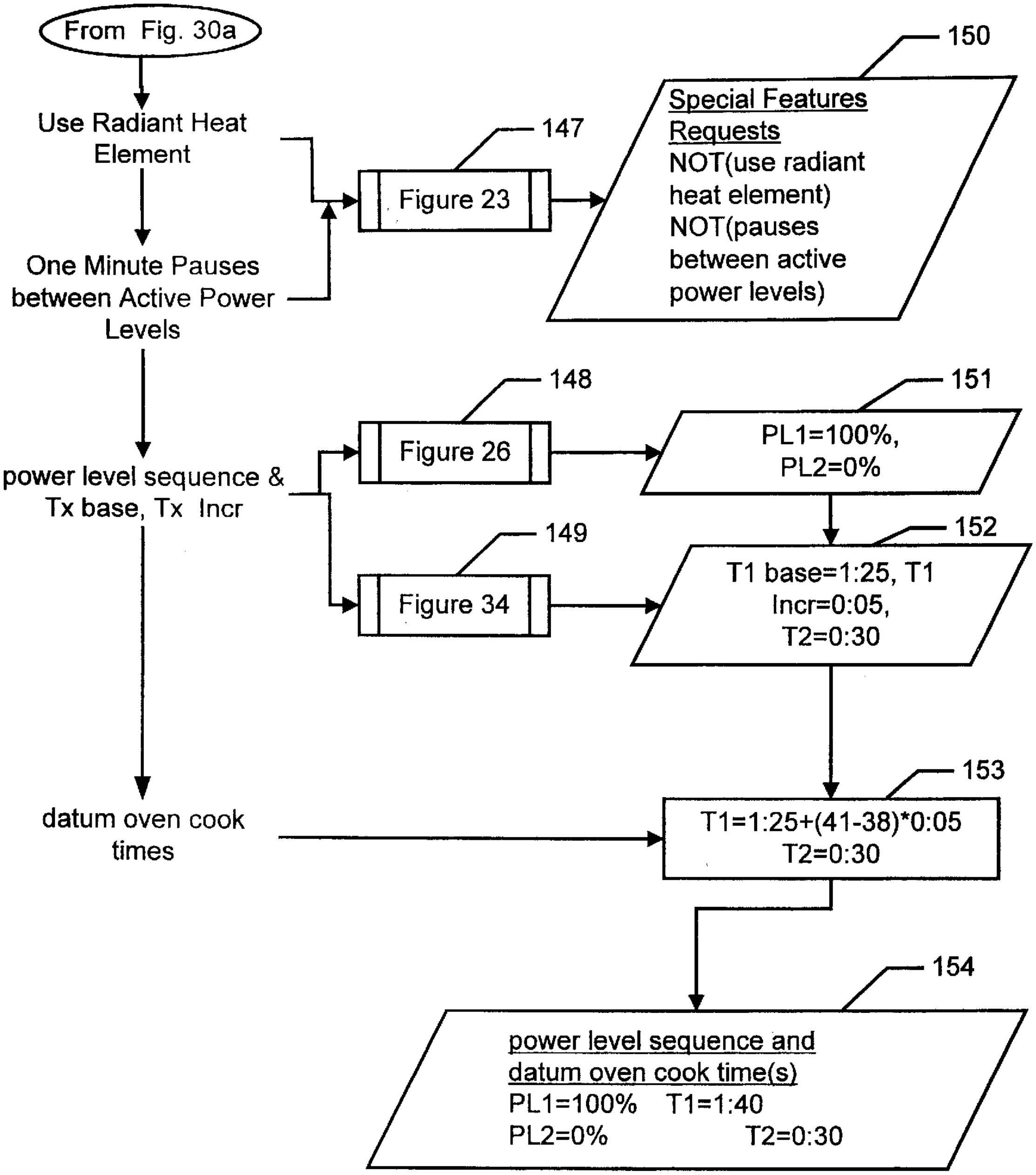
FIG. 30*b* illustrates a block diagram of an operative example 1 of the present invention.

Next, the present invention 10 interprets code 140 and determines the power level sequence 148 and time base(s) 149, (see FIGS. 26 and 33 for details). The power level sequence 121, FIG. 26 is interpreted by the numeric string length of the code 140. In this particular example, the code numeric string length 140 is equal to two, therefore; the power level sequence is $PL_1$=100% and $PL_2$=0%, (see 151, FIG. 30*b*). The time base 149 is interpreted by the present invention 10 by the numeric string length of the code, positional notation, and the value of the code 140. In this particular example, the code numeric string length has been determined to be equal to two, the position notation is equal to $n_1$=4 and $n_2$=1, and the numerical value is equal to forty one. The connective interpretation of the positional notation of $n_1n_2$ in view of the numerical value of forty one yields an instruction set 155 that is in the range of $38<=n_1n_2<=52$ (see 156, FIG. 33). The instruction set 152 yields $T_2$=0:30, $T_1$ increment=0:05, and $T_1$ base=1:25 respectively. The calculation of the formula 153 yields a $T_1$ time equal to 1:40 seconds and $T_2$=0:30 seconds (see 154, FIG. 30*b*).

In summation of this particular example, the externally derived predetermined code 24 was interpreted by the present invention 10 into an instruction set that provides the host microwave oven 12 with commands that produce work on a selected food product or sample. In this particular example, the sample would have two work cycles. The first work cycle would have a power level of $PL_1$=100% for a time duration of $T_1$=1:40. The second work cycle would have a power level of $PL_2$=0% for a time duration of $T_2$=0:30.

Figure 31A:
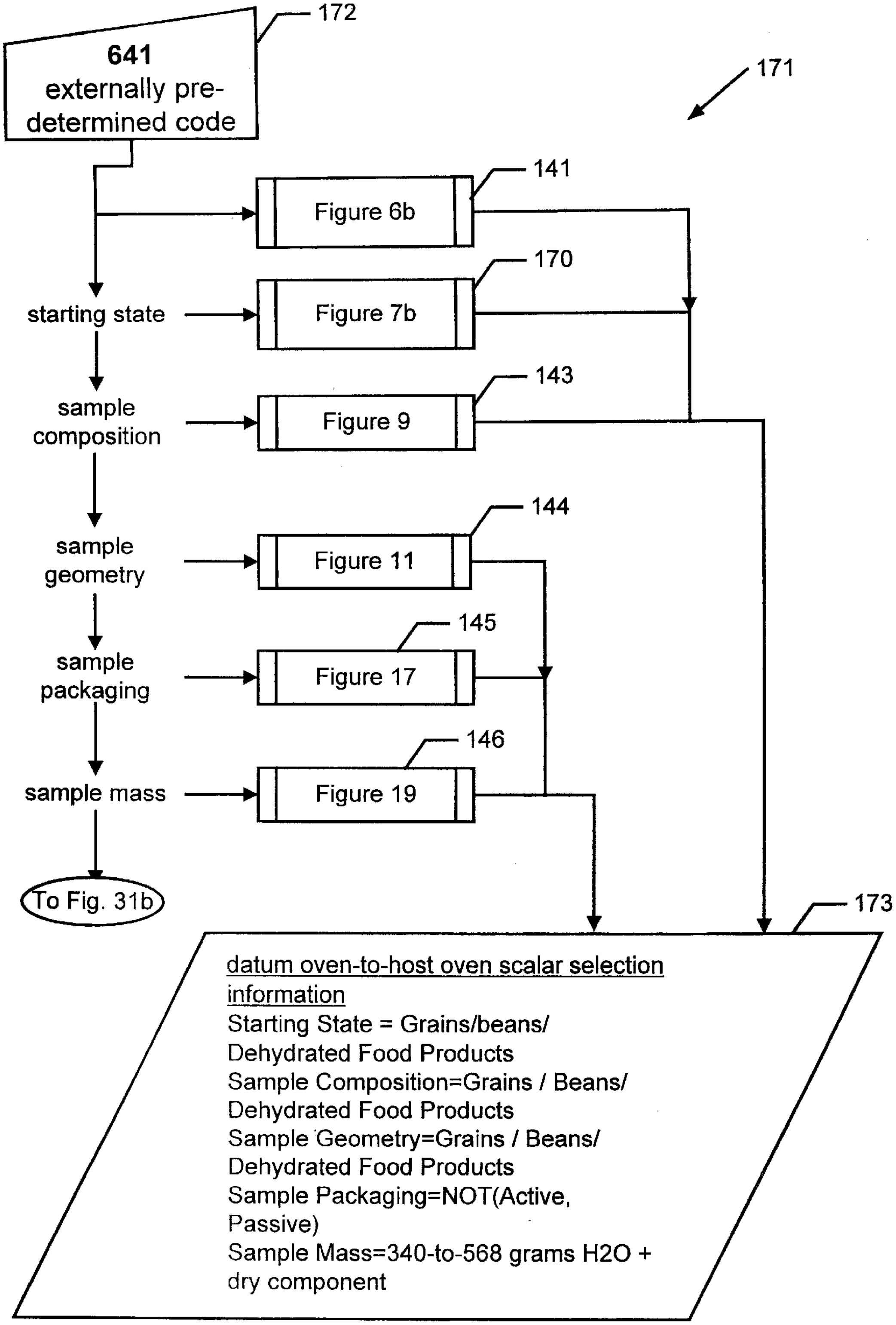
FIG. 31*a* illustrates a block diagram of an operative example 2 of the present invention.

Another example 171 begins with the present invention 10 receiving an externally derived predetermined code 172, FIG. 31*a*. The code corresponds to an instruction set for the cooking of a food product or sample. In this particular example, the code is equal to "641". The numeric string length of the code 172 is parsed using the same methodology discussed above and illustrated in FIG. 6*b*. The numeric string length and the positional notation of the code 172 yields the information set that determines the starting state 170, sample composition 143 of the code 172 (see FIG. 9 for details), the sample geometry 144 (see FIG. 11 for details), the sample packaging 145 (see FIG. 17 for details), and the sample mass 146 (see FIG. 19 for details). The result of this processing is the datum oven-to host scalar information set 173, FIG. 31*a* (see FIG. 6*a* for details).

The present invention 10 now interprets the power level sequence and datum oven specific cook time(s) 35, FIG. 6*a* and interprets the special features request 36. The present invention 10 interprets the code 172 to determine if a radiant heat element or other special heating features are in use and if a one minute pause between active power levels is required 147 (see FIG. 23*a* for details). The result of this processing is that special features request 150 delineates that there is no radiant heat element or other special features are in use and there is no one minute pause required.

Figure 31B:
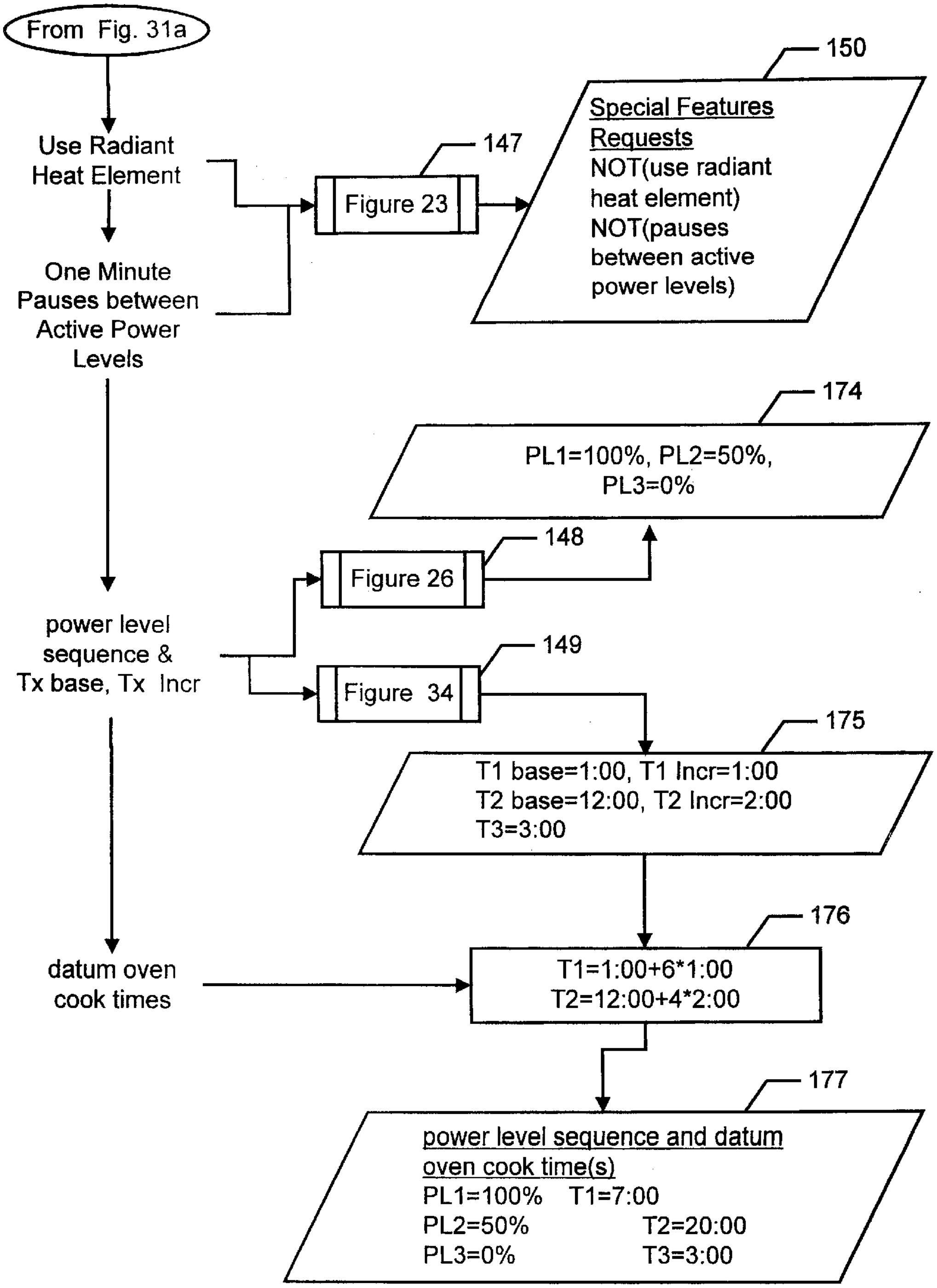
FIG. 31*b* illustrates a block diagram of an operative example 2 of the present invention.

Next, the present invention 10 interprets code 172 and determines the power level sequence 148 and time base 149, (see FIG. 26 for details). The power level sequence 124, FIG. 26 is interpreted by the numeric string length of the code 172. In this particular example, the code numeric string length 172 is equal to three, therefore; the power level sequence is $PL_1$=100%, $PL_2$=50%, and $PL_3$=0% (see 174, FIG. 31*b*). The time base 149 is interpreted by the present invention 10 by the numeric string length of the code, positional notation, and the value of the code 172. The connective interpretation of the positional notation of $n_1n_2n_3$ in view of the numerical value of 641 yields an instruction set 175 consisting of $T_1$base=1:00, $T_1$ increment=1:00, $T_2$ base=12:00, $T_2$ increment=2:00, and $T_3$=3:00. These determinations of $T_1$, $T_2$, and $T_3$ yield a datum oven cook time calculation 176 of $T_1$ =1:00+6*1:00 and $T_2$=12:00+4*2:00. The calculation yields a power level sequence and datum oven cook time(s) as delineated at 177, FIG. 31*b*.

In summation of example 171, the externally derived predetermined code 24 was interpreted by the present invention 10 into an instruction set that provides the host microwave oven 12 with commands that produce work on a selected food product or sample. In this particular example, the sample would have three work cycles. The first work cycle would have a power level of $PL_1$=100% for a time duration of $T_1$=7:00. The second work cycle would have a power level of $PL_2$=50% for a time duration of $T_2$=20:00, and the third work cycle would have power level of $PL_3$=0% for a time duration of $T_3$=3:00.

Figure 32A:
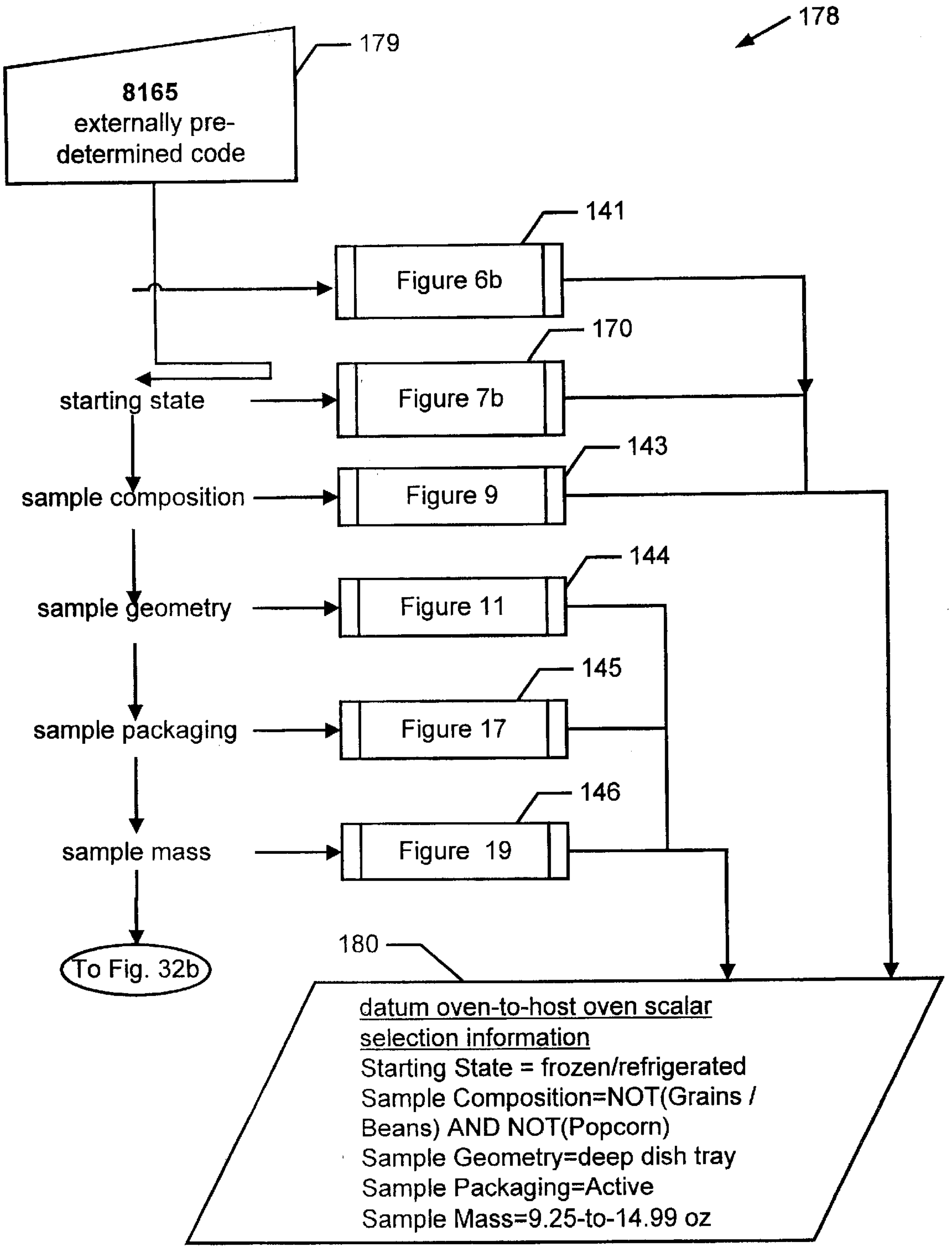
FIG. 32*a* illustrates a block diagram of an operative example 3 of the present invention.

Yet a further example 178 begins with the present invention 10 receiving an externally derived predetermined code 179, FIG. 32*a*. The code corresponds to an instruction set for the cooking of a food product or sample. In this particular example, the code is equal to "8165" The numeric string length of the code 179 is parsed using the same methodology discussed above and illustrated in FIG. 6*b*. The numeric string length and the positional notation of the code 179 yields the information set that determines the starting state 170, sample composition 143 of the code 172 (see FIG. 9 for details), the sample geometry 144 (see FIG. 11 for details), the sample packaging 145 (see FIG. 17 for details), and the sample mass 146 (see FIG. 19 for details). The result of this processing is the datum oven-to host scalar information set 180, FIG. 32*a*.

The present invention 10 now interprets the power level sequence and datum oven specific cook time(s) 35, FIG. 6*a* and interprets the special features request 36. The present invention 10 interprets the code 179 to determine if a radiant heat element or other special features are in use and if a one minute pause between active power levels is required 147 (see FIG. 23*a* for details). The result of this processing is that special features request 181 delineates that there is a heat element or other special feature in use and there is no pause between active power levels.

Figure 32B:
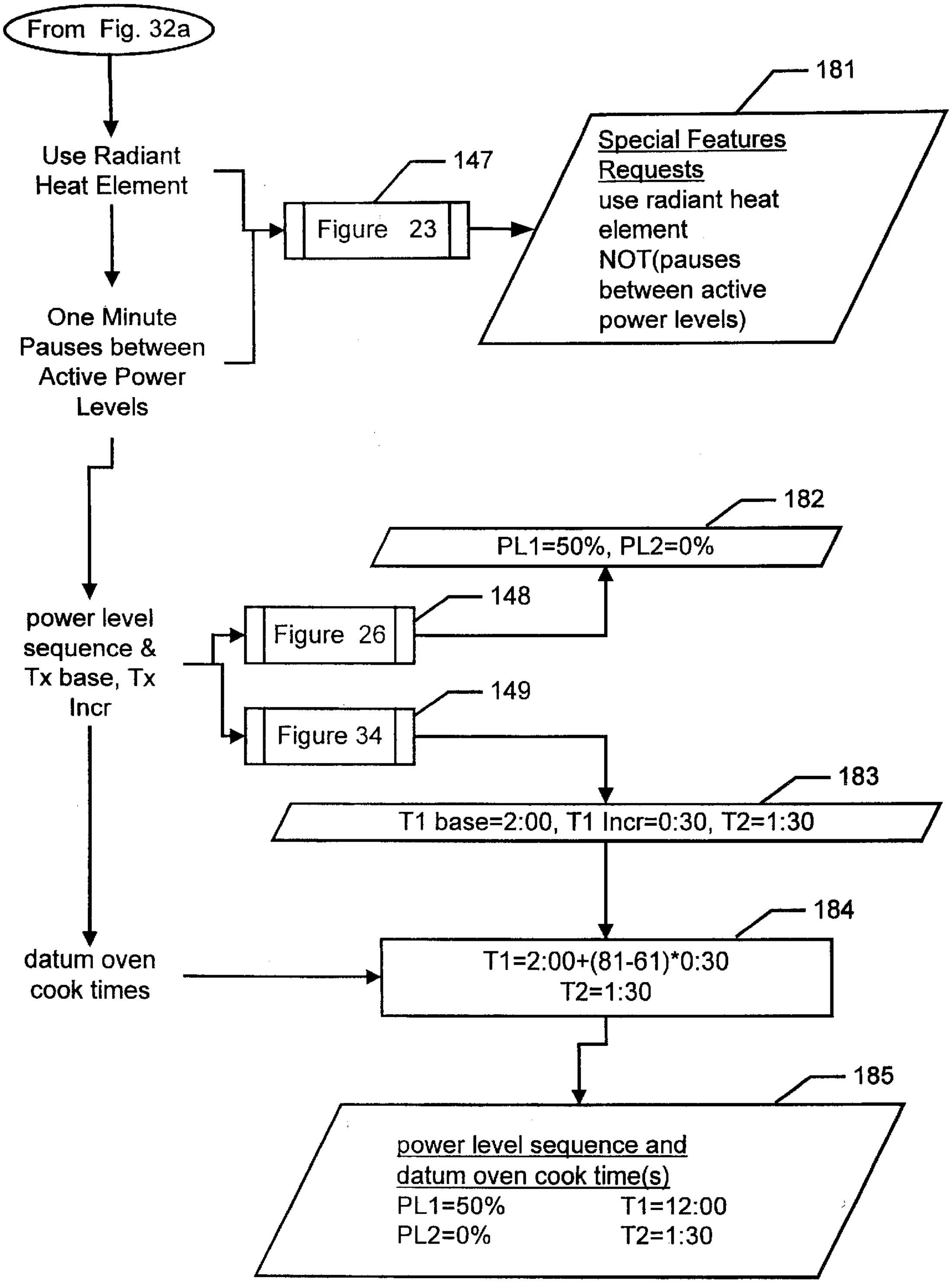
FIG. 32*b* illustrates a block diagram of an operative example 3 of the present invention.

Next, the present invention 10 interprets code 179 and determines the power level sequence 148 and time base 149, (see FIG. 26 for details). The power level sequence 122, FIG. 26 is interpreted from the code 179. In this particular example, the code numeric string length 179 is equal to four and $n_3$=6, therefore; the power level sequence is $PL_1$=50% and $PL_2$=0%. The time base 149 is interpreted by the present invention 10 by the numeric string length of the code, positional notation, and the value of the code 179. The connective interpretation of the positional notation of $n_1n_2n_3n_4$ in view of the numerical value of "8165" yields an instruction set 183 composed of $T_1$base=2:00, $T_1$ increment=0:30, and $T_2$=1:30. These determinations of $T_1$ and $T_2$ yield a datum oven cook time calculation 184 of $T_1$=2:00+(81−61)*0:30 and $T_2$=1:30. The calculation yields a power level sequence and datum oven cook time(s) as delineated at 185, FIG. 32*b*.

In summation of example 171, the externally derived predetermined code 24 was interpreted by the present invention 10 into an instruction set that provides the host microwave oven 12 with commands that produce work on a selected food product or sample. In this particular example, the sample would have two work cycles. The first work cycle would have a power level of $PL_1$=50% for a time duration of $T_1$=12:00. The second work cycle would have a power level of $PL_2$=0% for a time duration of $T_2$=1:30 (see 182, FIG. 32*b*).

The present invention 10 may, if desired, be programmed in any suitable programming language known to those skilled in the art of object oriented programming. Examples of object oriented programming languages are disclosed and discussed in *Object-Oriented Analysis And Design* by Grady Booch, Benjamin/Cummings, (1994). Another example of a programming language is disclosed in C Programming Language, 2/e, Kernighan & Richtie, Prentice Hall, (1989).

While the present invention 10 has been described specifically with respect to microwaves being the energy source employed, it is to be understood that any other heat-and/or energy source(s) along the electromagnetic radiation spectrum can be employed by modifying or using different ovens or housings. For example, hot air, ultraviolet, laser light, infrared, alpha, beta, gamma, x-ray radiation, or combinations thereof, can be employed. It would be a matter of developing specific profiles for the items to be "processed" by the heat source(s). Such items are not limited to food, but may also include, and not be limited to, painted articles where the paint is to be cured by infrared or UV light, coatings which may be cured by UV light, polymerization by UV light, irradiation of objects by radioactive energy beams, cutting, warming or melting of objects by infrared or laser light, and the like. In essence, wherever energy is to be directed at an article, a multi-step or multi-phase sequence of operations is to occur (or a single step or phase) and a profile of radiation applications can be developed, the present invention 10 can be used to permit such profile to be entered into a BIOS or machine which will accept and convert the data into operational signals which control, via a microprocessor or similar controller, the actuation, direction and characteristics of the energy source with respect to the article to be processed. In place of the excitation of water molecules, the respective energy processing properties can be determined with reasonable predictability to develop standard codes for processing standard items. Such items can then be predictably and repeatedly processed to reduce random variations in result and improve quality control and quality assurance.

Therefore, while the present invention 10 has been described with respect to food and microwaves, the description is intended to encompass the above mentioned variations and alternatives. Although the specific mechanisms for each radioactive source and article to be processed are not described, it would be obvious to those skilled in the respective art to be able to standardize profiles with minimal experimentation and to modify the hardware described herein to accommodate a different energy source, with concomitant protective and safety features considered.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

All patents, applications, publications and other references are incorporated by reference herein in their entirety.

We claim:

1. An interpretive system architecture for a host microwave oven or process stream, the microwave oven or process stream having means, operatively disposed therein, for receiving an externally derived predetermined code, the microwave oven or process stream further having means, operatively disposed therein, for controlling the operational features of the host microwave oven or process stream, comprising:

a) a controller having a memory, said controller operatively disposed intermediate the means for receiving the externally derived predetermined code and the means for controlling the operational features of the microwave oven or process stream; and, b) an operating system stored in said memory, said operating system having at least one interpretive base class operatively disposed therein;

c) said base class providing operational instance to the host microwave oven or process stream;

whereby said operating system receives the externally derived predetermined code, interprets the code, and transforms the code into user independent functional commands for the host microwave or process stream.

2. The interpretive system architecture of claim 1, wherein said interpretive base class is a BIOS machine base class.

3. The interpretive system architecture of claim 2, wherein said BIOS machine base class having at least one object providing functional control for said operating system.

4. The interpretive system architecture of claim 3, wherein said functional control object is a BIOS machine receiving object.

5. The interpretive system architecture of claim 4, wherein said BIOS machine receiving object being in communication with the means for receiving the externally derived predetermined code.

6. The interpretive system architecture of claim 5, wherein said BIOS machine receiving object interprets the received externally derived predetermined code.

7. The interpretive system architecture of claim 6, wherein said scalar datum oven object processes the received externally derived predetermined code.

8. The interpretive system architecture of claim 3, wherein said functional object is a datum oven scalar object.

9. The interpretive system architecture of claim 8, wherein said scalar datum oven object being in interactive communication with said BIOS machine receiving object.

10. The interpretive system architecture of claim 3, wherein said functional object is a BIOS machine output object.

11. The interpretive system architecture of claim 10, wherein said BIOS machine output object being in interactive communications with said scalar datum oven object.

12. The interpretive system architecture of claim 11, wherein said BIOS machine output object being in interactive communications with said work manager receiving object.

13. The interpretive system architecture of claim 2, wherein said BIOS machine base class having at least one data object.

14. The interpretive system architecture of claim 1, wherein said operating system having a work manger base class.

15. The interpretive system architecture of claim 14, wherein said work manager base class having at least one object providing functional control for said operating system.

16. The interpretive system architecture of claim 15, wherein said functional control object is a work manager receiving object.

17. The interpretive system architecture of claim 15, wherein said functional control object is a work monitor object.

18. The interpretive system architecture of claim 17, wherein said work monitor object being in interactive communication with said work manager receiving object.

19. The interpretive system architecture of claim 18, wherein said work monitor object being in interactive communication with said work processing object.

20. The interpretive system architecture of claim 19, wherein said work processing object being in interactive communication with said work manager output object.

21. The interpretive system architecture of claim 20, wherein said work manager receiving object receiving operational data from said BIOS machine output object.

22. The interpretive system architecture of claim 21, wherein said operational data being work requirements delineated from the externally derived predetermined code.

23. The interpretive system architecture of claim 22, wherein said operational data being real time power data delineated from the means for controlling the operational features of the host microwave oven or process stream.

24. The interpretive system architecture of claim 23, wherein said work processing object receives work requirement data or real time power data for processing.

25. The interpretive system architecture of claim 24, wherein said work processing object transforms said real time power data or said work requirements into command functions that contain data representing work expended on the specimen or work to be expended on the specimen.

26. The interpretive system architecture of claim 25, wherein said command functions being transmitted to the host microwave oven or process stream via said work manager output object.

27. The interpretive system architecture of claim 19, wherein said work monitor object receives operational data from said work manager receiving object.

28. The interpretive system architecture of claim 15, wherein said functional control object is a work processing object.

29. The interpretive system architecture of claim 15, wherein said functional control object is a work manager output object.

30. An interpretive system architecture for a host microwave oven or process stream, the microwave oven or process stream having means, operatively disposed therein, for receiving an externally derived predetermined code, the microwave oven or process stream further having means, operatively disposed therein, for controlling the operational features of the host microwave oven or process stream, comprising:

a) a controller having a memory, said controller operatively disposed intermediate the means for receiving the externally derived predetermined code and the means for controlling the operational features of the microwave oven or process stream;

b) an operating system stored in said memory;

c) a receiving object operatively disposed within said operating system;

d) said receiving object in communication with the means for receiving the externally derived predetermined code;

e) a datum oven object, operatively disposed within said operating system, said datum oven object in communication with said receiving object;

f) said receiving object interprets the externally derived predetermined code into datum process stream with specific operating instructions;

g) said receiving object transmits said datum process stream to said datum oven object;

h) a BIOS machine output object operatively disposed within said operating system;

i) said datum oven object transforms said datum process stream into host microwave oven operating instructions, said datum oven object operatively transmits said host microwave oven operating instructions to said BIOS machine output object; and, j) a work manager object, operatively disposed within said operating system, said work manager object in communication with said BIOS machine output object;

k) said work manager object transforming said operating instructions into command functions for controlling the operational features of the host microwave oven or process stream;

whereby the means for controlling the operational features of the host microwave oven or process stream receive and implement said command functions are derived from the externally derived predetermined code.

31. A method for interpreting instructions for a host microwave oven or process stream, the host microwave oven or process stream receiving an externally derived predetermined code from a user, the host microwave oven or process stream having means operatively disposed therein for commanding and controlling the operational features of the host microwave oven or process stream, comprising the steps of:

a) interpreting the received externally derived predetermined code;

b) interpreting a datum microwave oven-to-host oven or process stream scalar selection from said interpreted externally derived predetermined code;

c) interpreting a power level sequence from said interpreted externally derived predetermined code;

d) interpreting a datum microwave oven specific cook time(s) from said interpreted externally derived predetermined code;

e) interpreting special feature requests from said interpreted externally derived predetermined code;

f) formulating an instruction set containing said interpreted power level sequence, datum microwave oven specific cook time(s), a datum microwave oven-to-host oven or process stream scalar selection, and special feature requests; and, g) transmitting the resultant instruction set to the means for commanding and controlling the operational features of the host microwave oven or process stream.

32. A method for interpreting instructions for a host microwave oven or process stream of claim 31, wherein said interpreting the received externally derived predetermined code step parses the numeric string length of the externally derived predetermined code.

33. A method for interpreting instructions for a host microwave oven or process stream of claim 31, wherein said interpreting the received externally derived predetermined code step parses the positional relationship and individual or combined absolute numeric values of individual characters or character groupings within the externally derived predetermined code string.

34. A method for interpreting instructions for a host microwave oven or process stream of claim 31, wherein said interpreting the received externally derived predetermined code step interprets the absolute numeric value of the externally derived predetermined code.

35. A method for interpreting instructions for a host microwave oven or process stream of claim 31, wherein said interpreting a datum microwave oven-to-host scalar selection step, comprises:

a) determining a starting state of a specimen;

b) determining said specimen's composition;

c) determining said specimen's geometry;

d) determining said specimen's packaging; and, e) determining said specimen's mass from said interpreted externally derived predetermined code.

36. A method for interpreting instructions for a host microwave oven or process stream of claim 31, wherein said interpreting a power level sequence step comprises parsing said power level sequence from the externally derived predetermined code numeric string length, positional relationship of individual characters in the externally derived predetermined code string, and absolute numeric value of an individual externally derived predetermined code character or characters.

37. A method for interpreting instructions for a host microwave oven or process stream of claim 31, wherein said interpreting a datum microwave oven specific cook time(s) step comprises:

a) determining a base time for each said power level sequence;

b) determining a time increment for each power level sequence;

c) determining a cook time for each power level in said power level sequence; and, d) determining a resultant calculation of said specific cook time(s).

38. A method for interpreting instructions for a host microwave oven or process stream of claim 31, wherein said interpreting special feature requests step comprises:

a) determining a radiant heat element or other special heating process usage;

b) determining a selected active power levels for user interaction with the host microwave oven; and, c) determining a selected time interim between said active levels for user interaction with the host microwave oven.

39. An interpretive system architecture for a host microwave oven or process stream, the microwave oven or process stream having means, operatively disposed therein, for receiving an externally derived predetermined code, the microwave oven or process stream further having means, operatively disposed therein, for controlling the operational features of the host microwave oven or process stream, an apparatus delineating the characteristic(s) of an indicia, the indicia being expressive of an externally derived predetermined compiled code disposed on the surface of a specimen, or food package, or associated thereto, the indicia communicating via at least one data entry mechanism to the microwave oven or process stream, the microwave oven or process stream having disposed therein a BIOS machine for receiving, interpreting, and transforming the indicia, comprising:

a) at least one symbol, contained within the indicia, communicating at least one characteristic of the specimen via the data entry mechanism;

b) said characteristic of the specimen being selected from a group consisting of mass, geometry, packaging characteristics, starting state, composition, power level data, power level(s) time(s) data, or special feature request(s);

c) whereby the BIOS machine interprets said symbol and derives there from specific data that controls the cooking or heating of the specimen disposed within the confines of the microwave oven or process stream.

40. The apparatus of claim 39, wherein said symbol is a number, line, geometric shape, radio frequency data, electronically transmitted character or combination thereof.

41. The apparatus of claim 39, wherein said symbol being selectively spaced apart thereby facilitating the communication of said symbol to the data entry mechanism.

42. In an interpretive system architecture for a host microwave oven or process stream, the microwave oven or process stream having means, operatively disposed therein, for receiving an externally derived predetermined code, the microwave oven or process stream further having means, operatively disposed therein, for controlling the operational features of the host microwave oven or process stream, for delineating the characteristic(s) of an indicia, the indicia being disposed on the surface of a specimen, or food package, or associated thereto, the indicia communicating via at least one data entry mechanism to the microwave oven or process stream, the microwave oven or process stream having disposed therein a BIOS machine for receiving, interpreting, and transforming the indicia, wherein the improvement comprises:

a) an externally derived predetermined compiled code, contained within the indicia, said code communicating at least one characteristic of the specimen via the data entry mechanism;

b) said characteristic of the specimen being mass, geometry, packaging characteristics, starting state, composition, power level data, power level(s) time(s) data, special feature request(s) or combination thereof;

whereby the BIOS machine interprets said externally derived predetermined code and derives there from specific data that controls the cooking of the specimen disposed within the confines of the microwave oven.

* * * * *